(12) United States Patent
Doglioni Majer

(10) Patent No.: US 11,027,913 B2
(45) Date of Patent: Jun. 8, 2021

(54) CAPSULE ASSEMBLY COMPRISING A CAPSULE AND A CONVEYOR CAP CONFIGURED TO OPEN SAID CAPSULE

(71) Applicant: TUTTOESPRESSO S.r.l., Milan (IT)

(72) Inventor: Luca Doglioni Majer, Milan (IT)

(73) Assignee: TUTTOESPRESSO S.r.l., Milan (IT)

( * ) Notice: Subject to any disclaimer, the term of this patent is extended or adjusted under 35 U.S.C. 154(b) by 39 days.

(21) Appl. No.: 16/067,436

(22) PCT Filed: Jan. 2, 2017

(86) PCT No.: PCT/EP2017/050028
§ 371 (c)(1),
(2) Date: Jun. 29, 2018

(87) PCT Pub. No.: WO2017/114970
PCT Pub. Date: Jul. 6, 2017

(65) Prior Publication Data
US 2019/0016527 A1    Jan. 17, 2019

(30) Foreign Application Priority Data

Dec. 31, 2015 (WO) ................. PCT/EP2015/081470
Apr. 8, 2016 (WO) ................. PCT/EP2016/057844

(51) Int. Cl.
*A47J 31/36* (2006.01)
*B65D 85/80* (2006.01)
(Continued)

(52) U.S. Cl.
CPC ...... *B65D 85/8043* (2013.01); *A47J 31/0605* (2013.01); *A47J 31/3623* (2013.01); *A47J 31/3676* (2013.01)

(58) Field of Classification Search
CPC .. A47J 31/0605; A47J 31/061; A47J 31/3623; A47J 31/3676; B65D 85/804; B65D 85/8043; B65D 85/8046
(Continued)

(56) References Cited

U.S. PATENT DOCUMENTS 1,701,194 A * 2/1929 Rosenstein ............ A47J 31/02
99/285
5,813,317 A * 9/1998 Chang .................... A47J 31/02
210/238
(Continued)

FOREIGN PATENT DOCUMENTS

| | | |
|---|---|---|
| JP | 2012-530522 | 12/2012 |
| JP | 2015-529485 | 10/2015 |

(Continued)

OTHER PUBLICATIONS

International Search Report and Written Opinion dated Mar. 2, 2017 in PCT/EP2017/050028 filed Jan. 2, 2017.
(Continued)

*Primary Examiner* — Reginald Alexander
(74) *Attorney, Agent, or Firm* — Silvia Salvadori

(57) ABSTRACT

A capsule assembly including a capsule for preparation of beverages and a conveyor cap mounted on the capsule for conveying the beverage exiting the capsule. The capsule includes an inlet wall, an outlet wall, and a lateral wall defining an internal volume inside which at least one beverage ingredient is housed. The outlet wall includes one or more capsule beverage outlets. The conveyor cap is mounted on the capsule to define an enclosure space between the outlet wall and an inner surface of the conveyor cap. The conveyor cap includes one or more beverage delivery openings and is movably mounted on the capsule. The capsule beverage outlets and the conveyor cap are configured to interact so that the capsule beverage outlets are opened by
(Continued)

the conveyor cap due to a relative movement between the capsule and the conveyor cap.

35 Claims, 49 Drawing Sheets

(51) Int. Cl.
  *B65D 85/804* (2006.01)
  *A47J 31/06* (2006.01)
(58) Field of Classification Search
  USPC .................................................. 99/295, 299
  See application file for complete search history.

(56) References Cited

U.S. PATENT DOCUMENTS

| | | | |
|---|---|---|---|
| 7,836,820 B2* | 11/2010 | Hammad | A47J 31/0605 |
| | | | 426/433 |
| 7,981,451 B2* | 7/2011 | Ozanne | B65D 85/8043 |
| | | | 426/79 |
| 2008/0026121 A1 | 1/2008 | Mastropasqua et al. | |
| 2008/0216666 A1 | 9/2008 | Doglioni Majer | |
| 2010/0282091 A1 | 11/2010 | Doleac et al. | |
| 2010/0313766 A1* | 12/2010 | Suggi Liverani | A47J 31/0673 |
| | | | 99/295 |
| 2013/0122157 A1 | 5/2013 | Dogan et al. | |
| 2013/0156899 A1* | 6/2013 | Quinn | A47J 31/407 |
| | | | 426/115 |
| 2015/0001100 A1* | 1/2015 | Bartoli | B65D 85/8043 |
| | | | 206/0.5 |
| 2016/0052706 A1 | 2/2016 | Talon et al. | |

FOREIGN PATENT DOCUMENTS

| | | |
|---|---|---|
| WO | WO 2006/030461 A1 | 3/2006 |
| WO | WO 2007/141202 A1 | 12/2007 |
| WO | WO 2008/011913 A1 | 1/2008 |
| WO | 2010137947 | 12/2010 |
| WO | WO 2012/010634 A1 | 1/2012 |
| WO | 2014012778 | 1/2014 |
| WO | WO 2014/167062 A1 | 10/2014 |

OTHER PUBLICATIONS

Office Action issued by the JP Patent Office dated Dec. 22, 2020 for corresponding JP application No. 2018-534057 and relevant English translation.

* cited by examiner

CAPSULE ASSEMBLY COMPRISING A CAPSULE AND A CONVEYOR CAP CONFIGURED TO OPEN SAID CAPSULE

FIELD OF THE INVENTION

The present invention relates to a capsule assembly having collecting means, namely a capsule having means to collect the beverage and convey it towards the final container.

BACKGROUND OF THE INVENTION

Capsules containing pre-packaged foodstuffs such as roast & ground coffee, soluble pre-mixes, condensed infant milk or concentrated syrups are becoming very popular. One example is for instance WO2005006927 by Favre, another one is EP2239212 by Yoakim & Borne. Although these embodiments efficiently provide the desired beverage, they have to rely on outlet means which become dirty with the use, thus requiring constant cleaning or, absent any cleaning, providing a "humus" for development of contaminants, potentially dangerous for the consumer.

In those beverage systems where cleaning of the outlet means is not possible because access to them is impeded by the construction technology, a so called "flavor-crossover", that is cross-contamination of the aromas, is generated so that brewing a tea immediately after a coffee will have the undesirable drawback of transferring to the tea drink some of the aromas and flavours of the previously dispensed coffee drink.

WO2008011913, on the other hand, shows a capsule utilizing a cap defining a delivery chamber which conveys towards the user's receptacle (such as a mug, jug, cup or glass) and actually replaces the outlet means present in the drink dispensing apparatus. Nevertheless this solution implies a central outlet means in the capsule which revolves around a sectum or membrane which is pierced during its manufacturing and opens, during the beverage preparation, so that it creates an outlet path. This solution relies on a pre-pierced membrane which is installed between the ground coffee and the external ambient, thus providing to the air and to the oxygen contained therein a path into the capsule, that is a fast deterioration of the coffee contained inside the capsule.

Furthermore, the piercing of the membrane adds complexity to the manufacturing process, as imprecise or incomplete piercing of the membrane may result in dramatic changes in the quality of the finished drink.

It is therefore needed a system that avoids or reduces flavor cross contamination and yet preserves the ingredient contained inside the capsule from being oxidized by contact with ambient air. Therefore there is also the need of providing a closed capsule able to preserve ingredient(s) housed therein and that at the same time can be easily and effectively opened when the beverage has to be prepared.

It is also needed a system that is not based on the opening of a pre-pierced membrane, via shearing, tearing or anyway breaking said membrane, since such breaking is subject to wide operational tolerances when it comes to defining a free passage sufficient to create an acceptable flow-rate for a proper beverage preparation yet without generating an excessive flow-rate.

It is finally required a system that with a compact solution for its water outlet means allows for a variety of drinks to be executed and dispensed flawlessly into the receptacle used by the dispenser's users without creating potentially hazardous dirt accumulation or bacterial growth in areas of the outlet path of the drink, i.e. in the areas in contact with foodstuffs.

The aim of the present invention is to solve the above mentioned problems.

SUMMARY OF THE INVENTION

The aim is reached by the invention, that provides a capsule assembly for preparing a beverage or a liquid food, comprising a capsule for the preparation of beverages and a cap that is mounted on said capsule at the side of the capsule where the beverage outlet is and that acts as a conveyor of the beverage exiting the said capsule. In some embodiments, the conveyor cap may have piercing means to open the capsule's outlet wall.

The capsule comprises an inlet wall, an outlet wall and a lateral wall defining an internal volume inside which one or more beverage ingredients may be housed; the outlet wall comprises one or more capsule beverage outlets.

The conveyor cap is mounted on the capsule to define an enclosure space between the outlet wall and an inner surface of the conveyor cap; the cap is provided with one or more beverage delivery openings. Preferred embodiments provide for a structure of the conveyor that is suitable to minimise the surfaces in contact with the liquid, yet allowing for storage volume to meet the needs deriving from differing flow-rates and/or finished drinks bearing different liquid volumes.

The conveyor cap is movably mounted on the capsule so that a relative movement between cap and capsule may be imposed; i.e. depending on which part is held still, the cap can move with respect to the capsule or the capsule can move with respect to the cap or both the capsule and the cap are moved. In preferred embodiments, the movement of the cap and the capsule is to bring capsule and cap closer together, i.e. upon moving capsule and/or cap, the distance between the outlet of the capsule and the outlet of the cap becomes shorter.

The capsule beverage outlets are normally closed to provide a sealed capsule.

The terms "closed" or "normally closed" are used herein to indicate that in a capsule prior to its use, the internal volume where at least one ingredient is housed is sealed from the external environment until the beverage outlets are opened for dispensing the beverage.

The conveyor cap is configured to interact with the capsule's side wall, for movement, and outlet wall, for opening the capsule, so that the capsule beverage outlets are opened by the conveyor cap due to a relative movement between the capsule and the conveyor cap. According to an aspect of the invention, the outlet wall of the capsule and at least a part of the lateral wall (preferably a bottom part of the lateral wall) of the capsule, or at least part of a flange protruding from the lateral wall or the outlet wall of the capsule, are housed by the conveyor cap.

The capsule has guiding means to guide the movement of the conveyor cap; and the guiding means are selected from: at least part of the lateral wall of the capsule, and a flange protruding from said lateral wall or from said outlet wall of the capsule. Also combinations of guiding means comprising a part of the lateral wall and a flange (protruding from the outlet wall or from the lateral wall) are also possible.

In other words, according to an embodiment at least a part of the lateral wall of the capsule acts as a guide for the movement of the conveyor cap, which cap has a lateral portion bearing a shape complementary to the part of the lateral side of the capsule with which the conveyor cap cooperates. According to an embodiment at least a part of a flange protruding from the lateral wall, or from the outlet wall of the capsule, acts as a guide for the movement of the conveyor cap, which cap has a lateral portion that has a shape complementary to the flange of the capsule.

The relative movement of cap with respect to the capsule provides for the lateral portion of the conveyor to slide along a part of the lateral wall of the capsule, or along a flange protruding from the capsule, so that the movement of the conveyor with respect to the capsule is guided and controlled.

For the purpose of the present invention the wording "at least a part of the lateral wall of the capsule" is designing any part of the capsule that is directly or indirectly connected to the lateral wall of the capsule and that forms a surface onto which the conveyor cap is mounted; the conveyor cap can move along the surface of the guiding means. As mentioned above, the guiding means may be a flange extending from the lateral wall or a flange extending from the outlet (or bottom) wall of the capsule.

The conveyor cap has a surface that is provided with at least one outlet for the beverage. The guiding means of the conveyor cap are preferably a lateral wall or portions of a lateral wall, that cooperate with the guiding means of the capsule, as above defined. Also the conveyor cap can be provided with a flange acting as guiding means and intended to cooperate with the guiding means of the capsule.

It has to be noted that, in possible embodiments, the conveyor cap and the capsule may cooperate with each other at a different position with respect to the relevant lateral walls. It has to be noted that the cooperation at different position with respect to the relevant lateral walls can be provided in addition or in alternative to a cooperation at the lateral walls.

As mentioned, according to an embodiment, the capsule may be provided with a flange protruding from the outlet wall or from the lateral wall of the capsule. The conveyor cap cooperates with such a flange of the capsule so as to properly guide the relative movement of the capsule and conveyor cap.

More in detail, according to an aspect of the invention said flange of the capsule protruding from the outlet wall or from the lateral wall thereof, cooperates with relevant guiding means of the conveyor cap. According to an aspect, the guiding means of the conveyor cap comprise a flange arranged to cooperate with the relevant guiding means of the capsule; the flange of the conveyor cap may protrude from the base (e.g. internal bottom surface) of the conveyor cap, said flange of the conveyor cap being arranged internally with respect to the lateral wall of the conveyor cap. In general, according to an aspect, the guiding means of the conveyor cap, e.g. a flange, are placed at a distance from the axis of the capsule that is less than the distance between the axis of the capsule and the lateral wall of the conveyor cap.

According to an aspect, guiding means of the capsule and of conveyor cap (e.g. lateral wall and/or flange) has a tubular shape and such tubular shape may be interrupted. In other words, the tubular shape may be not complete, e.g. by the provision of missing portions so as to form two or more separated protruding flanges. The cross section of the tubular shape can be circular in a plane perpendicular to the axis of the capsule. However, cross section shapes of the guiding means are not limited to the circular shape, but can be for example also used oval or quadrilateral or polygonal shape.

According to an embodiment, the conveyor cap and capsule are provided with complementary means that couple and retain the cap on the capsule and, at the same time, allow the required movement between these components.

Preferably, these complementary means provide an interlocking connection between the capsule and the conveyor cap. Such an interlocking connection can be e.g. provided by the mutual engagement of ridges placed both on the capsule and on the conveyor cap, or by the mutual engagement between at least one ridge and at least one groove placed on the capsule and on the conveyor cap (or vice versa). Thus, according to an aspect, both the lateral walls of the capsule and of the conveyor cap (and/or both the flanges of the capsule and of the conveyor cap) can be provided with ridges, arranged to cooperate with each other and to provide an interlocking connection between capsule and conveyor cap. Alternatively, the capsule or the conveyor cap is provided with at least one ridge, while the other element between the capsule and the conveyor is provided with at least one groove arranged to receive and to engage the above mentioned ridge. Also, both the capsule and the conveyor cap may be provided with both ridges and grooves.

It has to be noted that the ridge(s) and/or groove(s) is arranged to retain the conveyor cap on the capsule (i.e. avoiding a loose coupling of these elements) and preferably are arranged perpendicularly with respect to the direction of relative movement between the capsule and conveyor cap, so as to limit said relative movement and avoid separation of these elements.

The complementary means that couple and retain the cap on the capsule can be configured to maintain the capsule and conveyor cap in a relative position wherein the capsule is closed, thus avoid the undesired accidental relative movement thereof, for example during transport or manipulation of the capsule before the beverage preparation. In other words, the relative movement from the closed position of the capsule to the open position of the capsule may be achieved by overcoming a resistance provided by said complementary means that couple and retain the cap on the capsule. More in detail, the ridge(s) and/or groove(s) are configured to retain the conveyor cap on the capsule (i.e. avoiding a loose coupling of these elements) and also to avoid the accidental movement of the capsule relative to the conveyor cap towards the position wherein the capsule is opened, when said movement is not requested.

More in detail, according to a possible embodiment two ridges can be arranged on the capsule and one ridge can be arranged on the conveyor so that in the relative position wherein the capsule is closed, the single ridge of the conveyor is arranged between the two ridge of the capsule thus stably retaining the conveyor cap on the capsule (i.e. avoiding a loose coupling of these elements) and also avoiding the above discussed undesired relative movement to open the capsule. Only by applying a predetermined force, thus overcoming the resistance provided by the interference between the ridges, the relative movement between the capsule and the conveyor towards the opening position of the capsule can be obtained.

Obviously, the reverse configuration is also possible, with two ridges arranged on the conveyor and one ridge arranged on the capsule.

It has to be noted that according to a possible embodiment, the conveyor cap and the capsule can be retained in coupled configuration (coupled one to another) by friction, e.g. by cooperating surfaces of the capsule and of the conveyor cap. Said mutual cooperating surfaces can be conical or slightly inclined so as to provide the desired friction. The mutual cooperating surfaces can be deformable to allow a relative movement between capsule and conveyor cap.

Typically, the guiding means of the conveyor cap (e.g. a lateral wall and/or a flange of the conveyor cap) embrace the relevant guiding means of the capsule (e.g. a lateral wall and/or a flange of the capsule). In other words, considering the axis of the capsule, the guiding means of the conveyor cap may be placed externally (i.e. engage externally) the relevant guiding means of the conveyor cap. The opposite arrangement may be however possible. Thus, according to an embodiment, the guiding means of the capsule are placed externally with respect to (i.e. they embrace) the relevant guiding means of the conveyor cap. As an example, considering the above mentioned embodiment where the capsule comprise a flange protruding from the outlet wall/lateral wall, and the conveyor cap comprise a flange protruding from the base, typically the flange of the conveyor cap embraces the flange of the capsule. However, in other embodiments, the flange of the capsule may embrace the flange of the conveyor cap. Such design can also be applied when the engagement is obtained by the lateral walls of the capsule embracing the conveyor cap.

The capsule has at least one outlet for delivery of a beverage; the outlet is normally closed. At least the capsule or the conveyor have a means for opening the outlet. Advantageously, the presence of a conveyor cap allows to avoid contact between the produced beverage and parts of the system for the beverage preparation, e.g. a capsule assembly holder. Additionally, the opening of the capsule due to a relative movement between the capsule and the conveyor cap allows to provide a normally closed capsule, able to preserve ingredient(s) housed therein, that is effectively opened by means of the conveyor cap.

Therefore the opening by the conveyor cap allows to provide an effective opening of the capsule without the need to provide for opening means other than the one provided by the conveyor cap in the system for the beverage preparation, and/or without the need of using the build up of liquid pressure inside the capsule to create an opening in the capsule, to be used as outlet means.

According to a preferred embodiment, the relative movement between the capsule and the conveyor cap intended to open the capsule beverage outlets is provided mechanically, preferably by providing a compression of the capsule assembly. In other words, according to a possible embodiment, the distance between the conveyor cap's outlet and the outlet wall of the capsule is reduced.

According to an aspect of the invention, the relative movement between the capsule and the conveyor cap intended to open the capsule beverage outlets can be provided manually, before the insertion of the capsule assembly in the holder and in general, in the beverage preparation system (e.g. in the dispensing machine).

According to an embodiment, the conveyor cap is axially movable with respect to the capsule, or viceversa the capsule's body is axially movable with respect to the conveyor cap, to exert a pressure on the capsule beverage outlets causing their opening. An advantage of this embodiment is to provide an effective opening of the capsule beverage outlets due to the relative movements between the capsule and the conveyor cap.

In fact, according to a possible embodiment, the capsule beverage outlets comprise a breakable portion of the outlet wall of the capsule, preferably said breakable portion being defined by at least one thinned portion or groove. Advantageously, the outlets for the beverage that are provided on the capsule comprise a portion of a capsule wall, a groove providing an area of reduced thickness in at least part of said portion of the wall and defining the outlets on the capsule outlet wall. The projecting element, or elements, of the conveyor cap allows to apply a pressure on the breakable portion, thus causing its opening, following the relative movement between the capsule and the conveyor cap.

According to a possible embodiment, the one or more capsule beverage outlets comprise at least one through-opening and at least one sealing membrane. The term "through-opening" is used herein to indicate any opening such as, a hole, an aperture or a slot, providing a fluid passage through the outlet wall, i.e. a passage between two sides of the outlet wall where the through-openings are arranged. More in detail, according to an aspect, the one or more capsule beverage outlets comprise at least one through-opening closed by at least one sealing membrane.

In other words the outlet wall of the capsule is provided with one or more through-opening (e.g. one or more hole(s) or aperture(s) or slot(s)) which are closed by sealing membrane, i.e. the beverage cannot exit from the capsule via the through-opening(s).

It has to be noted that the sealing membrane can be arranged above, or below, the at least one through-opening. In other words, the sealing membrane can be arranged upstream or downstream with respect to the at least one through-opening (the terms "upstream" and "downstream" being referred to the flow of the brewing liquid path inside the capsule from the inlet wall to the outlet). More in detail, in both cases the sealing membrane allows to close the capsule (and thus the through-opening), i.e. to isolate the internal volume of the capsule body where at least one ingredient is housed and the external environment thus preventing the exit of the beverage from the capsule. In both configurations, the expression "open the beverage outlets" means that the internal volume of the capsule is put in fluidic communication with the external ambient so that the beverage can exit the capsule body towards the conveyor cap via the at least one through-opening. On the contrary, when the beverage outlets are closed the beverage cannot exit the capsule via the through-opening(s) due to the presence of the sealing membrane that can be arranged above or below said through-opening(s).

The sealing membrane can comprise a sealable foil, known per se in the art, made for example of aluminium coupled with one or more materials, for example bearing a different tensile elongation, such as PE, PP and/or filtering non woven material, or alternatively an oxygen-impermeable non-metallic material such as a tri-laminate PP/EVOH/PE or similar materials available to the skilled in the art to provide an oxygen-impermeable sealing means and therefore a closed, so called "shelf-stable" capsule.

A breakable portion of the capsule outlet wall can be thus provided, for example, by at least one through-opening closed by a sealing membrane.

The sealing membrane, when provided as a "sandwich" of several materials coupled together, may include—except for the oxygen impermeable materials—areas where one or more materials are non continually present, thus generating "islands" or "slots" and in general areas of the sealing membrane where one or more materials are missing. In said areas the mechanical characteristics of the sealing membrane differ and/or the passage of the liquid is differently affected.

The capsule beverage outlet(s), e.g. the openings closed by the sealing membrane are opened by the conveyor cap due to a relative movement between the capsule and the conveyor cap. More in detail, according to a possible embodiment, the sealing membrane is opened by opening means of the conveyor cap. The opening means of the conveyor cap can be selected between a projecting element configured to tear and/or shear and/or perforate and/or deform said sealing membrane, and an abutting portion of the conveyor cap for at least one projecting element of the capsule. A combination of the opening means of the conveyor cap is also possible.

Preferably, the sealing membrane can be opened by applying a pressure on said sealing membrane.

More in detail, according to possible embodiments, said opening means of the conveyor cap, for example comprising at least one projecting element, are configured to tear and/or shear, and/or perforate, and/or deform (e.g. plastically deform), the sealing membrane, preferably accordingly to the shape of the relevant part of the conveyor cap.

In other words, according to possible embodiments, the sealing membrane is opened by the opening means of the conveyer cap by tearing (e.g. lacerating), or by shearing, or by perforating (e.g. puncturing or piercing), or by deforming (e.g. plastically deforming) the sealing membrane. The one or more way(s) of opening the sealing membrane mentioned above, can be combined thus having in a capsule two or more way(s) of opening.

It has to be noted that the opening way by "deformation" of the sealing membrane in the present disclosure is used to indicate that the relative movement between the capsule and the conveyor cap (and in particular the contact of opening means of the conveyor cap with the sealing membrane) determines a deformation (e.g. a plastic deformation) or movement of the sealing membrane. For example, the sealing membrane can be detached or moved from its constraining portion with the capsule body, for example from the annular area where the sealing membrane is constrained (for example welded or glued) to the capsule body, preferably at the outlet wall thereof.

According to another possible embodiment, preferably when the sealing membrane is arranged above (upstream) the through-opening, an abutting portion of the conveyor cap is intended to contact at least one projecting element of the capsule, preferably arranged in correspondence of said through-opening, thus causing the projecting element of the capsule to be moved towards the internal volume of the capsule thus causing a rupture of the sealing membrane. In general, according to the invention, to open the capsule beverage outlets, the conveyor cap comprises opening means, preferably arranged within the enclosure space between cap and outlet wall of the capsule.

According to an exemplary embodiment of the invention, the opening means comprises a projecting element and/or an abutting portion of the conveyor cap directed towards the capsule's outlet wall to perforate said outlet wall of the capsule and provide at least one opening for dispensing the beverage. Advantageously, the projecting element of the conveyor cap is configured to apply a pressure on the beverage outlets provided in the outlet wall of the capsule, thus causing an at least partial opening thereof. In an exemplary embodiment, the element projecting from the conveyor cap opens the outlets by perforation, i.e. the projecting element of the conveyor cap breaks the bottom wall to provide an opening. As already mentioned above, according to an embodiment, the opening means of the conveyor cap comprises at least one projecting element configured to tear and/or shear, and/or perforate, and/or deform, the sealing membrane, accordingly to the shape of the relevant part of the conveyor cap. One or more of the above-disclosed opening way(s) of the sealing membrane can be used in the same capsule, e.g. at least part of the sealing membrane can be perforated (e.g. punctured or pierced) and at least part of the sealing membrane can be torn (e.g. lacerated). In an exemplary embodiment, the projecting element is housed in the opening created in the outlet wall of the capsule; the projecting element also extends into the body of the capsule and blocks at least in part the flow of the beverage from inside of the capsule to the outside, e.g. to a cup. Because the opening for the beverage is at least partially obstructed (i.e. closed) by the projecting element, the water pumped into the capsule will not be able to immediately exit through the opening and it will thus increase the pressure within the capsule until the pressure in the capsule is sufficiently high to deform the outlet area of the outlet wall around the projecting element and provide a higher flow-rate of the beverage from the capsule. Thus, the projecting element on one side completely opens the outlets for the beverage, on the other helps in building up an internal pressure in the capsule to provide better extraction of the beverage components from the ingredient for the beverage. Reference is here made to EP 1549185, in the name of the present applicant, for further details of the above mentioned pressure assisted delivery of the beverage. In other exemplary embodiments, the outlet wall of the capsule has a plurality of outlets provided with portions projecting from them towards the outside of the capsule; the outlets are closed and seal the capsule, and they are opened under the action of an abutting portion of the conveyor cap that is configured to apply a pressure on a projecting element of the capsule beverage outlets.

As mentioned above, according to an embodiment, at least one projecting element of the capsule, preferably arranged at the outlet wall, project towards the outside of the capsule and are intended to be contacted by an abutting portion of the conveyor cap that is configured to apply a pressure on a projecting element thus causing a movement thereof towards a sealing membrane causing its opening. As mentioned above, according to this embodiment, the sealing membrane is arranged above (upstream) the at least one through-opening of the outlet wall.

Opening of the outlets may be purely mechanic, by the pressure of the cap onto the projecting portions of the outlet wall of the capsule (see for example EP2628694, in the name of the applicant); opening step may also be a combination of mechanical action by the cap with the pressure formed by the beverage inside the capsule (see for example EP1960293, in the name of the applicant).

More in detail, the opening means of the conveyor cap comprises at least one projecting element arranged at the inner surface of the cap (i.e. the inner surface with respect to the enclosure formed between cap and capsule) and directed towards said outlet wall of the capsule to apply a pressure on said breakable portion of the outlet wall, following the relative movement between the capsule and the conveyor cap. The projecting element(s) of the conveyor cap according to different possible embodiments breaks a breakable portion of the outlet wall, e.g. defined by at least one thinned portion or groove of the outlet wall, or to tear and/or shear, and/or perforate, and/or lacerate, and/or deform, and/or puncture, accordingly to the shape of the relevant part of the conveyor cap, the sealing membrane intended to seal (close) at least one through-opening of the outlet wall.

As already mentioned above, according to a possible embodiment, the capsule beverage outlet comprise a projecting element, preferably arranged at said breakable portion. The opening means of the conveyor cap comprises an abutting portion for the projecting element of the capsule beverage outlets.

Thus, exemplary embodiments of the capsule assembly of the invention have opening means that include at least one projecting element and at least one beverage outlet area of the outlet wall defined by a groove of reduced thickness with respect to the rest of the outlet wall, or defined by at least one through-opening and a sealing membrane. Perforation is carried out at said outlet area. The at least one projecting element may be provided on the inner surface of the conveyor cap and be configured to open the beverage outlet of the capsule by applying a pressure, e.g. by compression, following the relative movement between the capsule and the conveyor cap. In an embodiment, the sealing membrane closing the at least one through-opening of the capsule is opened by opening means of the conveyor cap, due to relative movement between the capsule and the conveyor cap. The opening means of the conveyor cap are configured to tear and/or shear, and/or perforate, and/or lacerate, and/or deform, and/or puncture, the sealing membrane accordingly to the shape of the relevant part of the conveyor cap.

In another exemplary embodiment, the at least one projecting element may be provided on the outer surface of the outlet wall of the capsule, in correspondence to said outlet areas defined by grooves, i.e. lines, of reduced thickness or defined by at least one through-opening of the outlet wall and at least one sealing membrane; in these embodiments the conveyor cap may be free of projecting portion and be provided with an abutting surface that will contact the projecting elements of the outlet wall to push them inside the capsule following the relative movement between the capsule and the conveyor cap, so as to open the mentioned beverage outlet areas. According to an embodiment, as for example disclosed in the co-pending patent application in the name of the same applicant and having the same filing date of the present patent application, the capsule beverage outlet comprise a projecting element or projecting portion, and a housing of the outlet wall thus providing a breakable portion of the outlet wall. More in detail, the projecting element (portion) of the outlet wall is extending outwards of the capsule with at least a part of an inner face of the projecting element spaced from the inner side of the outlet wall to provide a housing in the outlet wall. The housing is empty when the beverage is not dispensed (e.g. in a closed condition of the capsule) and is intended to receive at least part of the projecting element (portion) when the beverage is dispensed from the capsule (e.g. in the open condition of the capsule).

In other words, according to an embodiment, as disclosed in the co-pending patent application, when the capsule is closed the inner face of the projecting element (portion) of the outlet wall is substantially co-planar with the outer face of the outlet wall, at least in the area where the projecting portion is located, thus providing a breakable portion of the wall. Also according to this embodiment, the conveyor cap may be free of projecting portion and can be provided with an abutting surface that will contact the projecting elements of the outlet wall to push them inside the capsule following the relative movement between the capsule and the conveyor cap, so as to open the mentioned beverage outlet areas.

A combination of the above mentioned embodiments may be possible. As above discussed, the conveyor cap has a guiding element provided on its lateral side, to cooperate with the side wall of the capsule (e.g. a part of the lateral wall or a flange protruding from the capsule) in order to guide the movement between conveyor and capsule in the opening step of the capsule.

According to a possible embodiment, the conveyor cap includes air passages to let air flow between the outer space immediately outside the capsule and the enclosure space defined by the conveyor cap and the outlet wall of the capsule; air may flow in either direction. The air passages are located at a plane that is different from the plane where said beverage delivery openings of the cap conveyor are located. Said openings may be arranged in a symmetrically rotational pattern with reference to the central axis of the capsule.

According to different possible embodiments, the at least one capsule beverage outlet can be provided centrally and/or peripherally with respect to a central axis of the capsule. Also the at least one beverage delivery opening can be arranged centrally and/or peripherally.

According to a possible embodiment, the conveyor cap has at least one centrally located beverage delivery opening and at least one capsule beverage outlet of the capsule is located offset with respect to the at least one beverage delivery opening of the conveyor cap.

According to an embodiment, the capsule has a plurality of capsule beverage outlets located peripherally and the conveyor cap has a central beverage delivery opening. According to an embodiment, the one or more capsule beverage outlets are extending radially with respect to a central axis of the capsule. According to different possible embodiments, the beverage outlets can be inclined with respect to a central axis of the capsule, for example the beverage outlets can extend along a substantially straight line, the straight line being inclined with respect to the central axis of the capsule, e.g. being not directed toward the central axis.

It is also possible that the beverage outlets extend along a curved line, e.g. along an arch-shaped line. The curved beverage outlets can be arranged concentrically with respect to the central axis, or inclined with respect to the central axis.

As is known, in use in a beverage-dispensing machine, the capsule is positioned in a capsule holder device. According to an embodiment of the invention, the conveyor cap further comprises a wall extending around the beverage outlet to protect at least a part of the capsule holder from being contacted by the beverage during the beverage dispensing step. In some cases, such as when the capsule is used to provide milk for an infant, the wall protruding from the conveyor cap is extending to cover all of the conveyor wall, so as to give an enhanced protection, in terms of food safety, and quality, in terms of impeding any flavour crossover, to the beverage dispensed from the capsule.

Additionally, according to a possible embodiment, to prevent or reduce contacts of the beverage with the capsule holder and provide a control of the flow of beverage from the conveyor cap, the beverage delivery opening, preferably a central beverage delivery opening, of the conveyor cap can be provided with an element, preferably a conical element, to guide the beverage flow leaving said enclosure space.

The present invention also relates to a system for preparing a beverage from capsule assembly as herein disclosed and/or claimed and a holder for said capsule assembly. The system for the beverage preparation is configured to provide a relative movement between the capsule and the conveyor cap to open said capsule beverage outlets. Advantageously, the opening of the capsule by means of the conveyor cap, following a relative movement between these two components, which is obtained preferably mechanically, allows to provide an effective opening of the capsule beverage outlets without the need of using dedicated perforation means of the system for the beverage preparation and also without the need of relying only on the build up, i.e. the increase, of the pressure inside the capsule following the injection of liquid therein as a means of opening the capsule and deliver the beverage.

In fact, according to a preferred embodiment, the opening is carried out mechanically by the relative movement between the capsule and the conveyor cap. In some embodiments, the pressure generated by the water may help to open the capsule's outlet wall as disclosed in EP 1960293; in other embodiments, the pressure inside the capsule helps in controlling the dispensing step of the beverage as disclosed in EP 1549185 or EP 1549184, all in the name of the present applicant.

According to an embodiment, the holder for the capsule assembly is at least in part insertable in a holder seat of the system (e.g. a holder seat of a dispensing machine), and the relative movement between the capsule and the conveyor cap to open said capsule beverage outlets is provided when the assembly is housed in the holder, the holder is inserted in said holder seat and, by providing said relative movement for instance via a lever present in the dispensing machine, the system achieves a seal-tight quality.

In a different embodiment the capsule may be inserted into the dispensing machine and the machine provides closing to a seal-tight quality via a servo-controlled motor, for instance activated by a button pressed by the user. It has to be also noted that, according to a possible embodiment, the capsule holder may be a fix component of a dispensing machine.

According to an exemplary embodiment, the holder is dimensioned to be in contact with a part of the conveyor cap of said assembly that is spaced from the beverage outlet of the conveyor cap, so as to avoid or reduce points of contact between said beverage and said capsule holder. The capsule holder is provided with a hole or passage for dispensing the beverage or liquid food product without the latter contacting the holder; the holder is also free of means to direct the beverage to the cup or other final container: the beverage flow is controlled and directed by the conveyor cap, only.

The invention also refers to a method of preparing a beverage from a disposable capsule assembly, including the step of dispensing said beverage from said capsule into an enclosure space defined by said capsule and a conveyor cap mounted on the outlet wall of said capsule. The method comprises the step of providing a relative movement between the capsule and the conveyor cap to open the capsule's beverage outlets, whereby the side wall of the capsule guides the movement of the conveyor cap.

It has to be noted that features and aspect disclosed and/or claimed herein with respect to the capsule assembly and/or to the system for the beverage preparation can be applied to the method.

According to an embodiment, the method comprises the step of providing dedicated means to allow a flow of air directed into said enclosure space, or from said enclosure space to the outside, so as to reduce or cancel the difference between the pressure in the said enclosure space and the ambient pressure.

The air flow is fed to the enclosure space above the level of the flow of beverage. In an embodiment, the air flow fed to the enclosure space is directed to contact the flow of beverage.

The invention provides several advantages with respect to the prior art. The assembly and the system make it possible to avoid using a fixed collector for the beverage, that needs maintenance and periodic cleaning, since the collector is replaced by the conveyor cap and the appropriate drink outlet means of the conveyor cap.

It is no longer necessary to clean the dispensing machine in which the capsule is used after a few dispensing cycles or after each cycle to avoid cross contamination or potential development of bacteria from stale residues. In cases where sensitive beverages are dispensed, e.g. infant milk, the capsule provides a full protection of the beverage because there is no contact between areas of the capsule in direct contact with foodstuffs and the capsule holder; in fact, it is possible to use the same dispensing machine for very different beverages, from the mentioned infant's milk to coffee to an onion soup without any need to clean the machine's outlet since the outlet is part of the capsule assembly, namely is part of the conveyor cap.

Another advantage is that the air entering the enclosure chamber is mixed with the beverage to provide a greater amount of emulsion and of the "froth" layer on top of the coffee in the finished drink. Different configurations of the air ducts in the conveyor may allow to control the total amount of froth in the finished drink or beverage.

BRIEF DESCRIPTION OF THE DRAWINGS

The invention will now be disclosed in greater details with reference to the attached drawings that refer to non limiting embodiments of the invention, where:

FIG. 18b is a perspective enlarged view of the capsule of the capsule assembly of FIG. 18a;

FIG. 18c is a perspective bottom view of the capsule of the capsule assembly of FIG. 18a;

DESCRIPTION OF THE INVENTION

Figure 1:
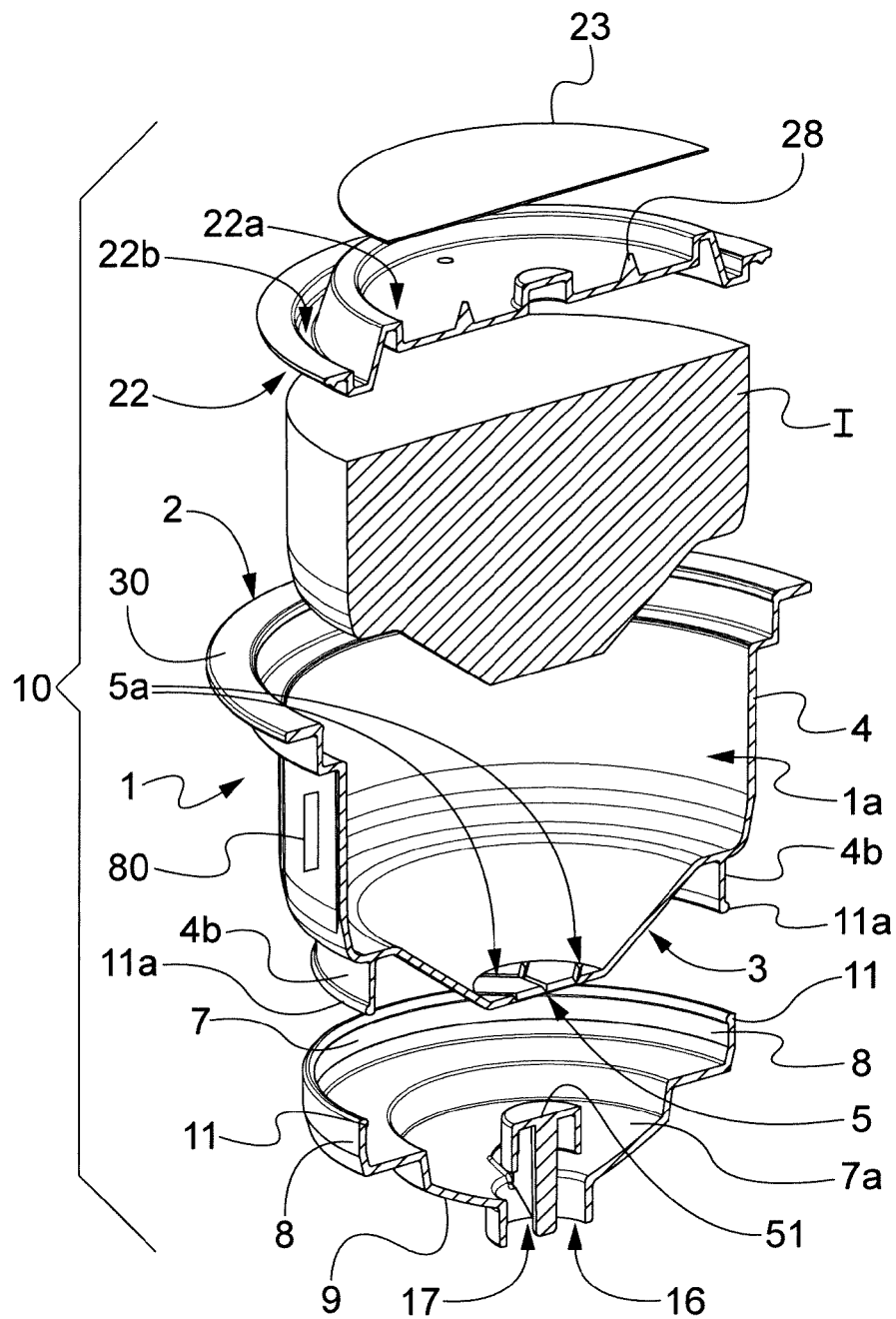
FIG. 1 shows a sectional and exploded view of a first possible embodiment of a capsule assembly according to the present invention comprising a rigid lid at the inlet wall and capsule beverage outlet comprising at least one breakable portion intended to be opened by a projecting element of the conveyor cap.
Figure 1A:
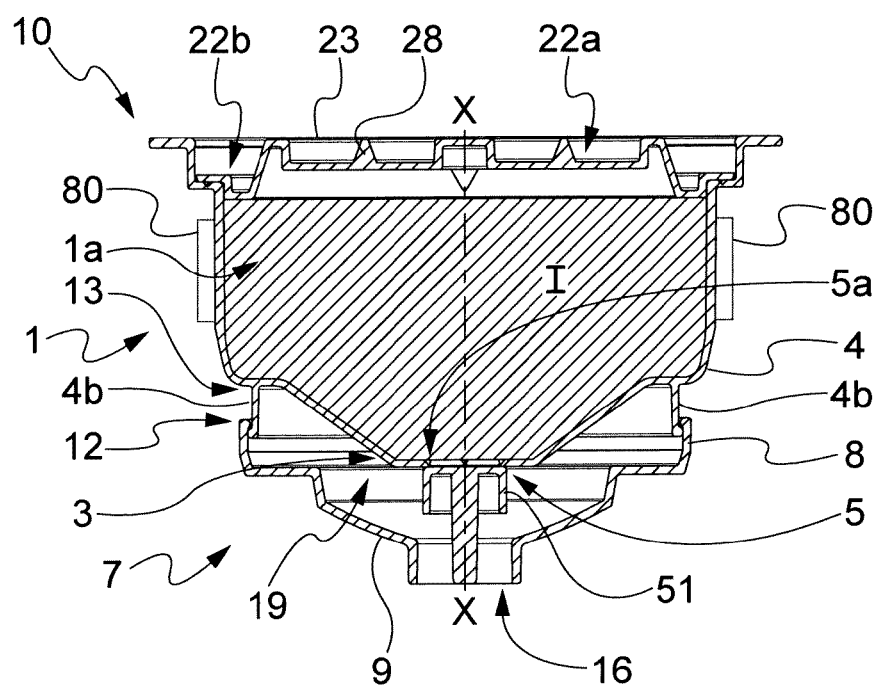
FIG. 1a is a front section view of the assembly according to FIG. 1.
Figure 1B:
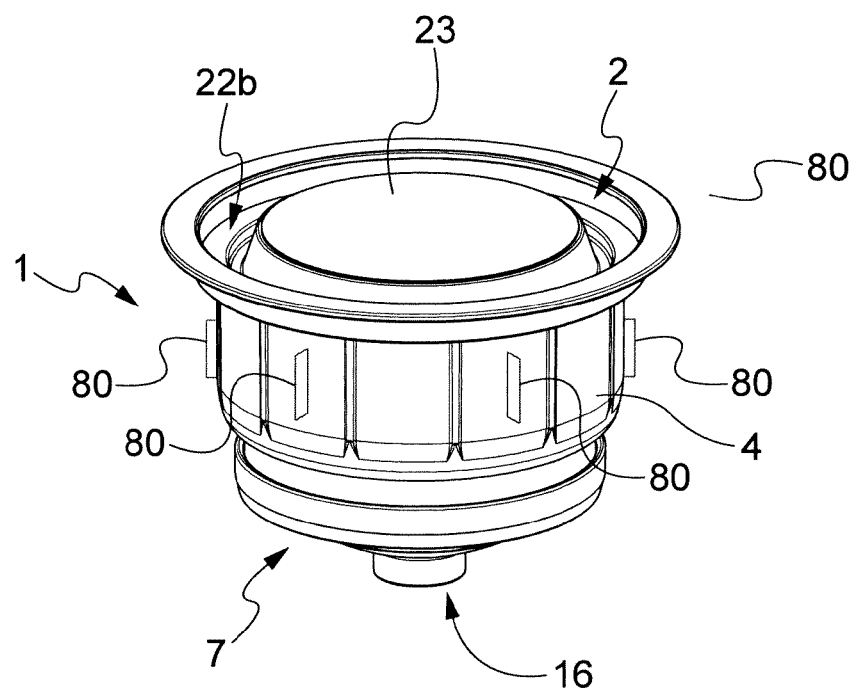
FIG. 1b is a perspective view of the assembly according to FIG. 1.

With reference to attached figures, the exemplary embodiments shown, refer to a capsule assembly 10 that comprises a capsule 1 for preparing a beverage and a conveyor cap 7 mounted on the capsule, at the outlet side of the capsule. The capsule has an inlet wall 2, an outlet wall 3 and a lateral wall 4 defining an internal volume 1a inside which at least one product (e.g. at least one beverage ingredient I) is housed. The product is mixed with a liquid or solvent (e.g. water under pressure) to prepare the beverage. With the word "beverage" it is encompassed all types of liquid foods that can be prepared in a capsule, such as coffees, teas, cappuccinos, including soups and instant milk, particularly milk for infants and soups for small children.

It can also serve the purpose to provide mixing between a solvent, e.g. water or milk, and a liquid or solid concentrate, where the solvent is injected at ambient (e.g. 20° C.) or even lower temperature, or anyway at a temperature lower than the temperature range (80-95° C.) usually utilised for hot drinks preparations.

Capsule 1 has at least one capsule beverage outlet 5 located in outlet wall 3; said outlet is preferably closed and it remains closed until the start of the beverage preparation. In fact, the opening of the capsule beverage outlets 5 is preferably done mechanically, e.g. by compression and/or perforation, due to the relative movement between the capsule 1 and a conveyor cap 7 of the capsule.

More in detail, the assembly 10 according to the invention is provided with a conveyor cap 7 that is produced separately from the capsule body, i.e. it is originally a separate piece that is mounted on the capsule 1 to define an enclosure space 19 between the outlet wall 3 and an inner surface 7a of the conveyor cap. According to an embodiment, the conveyor cap has a surface at least equal to ¼ of the one of the inlet wall or of the outlet wall, preferably at least equal to ½ of the one of the inlet wall or of the outlet wall.

The capsule 1 and the conveyor cap 7 can be produced by a process, and also by using materials, known in the art. For example, the capsule 1 and/or the conveyor cap 7 can be made by plastic material, using for example a thermo-injection molding process or a thermo-forming process. The capsule 1 and the conveyor cap 7 can be also produced by different processes, for example one produced by molding and the other produced by thermoforming or co-injection.

The capsule 1 and/or the conveyor cap 7 may be provided with a layer that acts as a barrier to oxygen and gas permeation.

A suitable known barrier material is e.g. EVOH, that can be e.g. present as a multilayer structure with polypropylene such as PP-EVOH-PP or with polystyrene and/or polyethylene, such as PS-EVOH-PE, or other multilayer structures available to the skilled in the Art; these materials are cheaper than aluminium. The multilayer structure may be a laminate to be used in thermoforming; alternatively, the multilayer structure is obtained by co-injection moulding of the capsule body; co-injection of coffee capsules is a technique commonly known to the skilled person. The barrier may be also provided externally as a coating. A further type of barrier can be obtained by adding suitable nanocomposite to the plastic material. The conveyor cap is mounted on the capsule body so as to be retained on it and to be movable with respect to the capsule body.

Once coupled to—i.e. mounted on—the capsule 1, conveyor cap 7 defines with the outlet wall 3 of capsule 1 a space to which reference is here made as to enclosure space 19; enclosure space 19 is the space where the beverage that exits capsule 1 is fed, at a pressure that can be from relatively low pressure to high pressure preferably to be mixed with air and to be directed to the final container (e.g. a cup) by means of conveyor cap 7.

Figure 3:
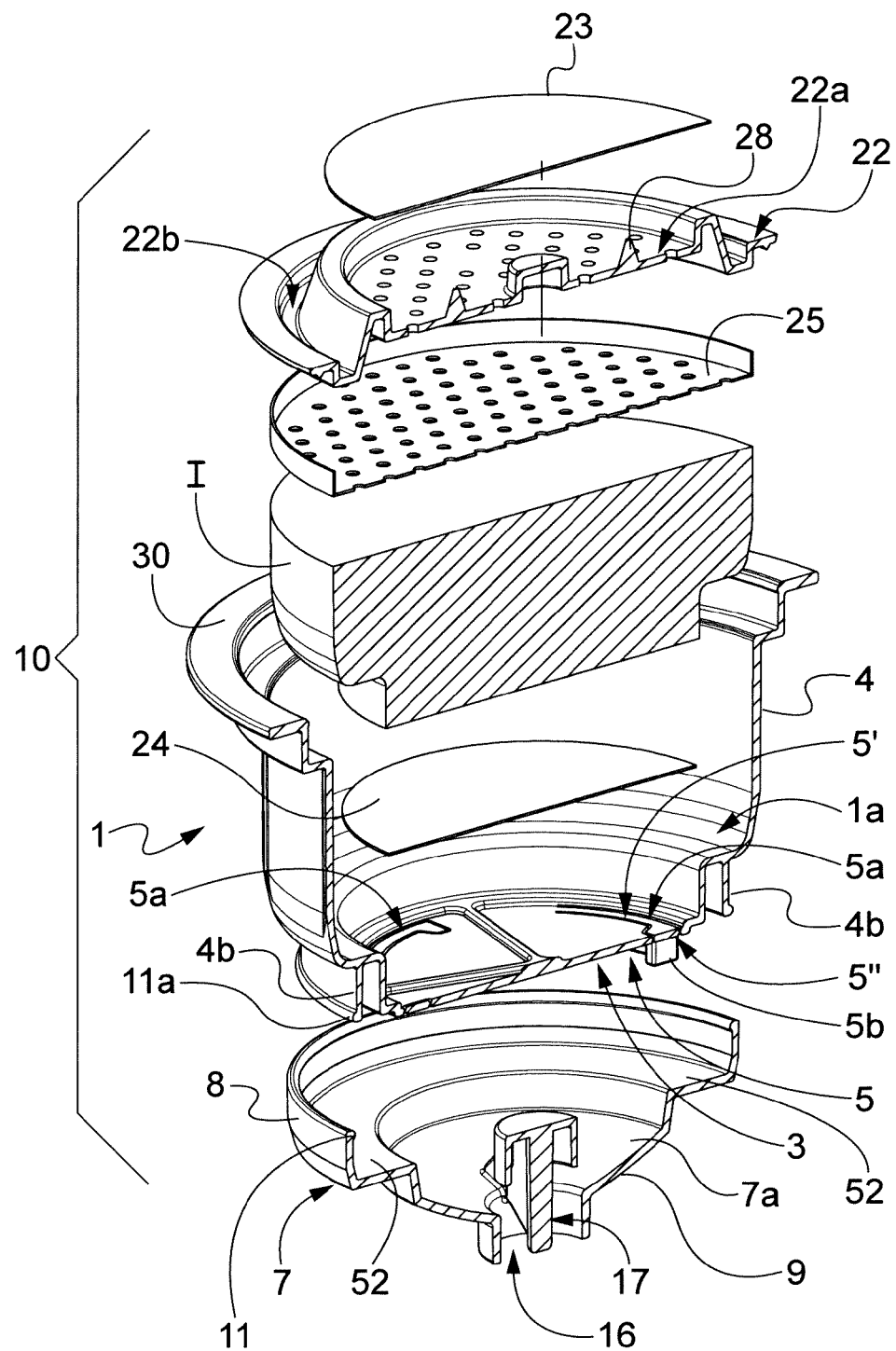
FIG. 3 shows a sectional and exploded view of a third possible embodiment of a capsule assembly according to the present invention comprising a rigid lid at the inlet wall, an internal partition element, and capsule beverage outlet comprising at least one breakable portion having a projecting element intended to be opened by an abutting portion of the conveyor cap.
Figure 3A:
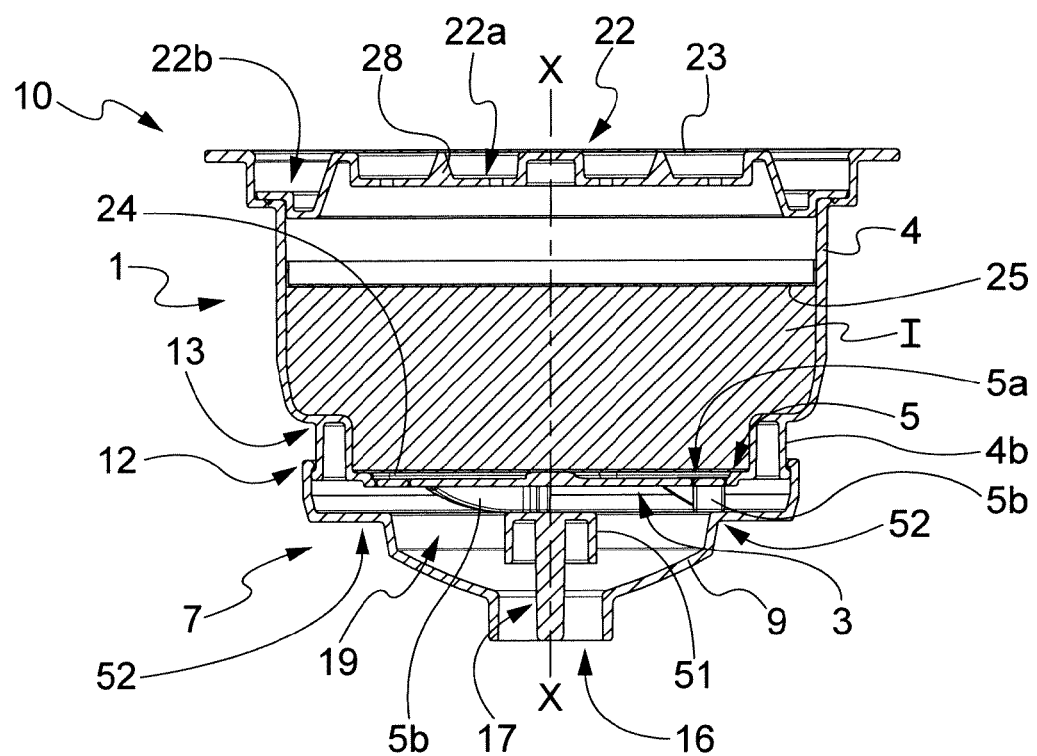
FIG. 3a is a front section view of the assembly according to FIG. 3.
Figure 3B:
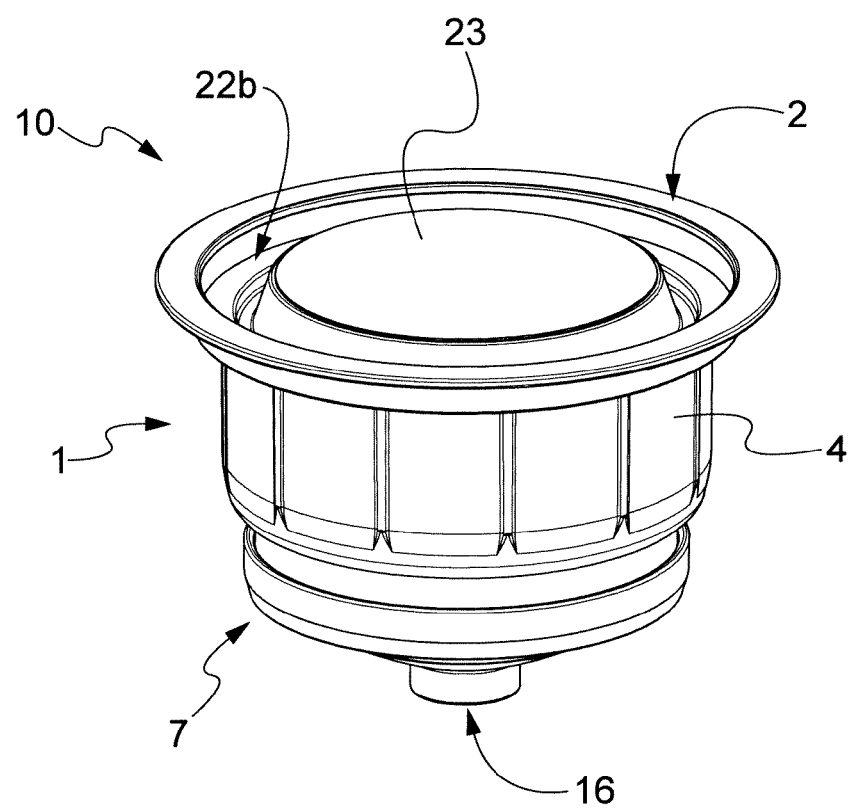
FIG. 3b is a perspective view of the assembly according to FIG. 3.
Figure 3C:
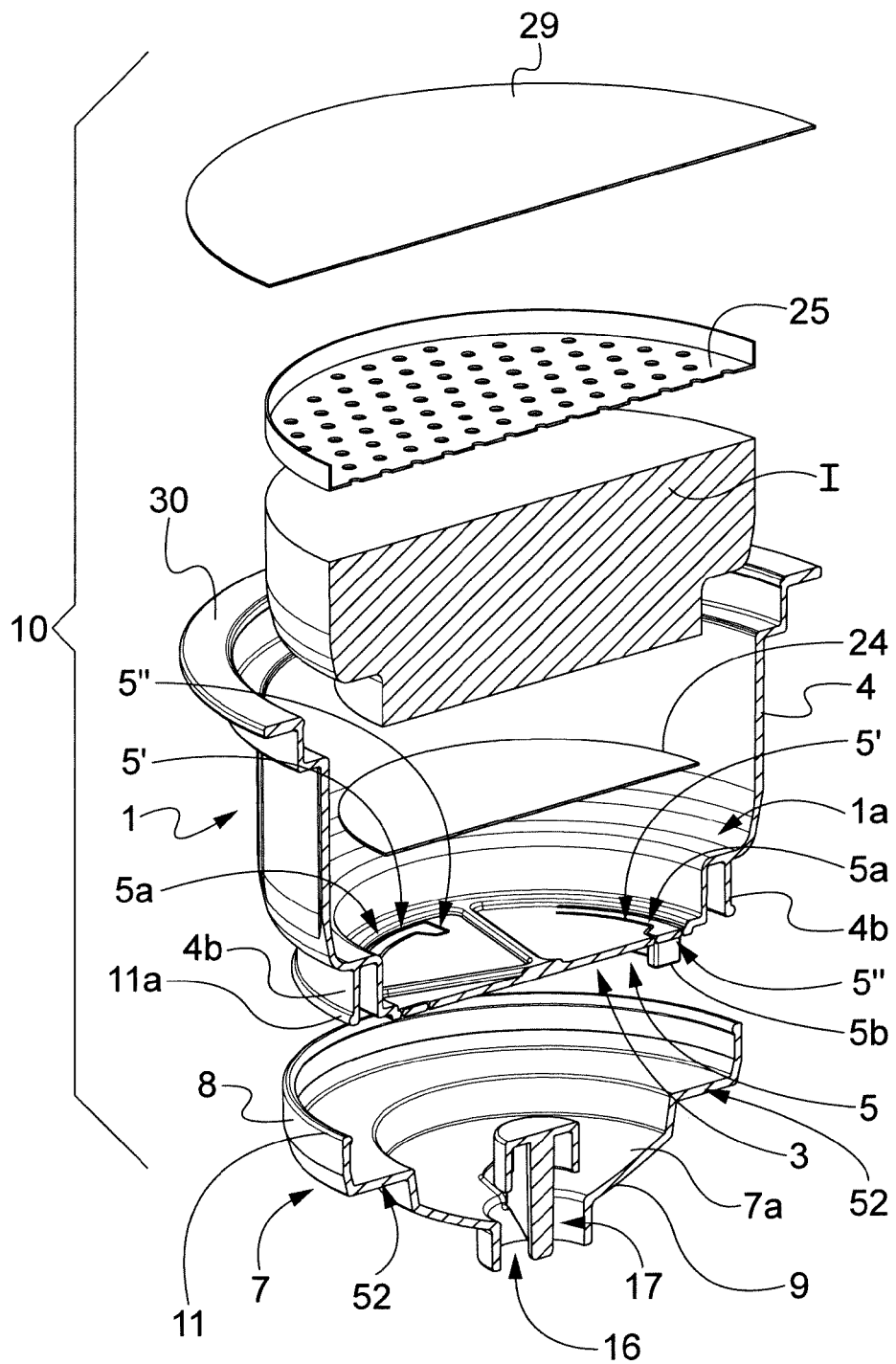
FIG. 3c shows a sectional and exploded view of a capsule assembly according to FIG. 3, wherein a membrane is arranged at the inlet wall instead of a rigid lid.
Figure 4:
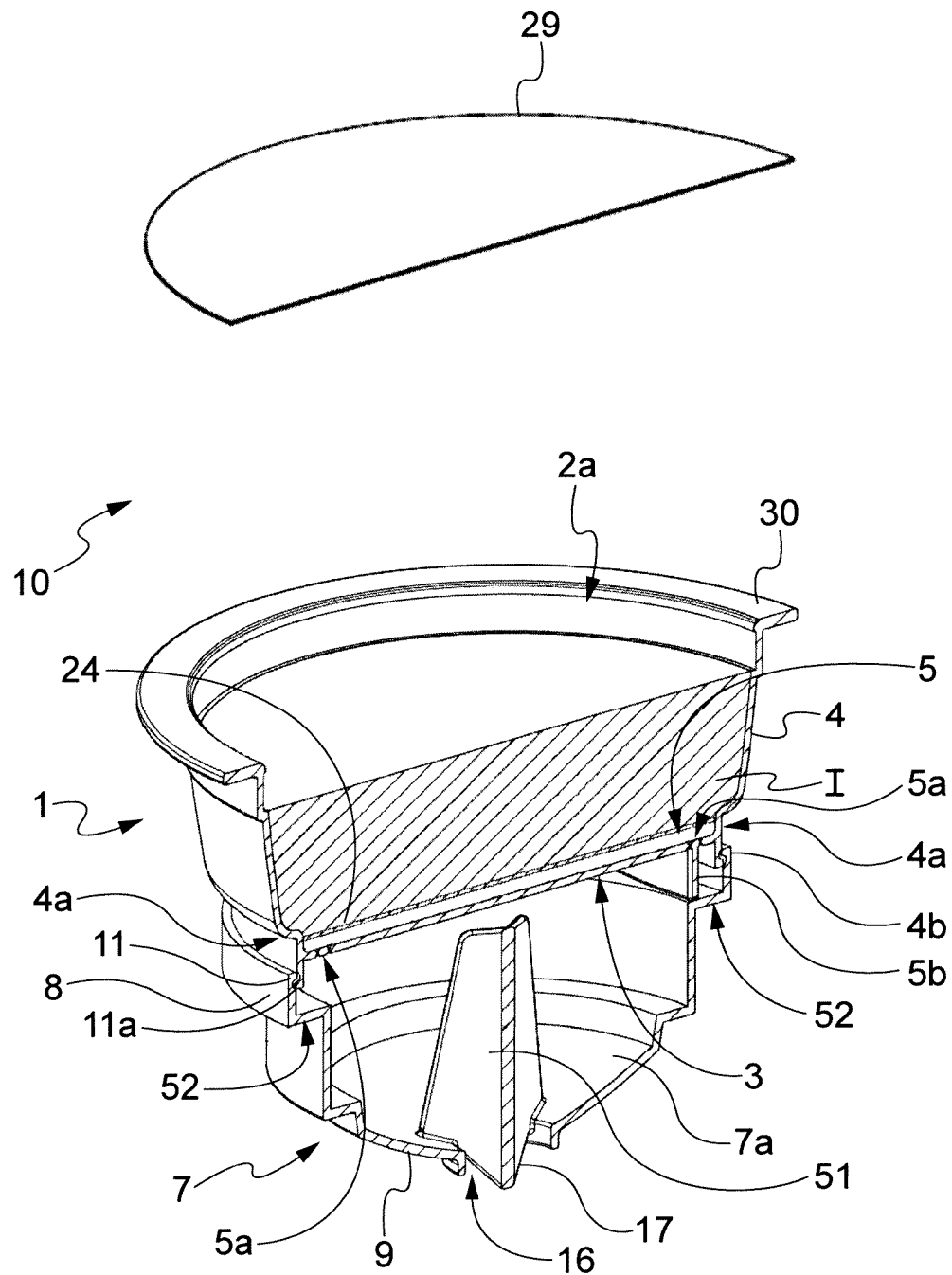
FIG. 4 shows a sectional and exploded view of a fourth possible embodiment of a capsule assembly according to the present invention comprising a membrane at the inlet wall, a capsule having a reduced volume, and capsule beverage outlet comprising at least one breakable portion having a projecting element intended to be opened by an abutting portion of the conveyor cap.
Figure 5:
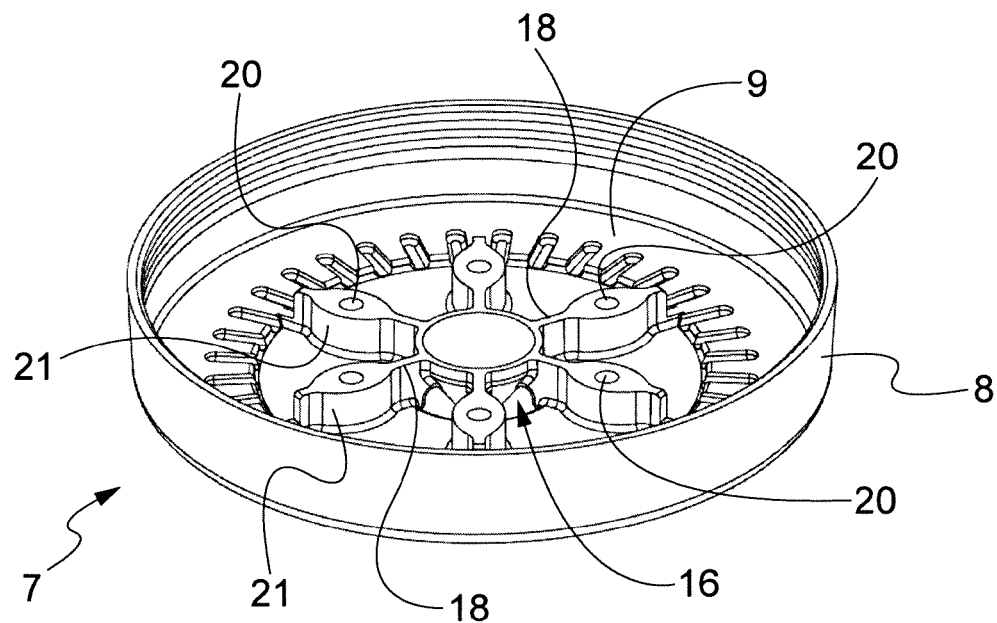
FIG. 5 and FIG. 6 are perspective views of further possible embodiments of a conveyor cap according to the invention respectively from the inner side and the outer side, with respect to the enclosure space created by the coupling of cap and capsule.
Figure 6:
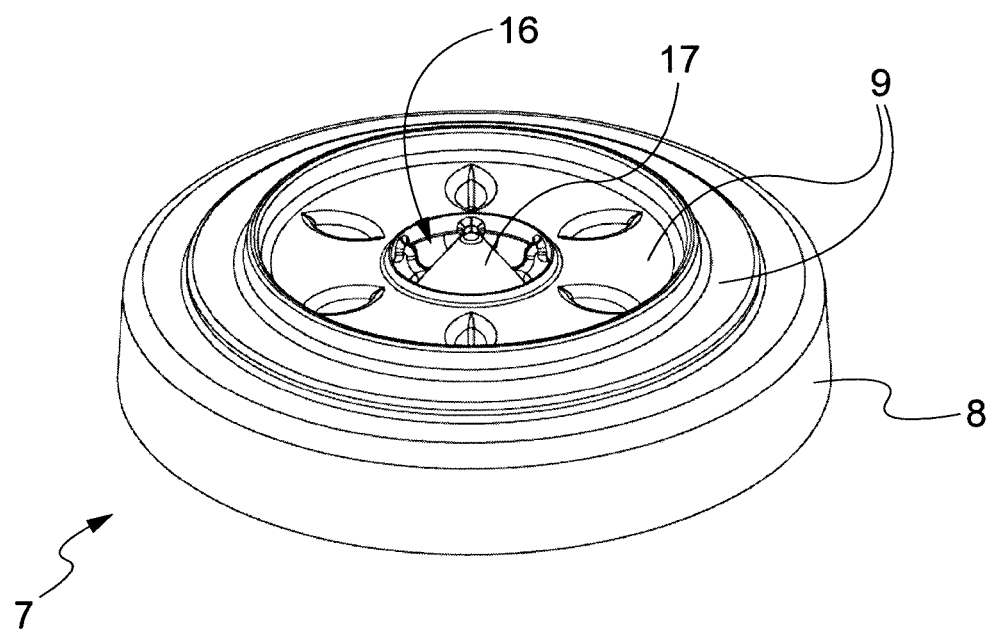

In the embodiment shown in FIGS. 1-4, the conveyor cap 7 is substantially cup shaped or concave (e.g. externally dome shaped), however different embodiments can be used, for example in the embodiment shown in FIGS. 5 and 6 the conveyor cap is substantially cylindrically shaped, without one of the bases of the cylinder; in FIGS. 12-17, 19, 20, 21, 22 the conveyor cap is internally dome shaped, i.e. it is convex, suitable to minimise the surfaces in contact with the liquid, yet allowing for storage volume to meet differing flow-rates and/or finished drinks bearing different liquid volumes.

The conveyor cap 7 comprises a lateral wall 8 and a base 9. The conveyor cap 7 is provided with one or more beverage delivery openings 16 to allow the exit of the prepared beverage therefrom and the collection in a suitable container, e.g. a glass or a cup. Base 9 of conveyor cap 7, once mounted on the capsule's bottom wall (i.e. capsule's outlet wall) is spaced from the outlet wall 3 of the capsule.

More in detail, the base 9 is provided with at least one beverage delivery opening 16 to function as an outlet for the beverage coming from capsule 1.

The capsule has guiding means 4a, 4b to guide the movement of the conveyor cap 7. The guiding means are selected from at least part 4a of the lateral wall 4 (preferably a bottom part 4a of the lateral wall 4) and a flange 4b protruding from said lateral wall 4 or from said outlet wall 3 of the capsule, or a combination thereof.

In other words, the conveyor cap 7 is mounted on the bottom portion of capsule 1 by superimposing at least part of the lateral wall 8 of the conveyor cap to at least part of the capsule body. In fact, the capsule has guiding means guiding the movement of the conveyor cap and said cap has a lateral portion bearing a shape complementary to the part of the lateral wall of the capsule, or complementary to the flange of the capsule, with which the conveyor cap cooperates.

According to an embodiment, the conveyor cap 7 is mounted on the bottom portion of capsule 1 by superimposing at least part of the lateral wall 8 of the conveyor cap to at least part 4a (preferably a bottom part 4a) of the lateral wall 4 (see for example FIGS. 4, 7-10, 19a-19f).

According to an embodiment, the guiding means comprises a flange 4b protruding from the outlet wall 3 of the capsule (as for example shown in FIGS. 1-3, 12-17).

Figure 27:
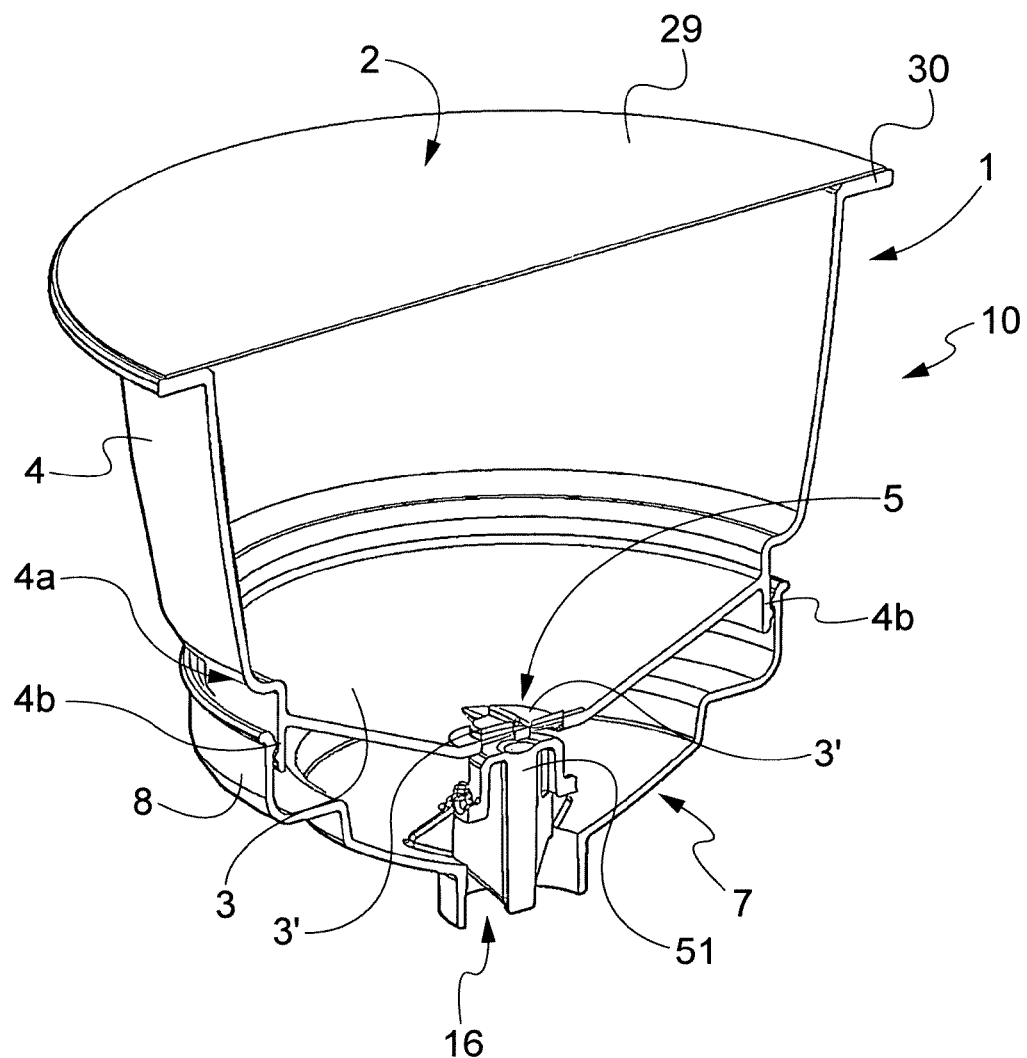
FIG. 27 shows a possible embodiment of the capsule assembly and in particular of the capsule beverage outlet comprising at least one breakable portion intended to be opened by a projecting element of the conveyor cap.

According to an embodiment, the guiding means comprises a flange 4b protruding from the lateral wall 4 of the capsule, thus providing an extension thereof (as for example shown in FIGS. 4 and 27). Therefore, according to this embodiment the guiding means comprise both a flange 4b and a part 4a of the lateral wall 4.

According to an aspect of the invention, the flange 4b is a circular flange, circularly arranged around a central axis X-X of the capsule. It has to be also noted that, according to a possible embodiment, the flange 4b is arranged at equal distance, or closer, to the central axis X-X of the capsule with respect to the lateral wall 4.

As shown in the figures, see for example FIGS. 4, and 7-10, 19a-19f, cap 7 is mounted on the bottom portion of capsule 1 by superimposing lateral wall 8 of the conveyor cap to the lower part (bottom part) 4a of lateral wall 4 of the capsule. In the embodiment shown in FIG. 4, the bottom part 4a is also extending with a flange 4b. As mentioned, in an embodiment the conveyor cap 7 is in turn provided with a flange 9a, typically protruding from the base 9, that is arranged to cooperate with the guiding means of the capsule. A possible embodiment is for example shown in FIGS. 18a-18c, wherein the capsule 1 is provided with a flange 4b (i.e. a protruding wall) that cooperates with a relevant flange 9a (i.e. a protruding wall) of the conveyor cap 7.

Preferably, the flange 4b of the capsule protrudes from the outlet wall 3 of the capsule 1. Furthermore, according to an aspect, the flange 9a of the conveyor cap 7 protrudes from the base 9 of the conveyor cap 7 and in particular from the inner surface 7a of the conveyor cap and is directed towards the outlet wall 3. In a possible alternative embodiment, the flange 4b protrudes from the lateral wall 4 of the capsule 1.

According to an aspect, the flanges 4b, 9a have substantially complementary shape. In the shown embodiment, the flanges 4b, 9a are substantially cylindrical, with a circular hollow section.

Figure 18A:
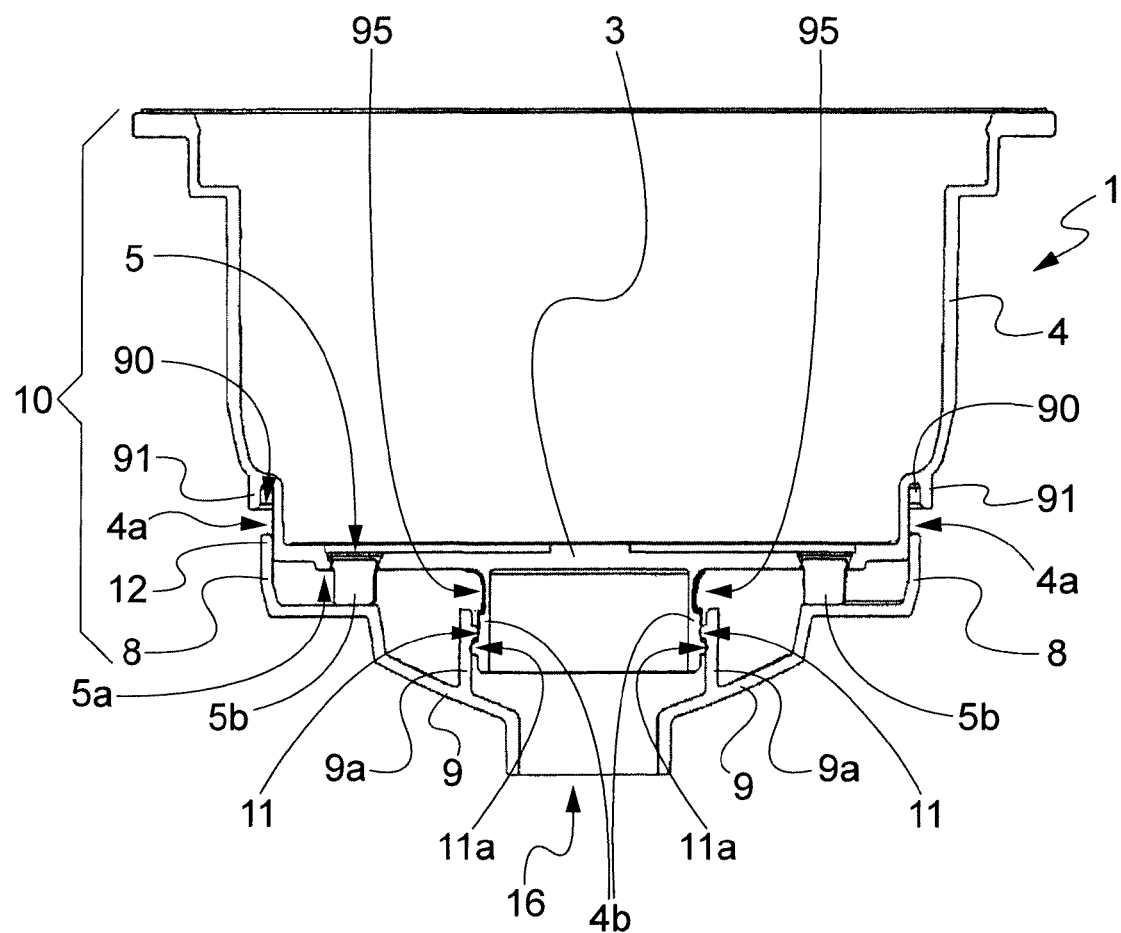
FIG. 18a is a sectional view of a capsule assembly according to a further possible embodiment.
Figure 18B:
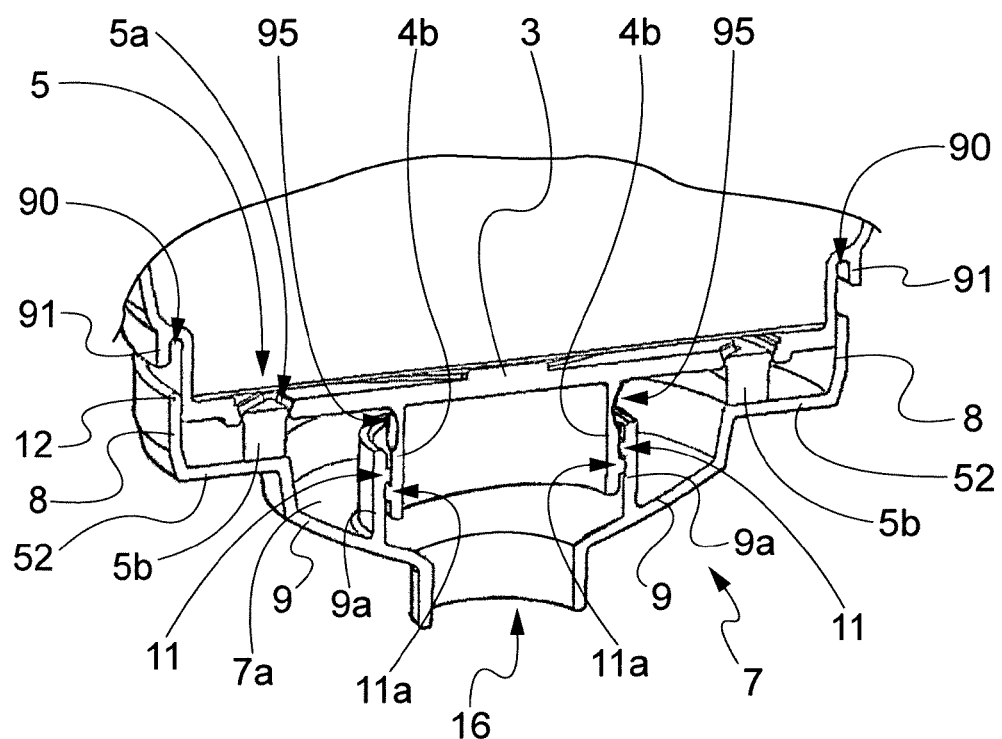
Figure 18C:
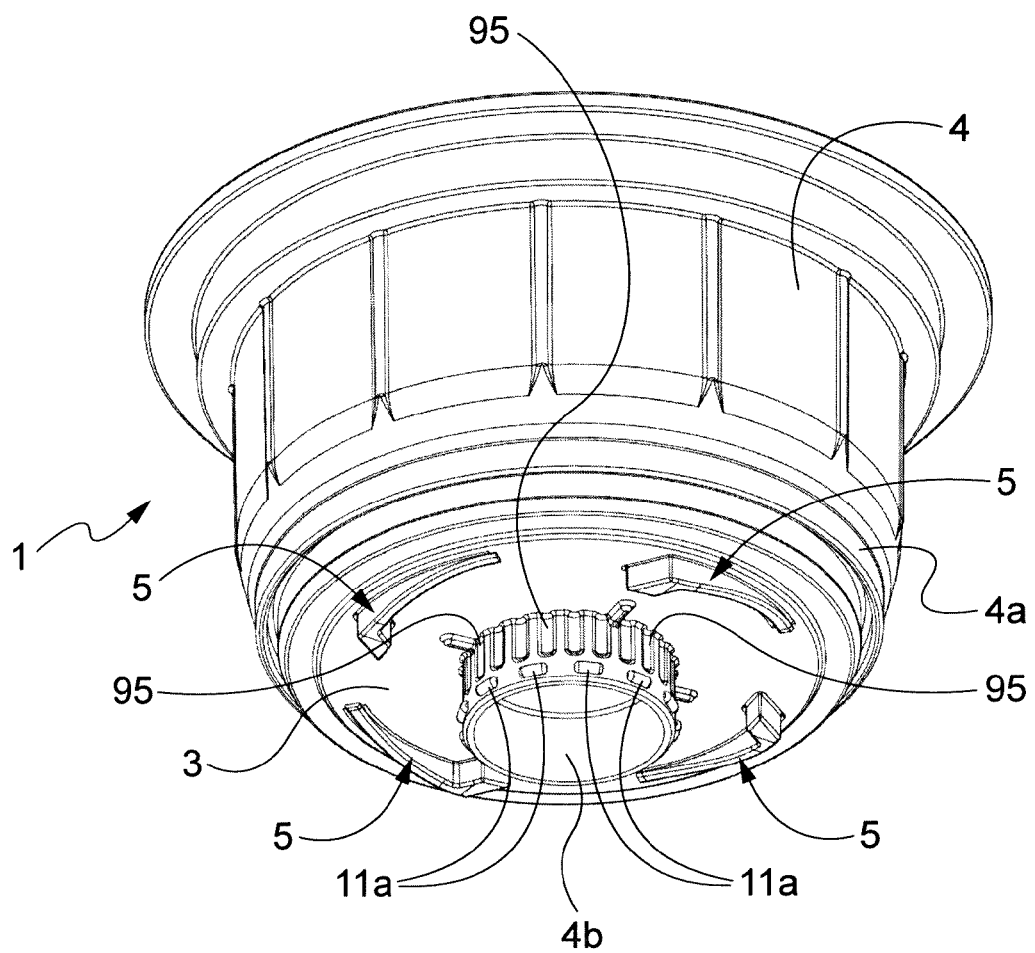

As for example shown in FIGS. 18a-18c, according to a possible embodiment, the capsule 1 and the conveyor cap 7 are provided with guiding means cooperating at the lateral wall 4 of the capsule (or at portion thereof) and guiding means cooperating internally with respect to the lateral wall 4 of the capsule, e.g. at a flange 4b arranged on the outlet wall 3 of the capsule.

More in detail, as for example shown in FIGS. 18a-18c, the lateral wall 4 of the capsule 1 is cooperating with the lateral wall 8 of the conveyor cap 7 to guide the relative movement of these components. The flange 4b of the capsule is cooperating with a flange 9a of the conveyor cap. As a result, the relative movement between the capsule 1 and the conveyor cap 7 is guided both by the engagement between the relevant lateral walls 4, 8 and flanges 4b, 9b of the capsule 1 and of the conveyor cap 7. In a different embodiment, not shown, the engagement between the lateral wall of the capsule with the lateral wall of the conveyor cap may be not provided. As an example, the relative movement between the capsule 1 and the conveyor cap 7 may be thus guided only via the engagement between the flanges 4b, 9a.

In the shown embodiment, the flange 9a of the conveyor cap 7 embraces the flange 4a of the capsule 1. In an alternative embodiment, not shown, the flange 4a of the capsule 1 may embrace the flange 9a of the conveyor cap 7.

In an embodiment, the flange 4b of the capsule 1 and/or the flange 9a of the conveyor cap 7, and in general the guiding means of the capsule and/or of the conveyor cap arranged in the space 19 provided between the capsule and the conveyor cap where the extracted beverage flows, can be provided with at least one groove 95 (e.g. cut-out or missing portion) or with at least one through passage (e.g. opening) to allow the passage of the beverage between the outlets 5 and the delivery opening 16. More in detail, the flange 4b of the capsule 1 and/or the flange 9a of the conveyor cap 7 can be provided with groove(s) or opening(s) or cut-outs or missing portions, to allow the passage of the beverage between the outlets 5 and the delivery opening 16.

According to a possible embodiment, as for example shown in FIGS. 18a-18c, the external surface of the flange 4b of the capsule 1 is provided with a plurality of grooves 95.

It has to be also noted that according to an embodiment, as for example shown in FIGS. 18-18c, the capsule can be provided with a seat 90 intended to house at least part of lateral wall 8 of the conveyor cap 7. More in detail a seat 90 can be arranged to house at least the top end 12 of the lateral wall 8 of the conveyor cap 7.

The seat 90 can be provided by a flange 91 laterally arranged with respect to the part 4a of the lateral wall 4, or a flange, acting as guiding means of the capsule. More in detail, the seat 90 can be formed by two walls, preferably two facing walls providing a gap there between to house at least part of the conveyor cap, preferably its lateral wall 8. It has to be noted that the two walls forming the seat 90, e.g. the lateral wall 4 and a flange 91, can be arranged to be slightly inclined one with respect to another, so as to provide a seat having a variable and preferably a reducing distance between the two walls, so as to provide friction when the conveyor cap and in particular its lateral wall 8 is inserted within the seat.

The provision of seat 90 allows to provide an effective seal tight engagement between the conveyor cap and the capsule so as to avoid fluid leakage.

In general, the surfaces of the lateral wall 8 of the conveyor cap and of the lateral wall 4 of the capsule may be configured to provide friction intended to couple and retain the conveyor cap to the capsule, thus avoiding loose coupling of these elements. The seat 90, e.g. by an additional flange 91 facing the lateral wall 4, that is intended to cooperate with the conveyor cap e.g. with the lateral wall 8, can be configured to provide the desired friction and/or to effectively avoid fluid leakage between these elements.

The conveyor cap 7 is movably mounted on the capsule 1 thus allowing the opening of the capsule. More in detail, the capsule beverage outlets 5 and the conveyor cap 7 are configured to interact so that the capsule beverage outlets are normally closed and are opened by the conveyor cap 7 due to a relative movement between the capsule 1 and the conveyor cap 7.

According to a possible embodiment, the conveyor cap 7 is movable from a distal position (for example shown in the attached figures) wherein the capsule beverage outlet are closed, and a proximal position, wherein the conveyor cap is closer to the outlet wall 3 of the capsule and provides the opening of the capsule beverage outlets. The conveyor cap 7 can be constrained in a movable manner with the lateral wall 4, for example with a lower (bottom) cylindrical part 4a of the lateral wall 4 of the capsule (as for example FIGS. 4, and 7-10, and 19a-19f). The surface of the bottom part 4a is preferably extending vertically (i.e. parallel to a central axis X-X of the capsule (e.g. an axis of rotational symmetry) as well as is lateral wall 8 of the conveyor means is also vertically extending with respect to axis X-X.

More in detail, as for example shown in FIGS. 4, and 7-10, the conveyor cap 7 is configured to laterally embrace a portion of the lateral wall 4 of the capsule, and in particular the bottom part 4a of lateral wall 4.

According to a possible embodiment, as for example shown in the FIGS. 1-3 and 12-17, the conveyor cap 7 is constrained in a movable manner with a flange 4b or part of a flange, protruding from the capsule. The flange 4b can be configured as an appendix of the lateral wall 4, e.g. as an extension of the lateral wall 4 (see for example FIG. 4), or the flange 4b may protrude from the outlet wall 3 of the capsule (see for example FIGS. 1-3, 12-17, and 18a-18c).

More in detail, according to an embodiment (as for example shown in FIGS. 1-3, 12-17 and 18a-18c), the conveyor cap 7 can be constrained in a movable manner with a flange 4b protruding substantially in correspondence of the outlet wall 3.

According to an aspect of the invention, the flange 4b is preferably extending vertically i.e. parallel to a central axis X-X of the capsule (e.g. an axis of rotational symmetry). According to an aspect of the invention, the flange 4b and the lateral wall 4 of the capsule are arranged to be concentric with respect to a central axis X-X of the capsule.

The constraint of the conveyor cap 7 with the capsule 1, allowing the relative movement between these components, can be obtained in different ways, provided that the conveyor cap is mounted on the capsule and movable with respect to it.

According to a preferred embodiment, the movement between the conveyor cap and the capsule is an axial movement, and the direction of movement is coincident with, or parallel to, a central axis X-X of the capsule (e.g. an axis of rotational symmetry). However, different movements between the conveyor cap and the capsule can be provided.

For example, an inclined direction of movement with respect to a central axis X-X of the capsule (e.g. an axis of rotational symmetry) can be provided. Also a movement with a rotation component or a combination of axial (linear) and rotation components can be also provided. For example, an helical relative movement, e.g. a screwing-like relative movement between capsule and conveyor cap, can be provided.

The movement of the conveyor cap with respect to the capsule, preferably an axial movement, allows to exert a pressure on the capsule beverage outlets 5 causing their opening.

As already mentioned above, the conveyor cap 7 is mounted movable (preferably axially movable) with respect to the body of the capsule, so as to reduce the distance between base 9 of the conveyor cap 7 and the outlet wall 3 of the capsule to provide an opening of the capsule beverage outlets 5 by exerting a mechanical action (force) on the capsule beverage outlets 5.

To provide the required movement, preferably an axial movement, lateral wall 8 (and/or a flange 9a) of the conveyor cap 7 and the capsule 1 (e.g. part 4a of the lateral wall 4 of the capsule or the flange 4b) are provided with complementary means that couple and retain the cap on the capsule and at the same time allow the required movement between these components.

Figure 17:
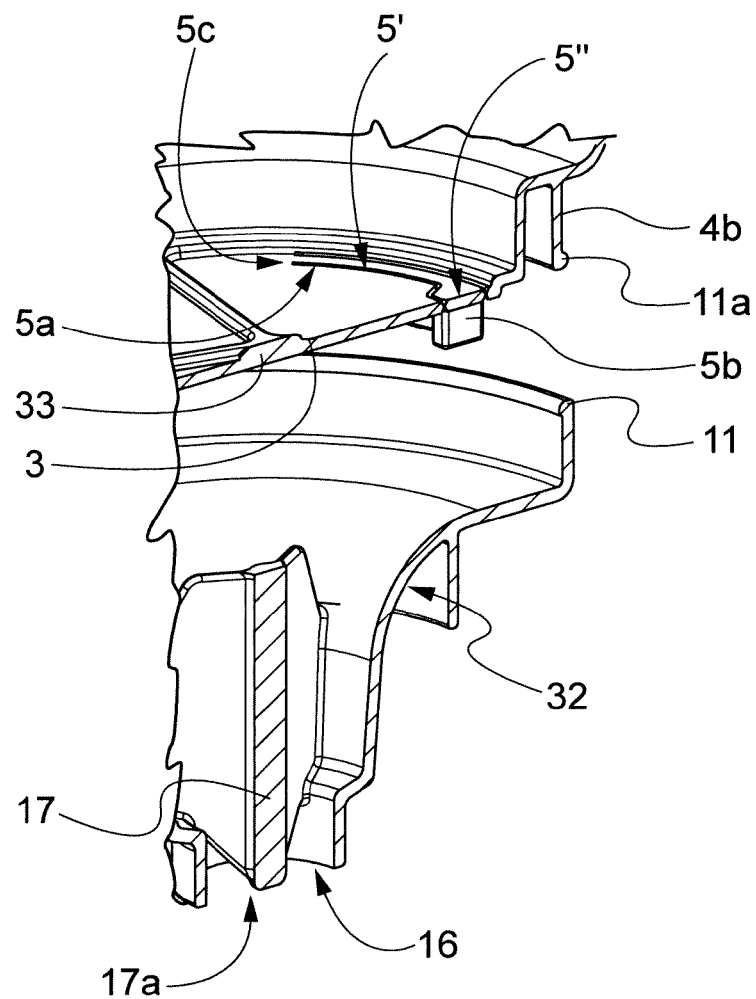
FIG. 17 is an enlarged view of a detail of the beverage outlet area of the capsule of FIGS. 12-16 and of the corresponding area of the conveyor cap.

According to a possible embodiment, an interlocking connection can be provided, comprising at least one protruding ridge 11 at the inner face of the conveyor cap 7 intended to cooperate with at least another protruding ridge 11a on the external surface of the capsule, see for example FIG. 1 and enlarged detail in FIG. 17. The protruding ridges 11, 11a, or similar interlocking elements, are both in contact with the opposite surface of the capsule's wall and of the inner side of the lateral wall 8 of the conveyor cap, respectively. Their arrangement prevents the separation of the conveyor cap from the capsule, while allowing the relative movement between these components. As previously mentioned, lateral wall 8 of the conveyor is adjacent to the bottom part 4a of the lateral wall 4 or to the flange 4b of the capsule; preferably walls 8 and 4a, 4b are substantially parallel (e.g. concentric) to each other.

In other words, according to a possible embodiment, as for example shown in FIGS. 1-4 and 12-17 and 19, two corresponding ridges 11, 11a are arranged respectively on the conveyor cap and on the capsule, and preferably on the inner surface of the lateral wall 8 of the cap 7 and on the external surface of the part 4a of the lateral wall 4 of the capsule, or on the flange 4b, to avoid separation of the capsule 1 and the conveyor cap 11 after the cap has been mounted on the capsule.

It has to be also noted that, according to a possible embodiment, as for example shown in FIGS. 18a-18c, corresponding ridges 11, 11a (at least one ridge on the cap 7 and at least one ridge on the capsule 1) are arranged respectively on the conveyor cap and on the capsule, and preferably on a surface of the flange 9a of the cap 7 and on a surface of the flange 4b, to avoid separation of the capsule 1 and the conveyor cap 11 after the cap has been mounted on the capsule.

Even if ridge 11 is provided on the inner surface of the flange 9a of the cap 7 and ridge 11a is provided on the external surface of the flange 4b of the capsule, this arrangement is not limitative and it is possible an inversion.

According to an aspect, as for example shown in FIGS. 18a-18c for the ridge 11a of the capsule, the ridge(s) and/or the groove(s) can extend along a not closed path, e.g. to provide openings or missing portions. In other words missing part of the ridge(s) or groove(s) can be seen as breaks in the path along which they extends. The openings or missing parts in the ridge(s) groove(s) allows fluid passage therethrough, so that the beverage exiting the outlet wall of the capsule can reach the delivery opening 16 of the conveyor cap.

The above mentioned arrangement of ridge(s) and/or groove(s) can be also provided in the embodiments wherein both the guiding means of the capsule 1 and the guiding means of the conveyor cap 7 comprise a flange 4b, 9a. As an example, in the embodiment shown in FIGS. 18a-18c, both the flanges 4b and 9a are provided with ridges 11, 11a.

In general, as already mentioned above, the capsule 1 may be provided with means to provide an interlocking connection with the conveyor cap 7 and thus avoid a separation (loose coupling) of the conveyor cap from the capsule.

In an alternative embodiment of the one of FIGS. 18a-18c, one (or both) of the flanges 4a, 9a may be provided with grooves, as per the grooves 14, 15 discussed here below with reference to FIGS. 5-11.

According to another possible embodiment, as for example show in FIGS. 5-11, lateral wall 4 of the capsule has a circumferential ridge 11a (or equivalent protruding element) and the inner surface of the lateral wall 8 of the conveyor cap 7 has at least one groove 14, 15 suitable to house ridge 11a. In the embodiment shown in FIGS. 5-11, there are two grooves 14, 15, that are spaced a length L, length L is not greater than the distance between top end 12 of lateral wall 8 of the cap 7 and a stop 13 located on lateral wall 4 of the capsule body. Thus, when the assembly of capsule and cap is compressed, groove 14 will be forced to leave ridge 11a and groove 15 will replace groove 14 and will house ridge 11a.

Preferably the capsule is opened by the conveyor cap by a mechanical force, i.e. without the use of the liquid pressure injected into the capsule; however, it has to be noted the pressure built inside capsule 1 by the hot water fed to it, could help to further open the capsule beverage outlets 5 opened by the mechanical interaction between the conveyor cap and the capsule beverage outlets 5 and/or to cooperate to control the flow rate of the dispensed beverage, as for example discussed in the above cited patent applications in the name of the applicant.

In general, according to possible embodiments of the invention, the capsule beverage outlets 5 comprise a breakable portion of outlet wall 3, that is preferably defined by at least one groove 5a. More in detail, the at least one groove provides an area of reduced thickness compared to the thickness of the outlet wall 3 adjacent to said groove.

Figure 2:
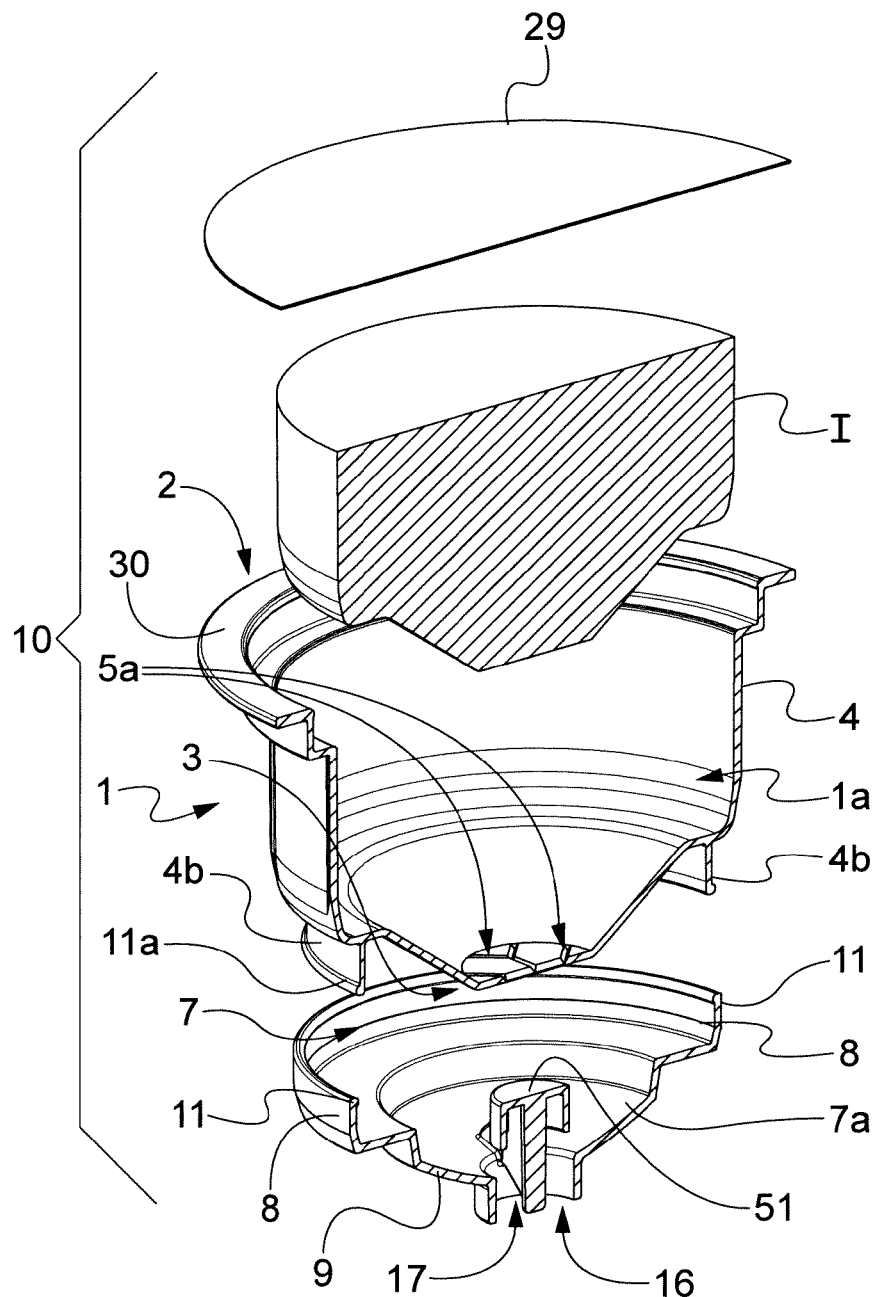
FIG. 2 shows a sectional and exploded view of a second possible embodiment of a capsule assembly according to the present invention comprising a membrane at the inlet wall and capsule beverage outlet comprising at least one breakable portion intended to be opened by a projecting element of the conveyor cap.
Figure 2A:
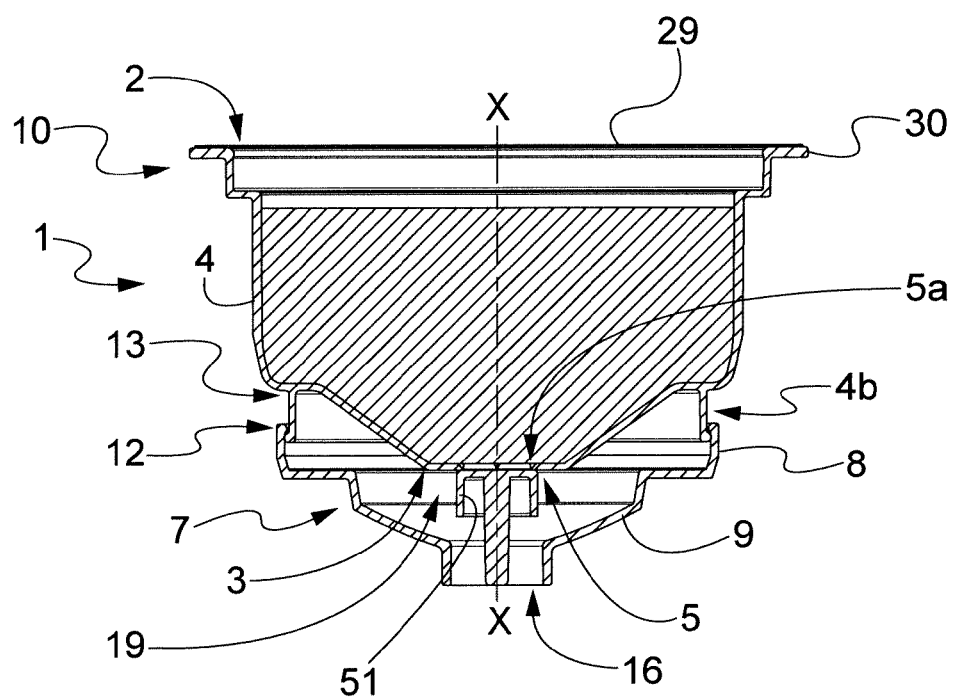
FIG. 2a is a front section view of the assembly according to FIG. 2.
Figure 2B:
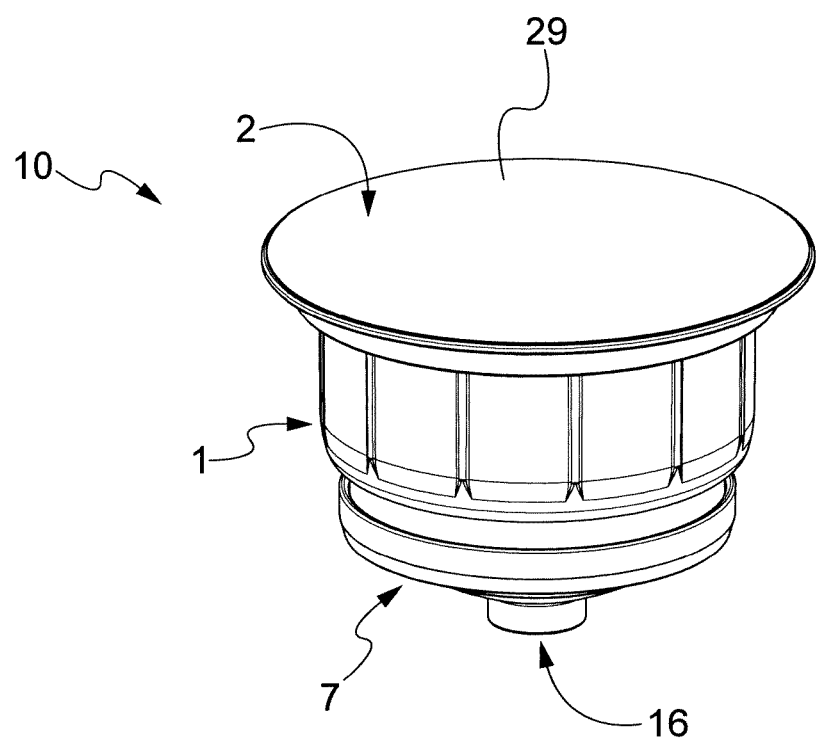
FIG. 2b is a perspective view of the assembly according to FIG. 2.

It has to be noted that according to different possible embodiments, a projecting element 5b can be located at said breakable portion i.e. it can be associated to said breakable portion of the outlet wall 3 defining the capsule beverage outlets 5 (see the embodiments of FIGS. 3 to 17) and/or a projecting element 51 can be arranged on the conveyor cap 7 to interact with the breakable portion of the outlet wall 3, as shown in FIGS. 1-2.

In the embodiment of FIGS. 1-2b and 27, the beverage outlets 5 of the capsule are intended to cooperate with opening means 51 of the conveyor cap 7. The opening means in the embodiments of FIGS. 3-17 and 18a-18c are formed by an abutting surface 52 that impinges on elements 5b that project from the outlet areas of the bottom wall 3 of the capsule.

According to an embodiment, as discussed later with exemplary reference to FIGS. 19a-19f, the one or more capsule beverage outlets 5 comprise at least one through-opening 205 closed by a sealing membrane 206. In other words the outlet wall of the capsule is provided with one or more through-opening 205 (e.g. one or more hole(s) or aperture(s) or slot(s)) which are normally closed by sealing membrane, e.g. a sealing foil for example made of aluminium, to provide a sealed closed capsule.

The one or more openings closed by the sealing membrane are opened by the conveyor cap due to a relative movement between the capsule and the conveyor cap. More in detail, the sealing membrane 206 is opened by opening means of the conveyor cap 7, preferably said opening means 51 of the conveyor cap being configured to tear and/or shear, and/or perforate, and/or lacerate, and/or deform, and/or puncture, accordingly to the shape of the relevant part of the conveyor cap, the sealing membrane.

According to an embodiment, as discussed later with exemplary reference to FIGS. 28a-28c, the one or more capsule beverage outlets 5 comprise at least one through-opening 205 and a sealing membrane 206 arranged above (upstream) the through-opening 205. In other words the outlet wall of the capsule is provided with one or more through-opening 205 (e.g. one or more hole(s) or aperture(s) or slot(s)) which are closed by sealing membrane, e.g. a sealing foil for example made of aluminium, to provide a sealed closed capsule, that prevents the exit of the beverage from the capsule via the through-opening(s).

The one or more openings closed by the sealing membrane are opened (i.e. the beverage can pass therethrough to exit the capsule) by the conveyor cap due to a relative movement between the capsule and the conveyor cap. More in detail, at least one projecting element 208 of the capsule is arranged at the outlet wall 3 and project towards the outside of the capsule and is intended to be contacted by an abutting portion 52 of the conveyor cap 7 that is configured to apply a pressure on a projecting element 208, thus causing a movement thereof towards the sealing membrane 206. The sealing membrane is thus opened and allows the exit of the beverage via the through-opening(s).

According to a possible embodiment, as for example shown in FIGS. 1, 2 and 27, the opening means of the conveyor cap 7 comprises a projecting element 51 arranged at the inner surface 7a of the conveyor cap and directed towards the outlet wall 3 to apply a pressure on said breakable portion 5 of the outlet wall 3. More in detail, when the outlet wall 3 is moved (with the capsule) towards the conveyor cap 7, projecting element 51 of conveyor cap 7 applies a pressure on the capsule beverage outlets 5, and in particular on the breakable portion of the outlet wall 3, comprising one or more grooves 5a, thus causing an opening thereof.

As shown in FIGS. 1-2b and 27, the capsule may be provided with a central beverage outlet (i.e. substantially arranged at the central axis X-X) and the conveyor cap 7 provided with a projecting element 51 arranged so as to contact the capsule beverage outlet 5 to provide its opening.

Said one or more grooves 5a defining the capsule beverage outlets 5, i.e. a breakable portion of the outlet wall 3, can be provided with different shapes in order to cause an effective break thereof.

Figure 1C:
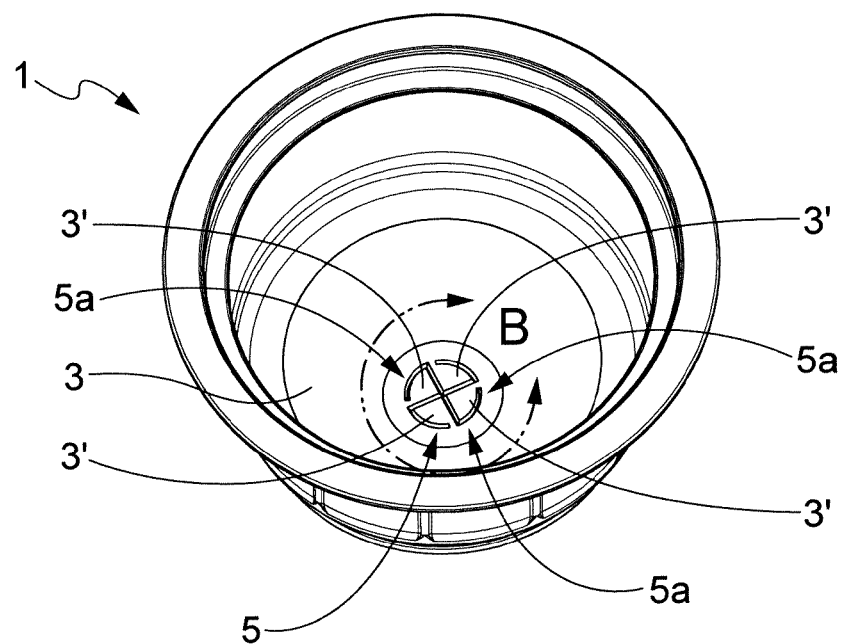
FIGS. 1c and 1d show an alternative embodiment of the beverage outlets of the capsule according to FIG. 1, the detail B in FIG. 1c is represented in an enlarged view in FIG. 1d.
Figure 1D:
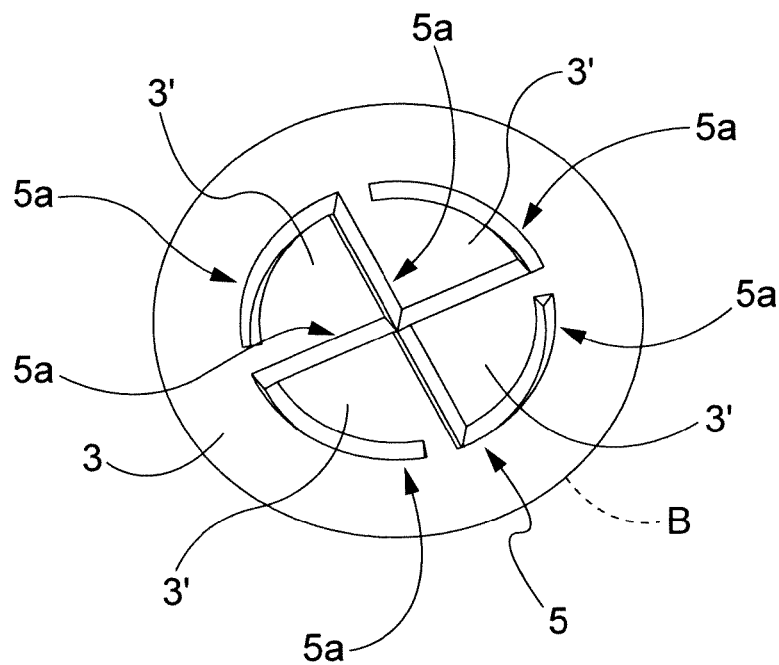

FIGS. 1c and 1d show an alternative embodiment of the beverage outlets of the capsule according to FIG. 1. This embodiment could by obviously also applied to the capsule assembly of FIG. 2 and provide a machine-capsule interaction similar to the one shown in FIGS. 1e and 1f.

In this embodiment, as shown in FIGS. 1c and 1d, grooves 5a are arranged to form a central cross shape and four arcs, forming four movable portions 3' of the outlet wall 3.

It has to be noted that the number of grooves 5a, and thus the number of the formed movable portions 3' can be altered, to define other possible embodiments.

Figure 27A:
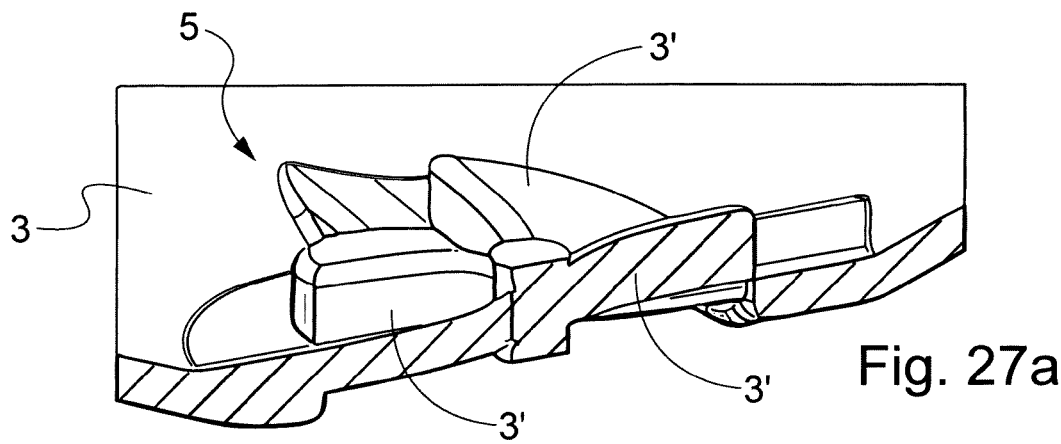
FIGS. 27a, 27b and 27c show three section views at different planes of the breakable portion of the capsule outlet wall.
Figure 27B:
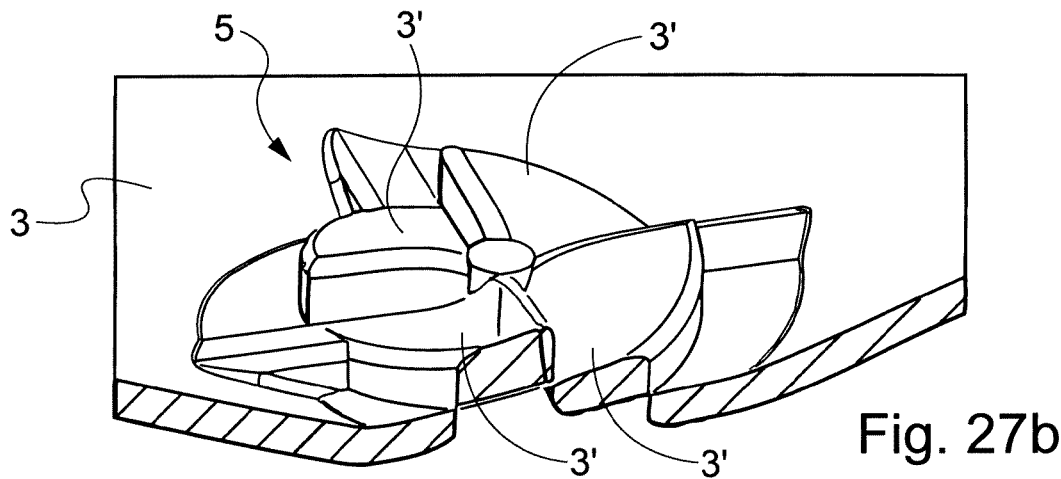
Figure 27C:
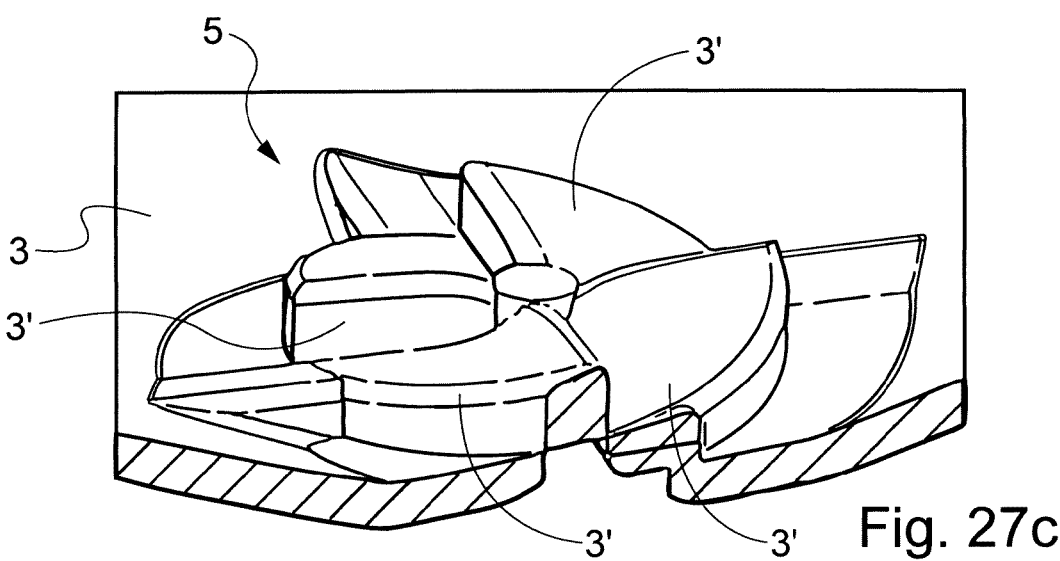

In a different embodiment, as for example shown in FIGS. 27-27c, the movable breakable portions 3' of the outlet wall 3 can be arranged on different planes. In other words, as for example shown in different section views of FIGS. 27a-27c, the outlet wall 3 comprises breakable portions 3' arranged at different height with respect to the bottom of the capsule, preferably in an helical or spiral arrangement around a central point.

This arrangement allows to provide an easy, repeatable and effective opening of the capsule when the projecting element 51 of the conveyor cap 7 contacts said breakable portions 3'.

It has to be noted that the number of the portions 3' can be altered, to define other possible embodiments.

Figure 1E:
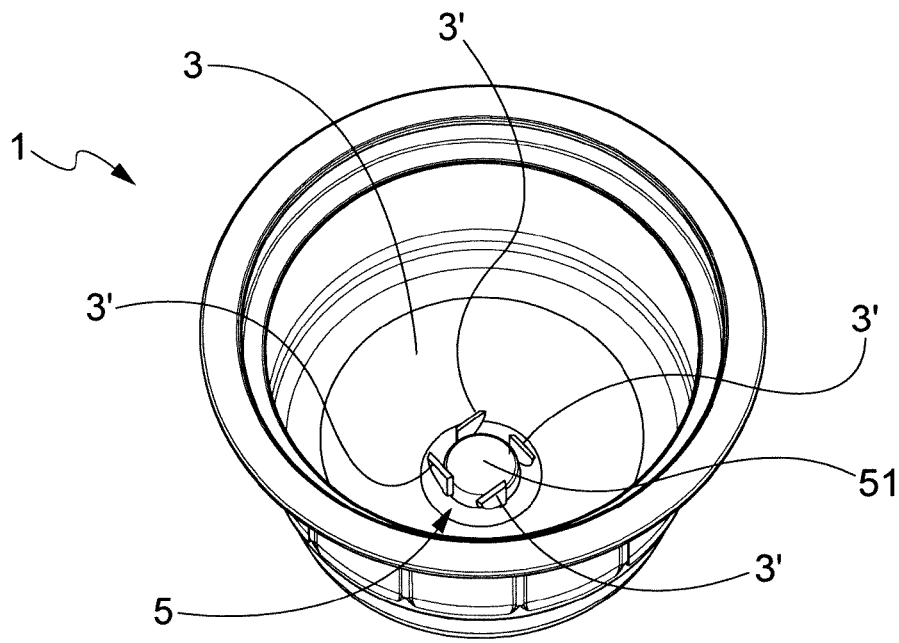
FIGS. 1e and 1f show respectively a partial top view and partial section view of the capsule according to FIG. 1c, in the position where the conveyor cap opens the beverage outlets.
Figure 1F:
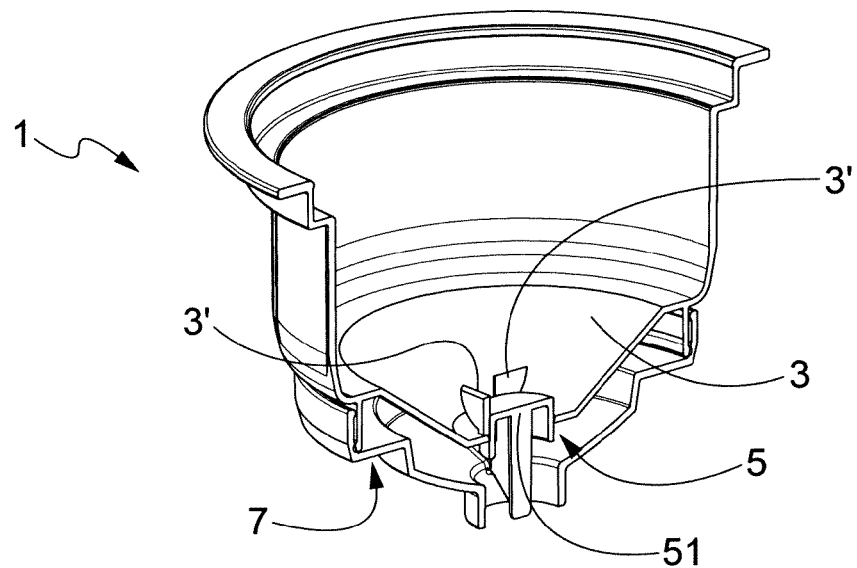

When the conveyor cap 7, and in particular its projecting element 51 applies a pressure on the capsule beverage outlets 5, four movable portions 3' of the outlet wall 3 are moved inwardly (e.g. towards the internal volume of the capsule), as for example shown in FIGS. 1e and 1f.

By providing said arcs, and not a complete circular line, constraining points of the movable portions 3' are thus formed.

The shape of the grooves 5a is configured to form an outlet 5 that is substantially complementary to the shape of the projecting element 51 of the conveyor cap 7.

For example, if the projecting element 51 is provided with a cylindrical shape, the grooves 5a are formed so as to form a correspondent circular opening in the outlet wall, when the grooves 5a are broken and the movable portion 3' of the outlet wall are moved toward the internal volume of the capsule.

The projecting element 51 is at least partially inserted within the capsule internal volume, passing through the outlet 5 of the capsule having a complementary shape. This allows to avoid undesired exit of remaining liquid from the capsule, after use and during disposal of the exhausted assembly 10.

Figure 24A:
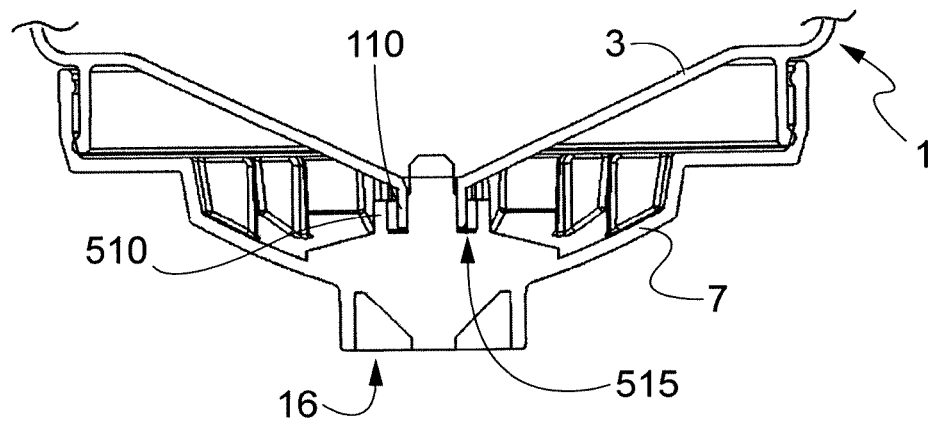
FIGS. 24a and 24b show a possible embodiment of a conveyor cap for a capsule assembly according to the invention, provided with a lateral protrusion for collecting the beverage.
Figure 24B:
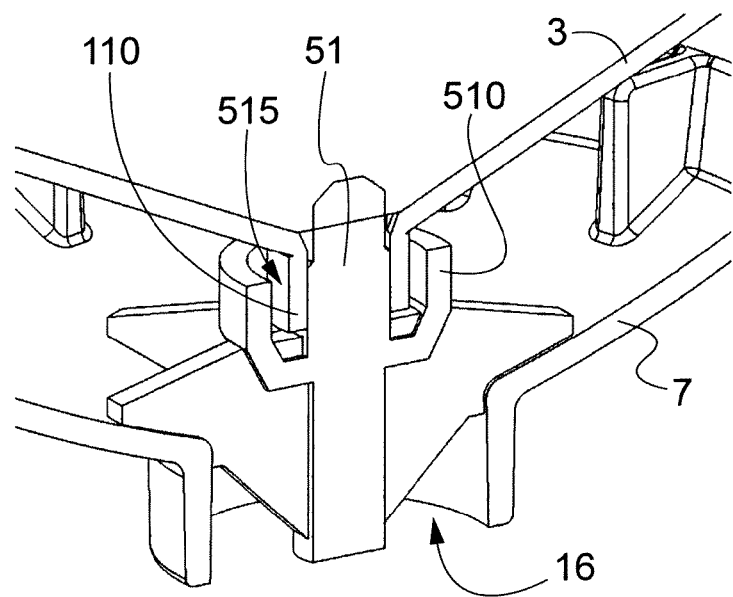

According to a further possible embodiment, e.g. shown in FIGS. 24a and 24b, the projecting element 51 may be provided with a lateral protrusion 510 configured to provide a chamber 515 (e.g. seat) at the capsule beverage outlet 5, when the conveyor cap 7 is coupled to the capsule 1. In particular, the lateral protrusion 510 may be shaped (e.g. cup shaped) so as to receive the beverage from the capsule beverage outlet when a beverage is being prepared. The lateral protrusion 510 is thus preferably configured to provide a chamber 515 that can be filled by the beverage exiting the capsule 1. The chamber 515 is typically open at the top portion, so that when the chamber 515 is completely filled and further beverage is delivered to the chamber 515, the beverage overflows from the chamber 515 to flow towards the delivery opening(s) 16 of the conveyor cap 7. When preparation of the beverage is completed, the capsule 1 (together with the conveyor cap 7) may be removed from the dispensing machine, and the chamber 515 retains the beverage not dispensed, preventing such a non-dispensed beverage to dripping out.

In the shown embodiment, the lateral protrusion 510 is provided with a radial portion protruding from the projecting element 51, and with a subsequent axial portion. Different conformation may be provided, e.g. the lateral protrusion 510 may protrude in a conical configuration (i.e. like a hopper) around the projecting element 51.

Figure 25A:
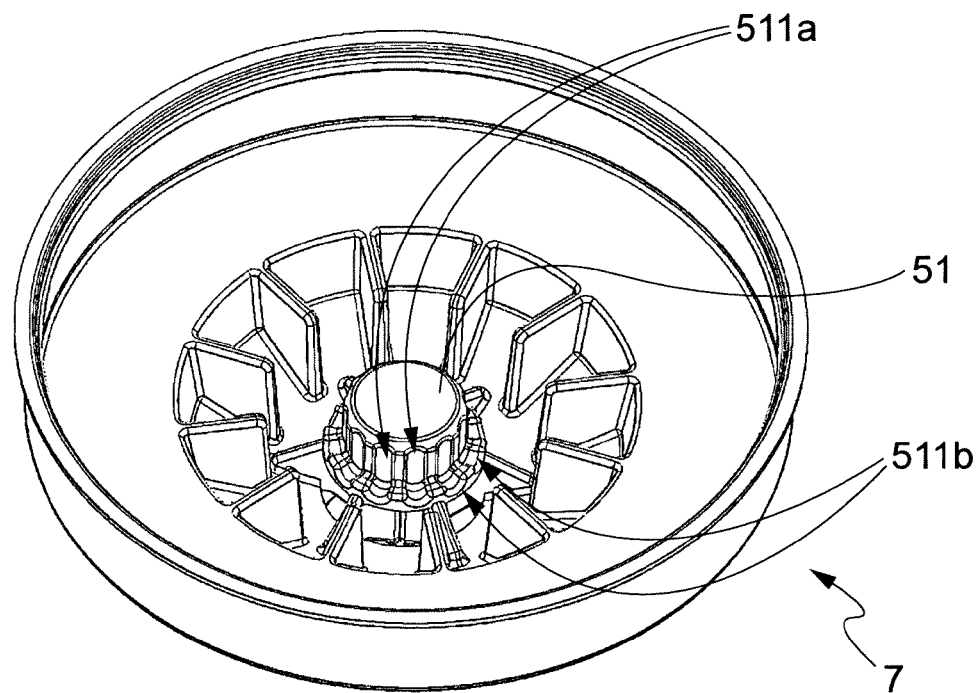
FIGS. 25a and 25b show an alternative embodiment of a conveyor cap, provided with grooves for a capsule assembly according to the invention.
Figure 25B:
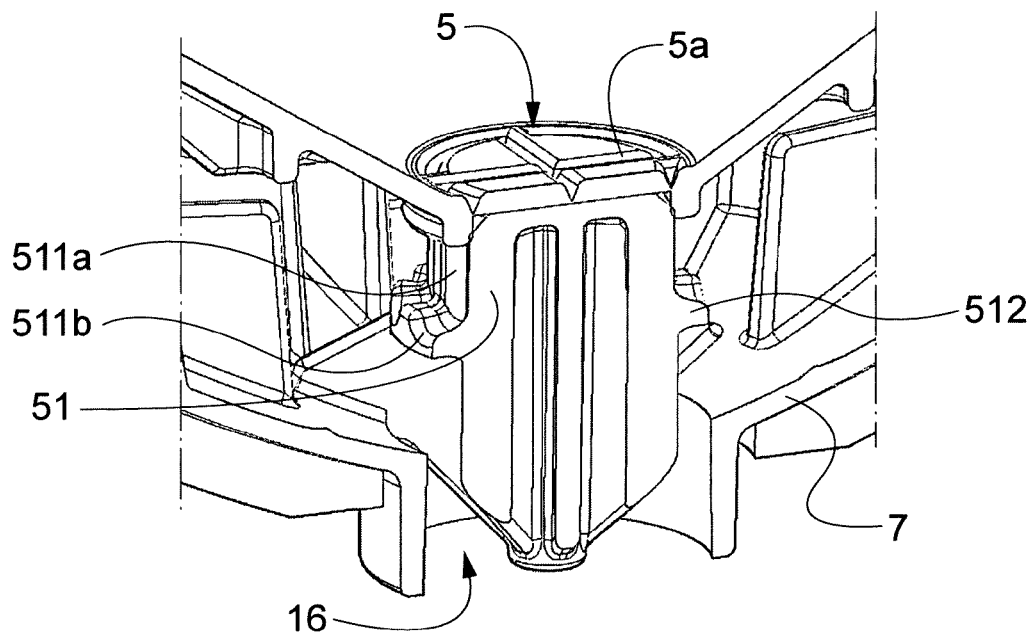

According to a possible embodiment, the capsule 1, at the capsule beverage outlet 5, may be provided with an outlet protrusion 110 configured to surround the projecting element 51 when the capsule 1 is coupled to the conveyor cap 7, or in any case to partially be inserted within the chamber 515, so as to better guide the beverage from the capsule 1 towards the chamber 515 itself. Typically, such an outlet protrusion substantially matches the shape of the projecting element 51. As an example, in the embodiment shown in FIG. 24, the outlet protrusion 110 is substantially cylindrical. According to an embodiment, the projecting element 51 may be provided with one or more grooves 511a on its lateral surface, as e.g. shown in FIG. 25. The grooves 511a are provided on the portion of the projecting element 51 that, in use, is coupled to the capsule 1, i.e. to the capsule beverage outlets 5. The grooves 511a allow to prevent occlusion of the beverage outlets 5 when the projecting element 51 is inserted therein. In other words, the grooves allow to guarantee a fluidic path (i.e. a channel) for the beverage when the projecting part 51 is inserted within the capsule 1.

The number and the configuration of grooves may vary between different embodiments. In the embodiment of the figures, a plurality of grooves 511a is disposed on the lateral surface of the projecting element 51. In different embodiment, more or less grooves may be provided. A single groove may also be provided. The grooves are preferably oriented axially with respect to the projecting element, but different configuration (e.g. grooves arranged according to a spiral around the projecting element 51) may be used.

In addition, or alternative, a rib 512 may protrude, typically in a substantial radial manner, from the lateral surface of the projecting element 51. The rib 512 is preferably placed on the projecting element 51 so that, when the capsule 1 is coupled to the relevant conveyor cap 7, the rib 512 is placed at the capsule beverage outlet 5. The rib 512 is provided with grooves 511b. Typically, both the both rib 512 and the grooves 511a are provided, and the grooves 511a on the lateral surface of the projecting element 51 and the groove 511b of the rib 52 are coupled one to the other. In other words, the grooves 511a of the lateral surface of the projecting element 51 continue as grooves 511b on the rib 512.

According to another possible embodiment, as for example shown in FIGS. 3, 4, 5-17 and 18a-18c, the capsule beverage outlets 5 further comprise a projecting element 5b arranged at said breakable portion(s) of the bottom wall 3 of the capsule.

More in detail, capsule 1 is provided with grooves 5a in the outlet wall 3, in correspondence to the grooves 5a the outlet wall has a reduced thickness to have the wall 3 break along the grooves and provide an outlet opening in that point of the bottom wall 3. The grooves 5a define an outlet area in which is provided a projecting element 5b that extends outside capsule 1 and that will operate a localized "perforation" of outlet wall 3 in the outlet area. According to a possible embodiment, as for example shown in FIGS. 3-17, the projecting element 5b of the capsule beverage outlets 5 is shaped as protruding flange from the outlet wall 3. The grooves 5a substantially define the perimeter of projecting element 5b extending outside the capsule (i.e. outside the hollow volume wherein the ingredient I is housed). It has to be noted that, according to a possible embodiment, as for example shown in the detailed view of FIG. 17, a portion 5c of the perimeter of the projecting element 5b is not provided with a groove 5a, so as to form a connecting portion that is not broken when a force is applied to the projecting element 5b by the conveyor cap 7 and that can thus act as a hinge.

Additionally, according to an embodiment the projecting element 5b is substantially L-shaped, if sectioned by a plane perpendicular to central axis X-X of the capsule. In other words, as for example shown in FIGS. 3, 12-17, the groove 5a and the projecting element 5b are arranged on the outlet wall 3 so as to form two portions 5', 5" arranged inclined one to another, preferably substantially at a right angle, thus providing a substantially L-shaped configuration.

This configuration provides an effective transmission of the force from the conveyor cap 7 to the capsule so as to allow an efficient opening of the beverage outlet at said grooves 5a also in case there are provided reduced compression forces.

As for example shown in the detailed view of FIG. 17, the projecting element 5b and the groove 5a is provided with a second portion 5" arranged substantially inclined (preferably substantially at right angle) with respect to the direction of extension of the first portion 5'.

More in detail, the second portion 5" is laterally extending towards the central axis X-X of the capsule, thus also providing an increased width with respect to the width of the first portion 5'.

The projecting element 5b arranged at the breakable portion of the capsule beverage outlets 5 is intended to interact with the conveyor cap 7 due to the relative movement thereof, thus causing an opening of the capsule beverage outlets 5.

More in detail, the opening means of the conveyor cap comprises an abutting surface 52 for the projecting element 5b of the capsule beverage outlets 5. In fact, surface 52 is a portion of the inner surface 7a of the conveyor cap 7, which is intended to contact the projecting element 5b of the capsule beverage outlets to exert pressure thereon, acting as an abutting portion, thus causing the opening of the capsule beverage outlets.

In the embodiment shown in FIGS. 3-17, the capsule beverage outlets 5 are arranged peripherally, and in general at a distance from the central axis X-X of the capsule, although different arrangements, having beverage outlets closer to the central area of the outlet wall, are possible.

Even if not shown in the figures, the beverage outlets 5 can be arranged along a radial direction with respect to the central axis X-X of the capsule. In other words, one or more outlet 5, preferably provided with a projecting element 5b, can extend along a radial direction with respect to the central axis of the capsule. As already mentioned above, are not excluded embodiments wherein the one or more capsule beverage outlets can be inclined with respect to a central axis of the capsule, for example the beverage outlets can extend along a substantially straight line that is inclined with respect to the central axis of the capsule, e.g. being not directed toward the central axis but providing an inclination angle (for example of about 30°).

As already mentioned above, the beverage outlets can also extend along according a curved line, e.g. can be substantially arch-shaped.

In the embodiments wherein the capsule beverage outlets 5 comprise a projecting element 5b intended to interact with an abutting portion 52 of the conveyor cap, the latter can be also provided with a projecting element 51 (see for example FIGS. 3 and 4), preferably arranged at the beverage delivery opening 16 of the conveyor cap 7 in order to provide the required structural strength of the conveyor cap. In other words, the projecting element 51 is intended to abut the outlet wall 3 and to provide the required stiffening of the conveyor cap.

The inlet wall 2 of the capsule 1 is also normally closed and it is opened to allow the liquid for the beverage preparation to be injected inside the internal volume 1*a* of the capsule wherein the at least one ingredient I is housed.

Any type of inlet wall 2 could be used amongst the ones available to the skilled in the art: for example the inlet wall may comprise a membrane 29, for example secured to a peripheral flange 30, and covering the entrance of the capsule. In this embodiment the inlet wall is formed by flange 30 and membrane 29 (see for example the embodiment of FIGS. 2, 3*c*, 4, 15, 19*a*-19*f*). In another possible embodiment, the wall 2 comprises a rigid lid 22, for example coupled to a flange 30 or to the lateral wall of the capsule; the inlet wall in this type of embodiments (see for example the embodiments of FIGS. 1, 3, 7-14) also includes at least one opening in the rigid lid 22 to provide a passage for the water entering into the capsule and a sealing membrane 23 that is pierceable by one or more perforating elements 28 provided on the lid.

Preferably, membranes 29 and 23 are impermeable to oxygen, so as to save the organoleptic characteristics of the ingredient stored in the capsule. Membranes 23 and 29 can be attached to the capsule in a known way, e.g. by ultrasonic or thermal welding, for example at an annular flange 30 laterally extending from the lateral wall 4 and forming part of the inlet wall 2. According to another exemplary embodiment, membranes and the capsule are made of compostable material.

Coming now back to the capsule exemplary embodiments having a rigid lid, as for example shown in FIGS. 1, 3, 7-9, 12-14, the inlet wall 2 comprises a rigid lid 22 provided with one or more openings (e.g. holes) for feeding water into the body of the capsule 1. A sealing film or membrane 23, impermeable to oxygen, is normally placed above the lid 22 to close it, until film 23 is pressed against lid 22 and is perforated by perforating elements 28; the film can be spaced from element 28 or can be in contact with said element in its standard position, before being perforated. Changing characteristics of the roasted and ground coffee (e.g. degassing after roasting) may cooperate to contribute in such movement.

Further details on this embodiment can be found in EP 1807318 of the present applicant, to which reference is made.

According to a possible embodiment, as for example shown in FIGS. 1 and 3, the rigid lid 22 comprises a portion 22*a* covered by a sealing membrane 23 and a circular path 22*b*, is externally arranged with respect to the portion 22*a*; path 22*b* is not covered by the sealing membrane 23.

In other words, the sealing membrane 23 is arranged to cover the portion of the lid 22 where the inlet opening(s) (e.g. holes) for feeding the liquid inside the capsule are provided. A portion 22*b* of the lid 22 is provided, the portion 22*b* is external with respect to the portion 22*a* covered by the membrane (preferably having a circular path) and is designed to house the injection means of the brewing system for the beverage preparation in which the capsule assembly 1 according to the invention is used.

The surface of circular path 22*b*, and in the general the portion of the lid 22 not covered by the sealing membrane 23 and intended to house the injection means of the system for the beverage preparation, may be arranged at a lower level (i.e. below with respect to the inlet wall) than the plane on which the membrane 23 is arranged. By this solution, the water injection means of the brewing system does not perforate any membrane: membrane 23 is perforated by elements 28 provided on rigid lid 22. Thanks to this embodiment, the capsule may be used also in brewing systems where the water injection means are not able, or no longer able, to perforate a membrane.

The portion 22*b* of the lid 22 may be further lowered, with respect to the plane of the flange 30, should the injection means be increased in length.

Figure 26:
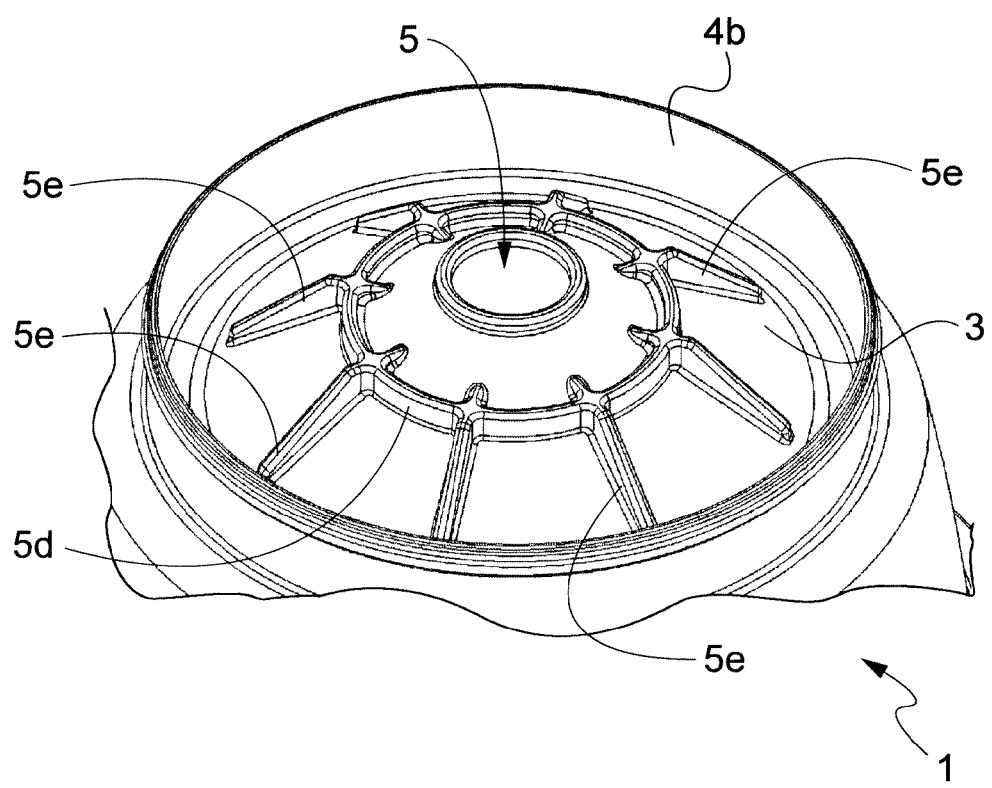
FIG. 26 shown an alternative embodiment of a capsule for a capsule assembly according to the invention, provided with external ribs at the capsule beverage outlet.

A reinforcing rib 5*d* may be provided around the capsule beverage outlet 5, to stiffen the area around the capsule beverage outlet 5. In more detail, as e.g. shown in FIG. 26, a rib 5*d* may protrude from the bottom wall of the capsule 1, externally with respect to the capsule. The rib may have different shapes in different embodiment (it is preferably annular as per FIG. 25). It may be continuous, as shown, but it may be also discontinuous, i.e. a plurality of ribs that only partially surround the capsule beverage outlet 5 may be provided. In alternative or preferably in addition to the reinforcing rib(s) 5*d*, radial ribs 5*e* may protrude from the bottom wall of the capsule, externally with respect to the capsule itself, to further improve the rigidity of the capsule. Preferably the radial ribs 5*e* cross the reinforcing rib(s) 5*d*.

Figure 3D:
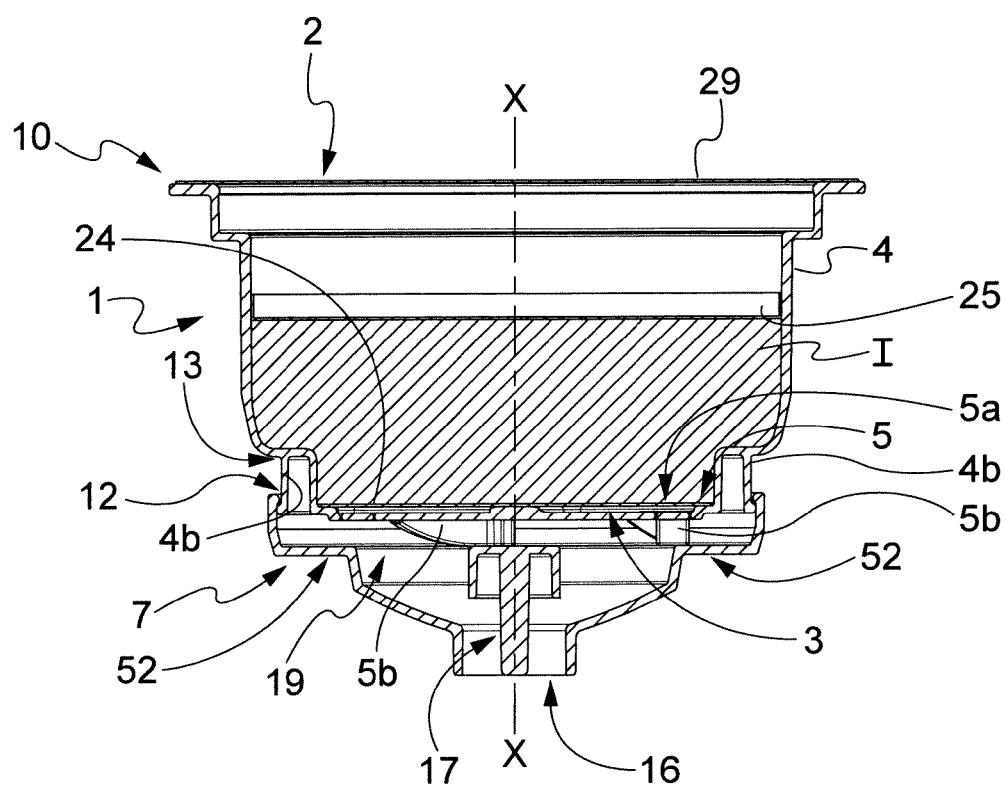
FIG. 3d is a front section view of the assembly according to FIG. 3c.

Typically, the height of the ribs 5*d* and/or 5*e* is less than the height of the flange 4*b*. Capsule 1 may further comprise a filter 24 (see e.g. FIGS. 3, 3*a*, 3*c*, 3*d*, 4, 7 to 10, 12 to 16 and 19*a*-19*f*-filter 24 is not shown in the other figures) of a type known in the art and preferably secured in a way known in the art (e.g. by ultrasonic or thermal welding) to the capsule body, e.g. to a step in lateral wall 4. Filter 24 may be slightly spaced from the bottom wall 3 of the capsule to allow the movement of the opening means of the bottom wall. An additional further filtering element, namely a partitioning element 25, can be positioned below the lid 22 or below the membrane 29 to keep into position the ingredient I during the brewing step and to reduce the internal volume 1*a* of the capsule 1. It has to be noted that the partition element can be formed by a filtering membrane 25 constrained to the inner surface of the lateral wall 4 of the capsule and that is arranged at a desired distance from the inlet wall 2. According to a possible embodiment, the filtering membrane 25, acting as a partition element of the internal volume 1*a*, is arranged at a distance from the inlet wall 2 of the capsule 1 (see for example the embodiment of FIGS. 3 to 3*d*).

Materials apt for the filter 24, 25 are the ones available to the skilled in the art, such as paper, non-woven plastics such as PP, or biodegradable plastics, etc.

The filtering membrane or partitioning element 25 can be used for reducing the internal volume 1*a* of the capsule, for example when a reduced quantity of ingredient is needed for the beverage preparation. In fact, as known in the art, the roasted coffee powder volume necessary for the espresso coffee preparation is less than the volume of roasted coffee powder used for preparing an American styled coffee or for soluble ingredients such as the one, for example, used in the preparation of hot chocolate. Capsules shown in FIGS. 3, 4, 12-16, having a reduced internal volume 1*a* can be advantageously used to house coffee powder for the espresso preparation.

In general, the dimension of the capsule can be shaped so as to provide the required volume of the internal volume 1*a*. For example the capsule shown in FIGS. 12-16 has a reduced internal volume 1*a* for housing the ingredient I compared to the internal volume of the capsules shown in FIGS. 1 and 2, while maintaining the overall dimensions of the capsule assembly 10, for example by increasing the height of the conveyor cap 7 allowing the use of the capsule in the same holder.

In other words, the dimension of the capsule 1 can be reduced and the dimension of the conveyor cap 7 can be designed accordingly, so that the capsule assembly 10 comprise a desired overall dimension, that is preferably corresponding to the dimension and shape of the holder 26 of the system for the beverage preparation in which the capsule assembly has to be used.

Figure 7:
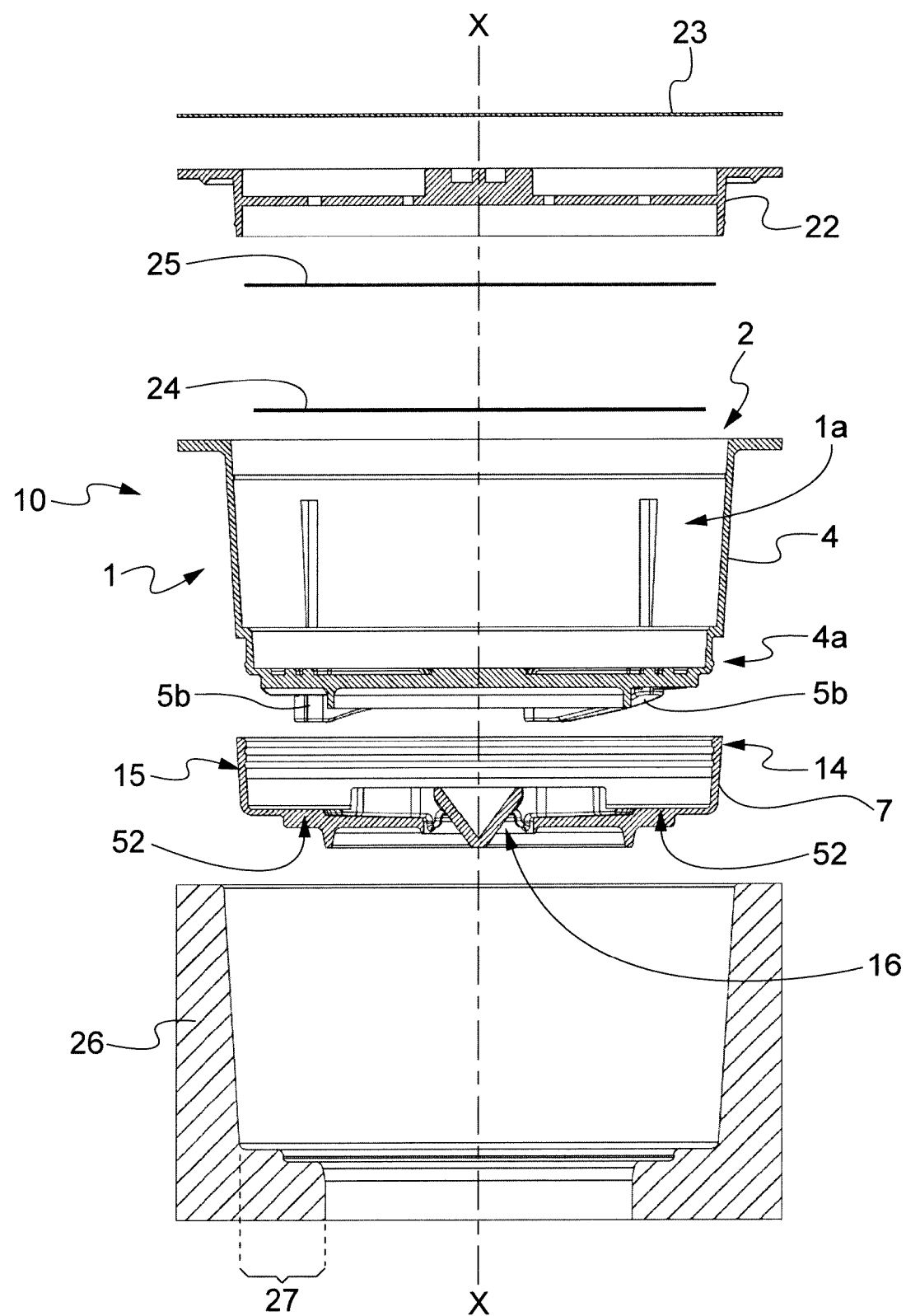
FIG. 7 is a sectional, exploded view of further possible embodiment of a system according to the invention showing a capsule holder for an invention capsule.
Figure 8:
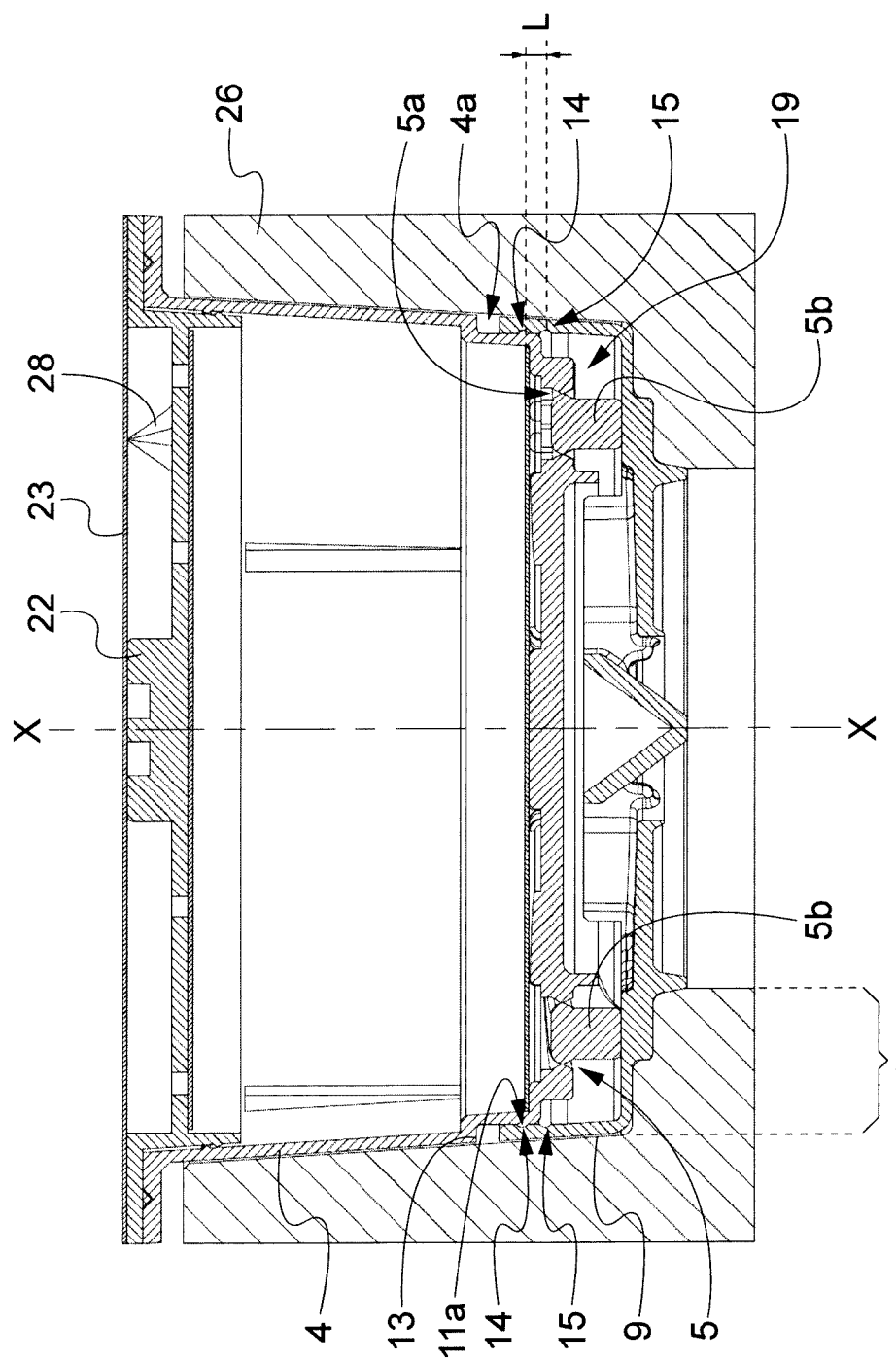
FIG. 8 is a sectional view of the capsule assembly inserted in the capsule holder (or the machine), with the capsule beverage outlets still in a closed condition.
Figure 9:
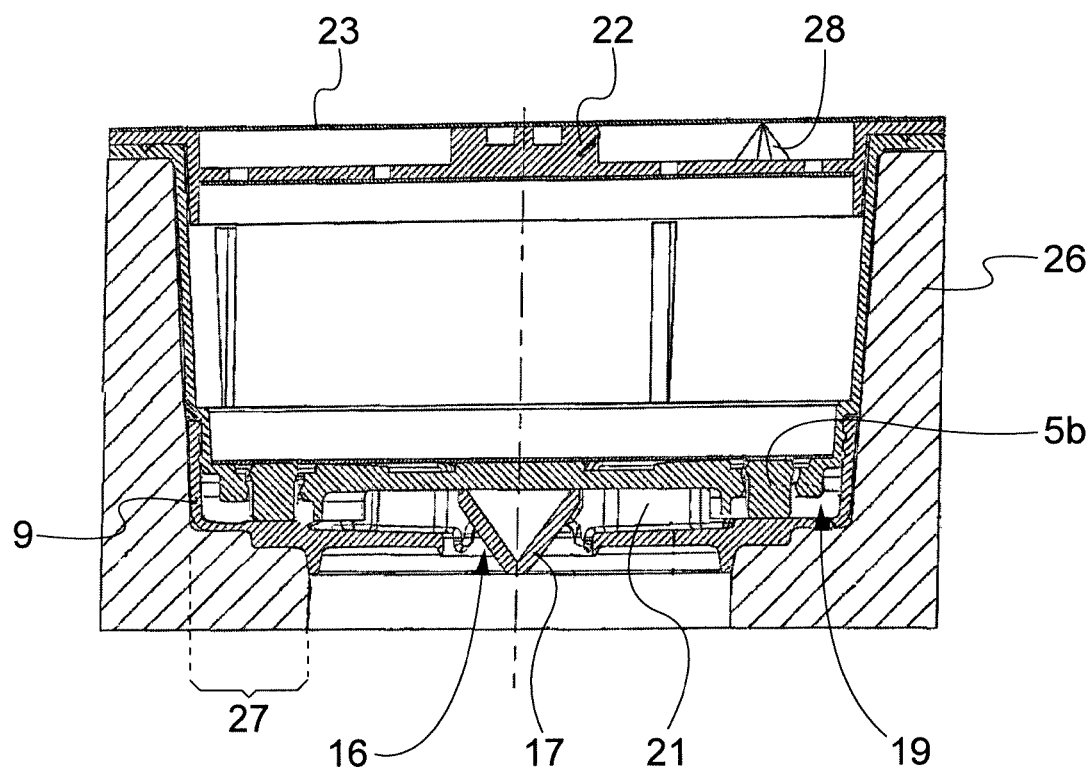
FIG. 9 is a sectional view of the assembly of FIG. 8 after opening the capsule beverage outlets.
Figure 10:
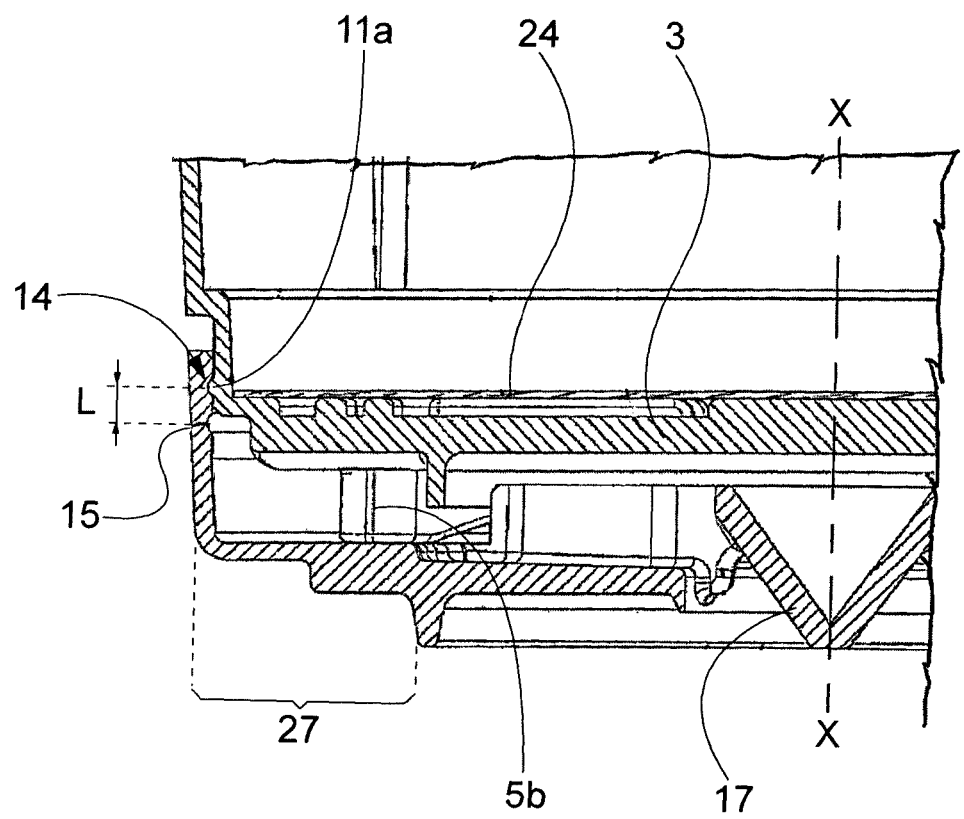
FIG. 10 is an enlargement of FIG. 8 without the capsule holder.

It has to be further noted that the shape of the conveyor cap 7 can change according to different possible embodiments, preferably depending on the shape of the holder 26 of the system for the beverage preparation in which the capsule has to be used, see e.g. FIG. 7 or 8 for an exemplary embodiment of holder and capsule.

Lateral fins or ridges 80 (see for example FIG. 1), or similar elements protruding from the external surface of the lateral wall 4 of the capsule, and/or from the external surface of the conveyor cap, can be provided to adapt a capsule to a holder bearing different, i.e. greater dimensions while maintaining the internal volume of the capsule of the desired dimension to house the required quantity of ingredient(s).

Fins or ridges 80 may be utilised to provide aesthetic embellishment to the outer body and thus may be provided in different shapes and patterns.

As already mentioned above, the conveyor cap 7 and in particular its base wall 9 is provided with at least one delivery opening 16 for dispensing the beverage. Preferably, the beverage delivery opening 16 is centrally arranged, i.e. it is substantially arranged at the central axis X-X of the capsule 1.

According to a possible embodiment, the beverage delivery opening 16 can be provided with a conveying means to direct and control the flow of beverage from the outlet.

According to a possible embodiment, as for example shown in the FIGS. 14-17 and 19a-19f, there is provided a central delivery opening 16 that is housing a conveyor element 17, which can be provided with a conical shape. Element 17 has a substantially cross-shaped transversal section and is longitudinally shaped to have a beverage conveying end, e.g. a beverage conveying point 17a. Element 17 may be supported centrally to the beverage delivery opening 16, for example by means of a plurality of fins 18 (see e.g. FIG. 5). The internal side of conveyor element 17 is flat so as to allow a possible support to the bottom wall 3 of the capsule during the brewing step.

According to an aspect of the invention, as for example shown in FIGS. 5-11, conveyor cap 7 can also comprise at least one hole 20 to let air flow from outside cap 7 to enclosure space 19 or from inside enclosure space 19 to outside the cap; preferably, holes 20 are provided above base 9 of cap 7, so as to avoid contact with the beverage and avoid possible leaks of the beverage though said holes 20.

Figure 11:
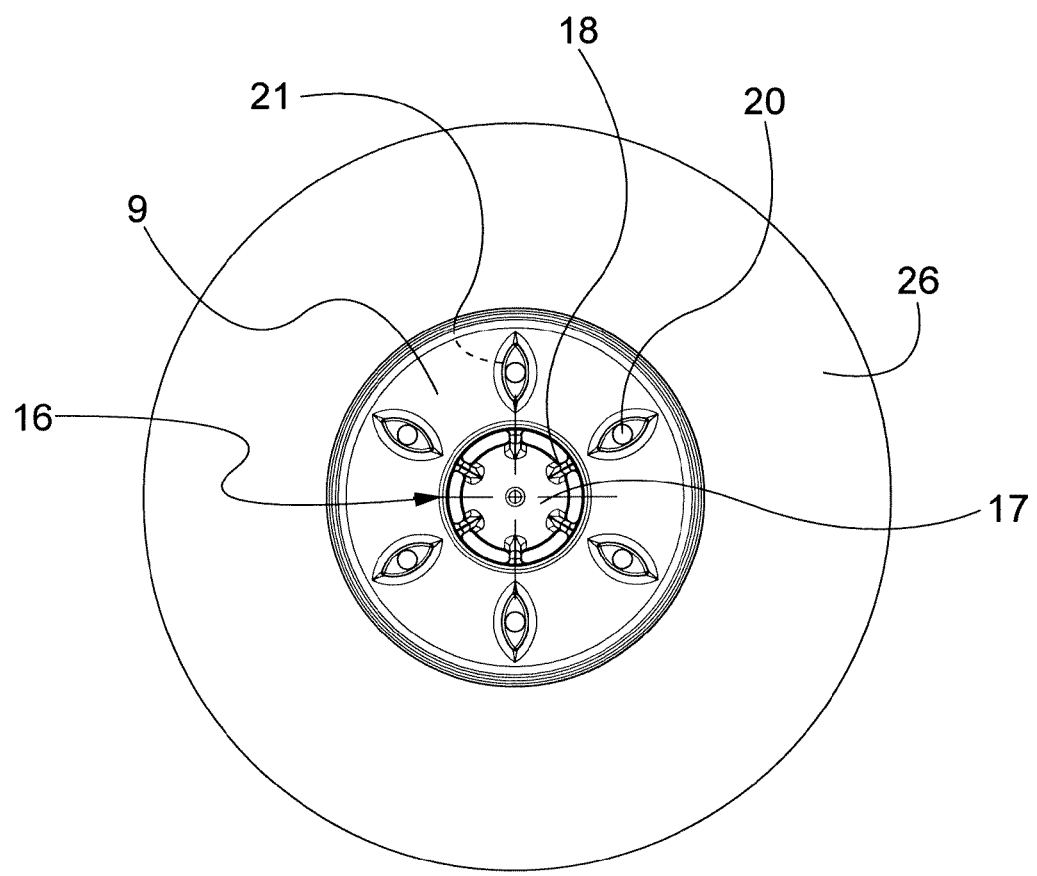
FIG. 11 is a view from the outlet side of the assembly of FIG. 8.
Figure 12:
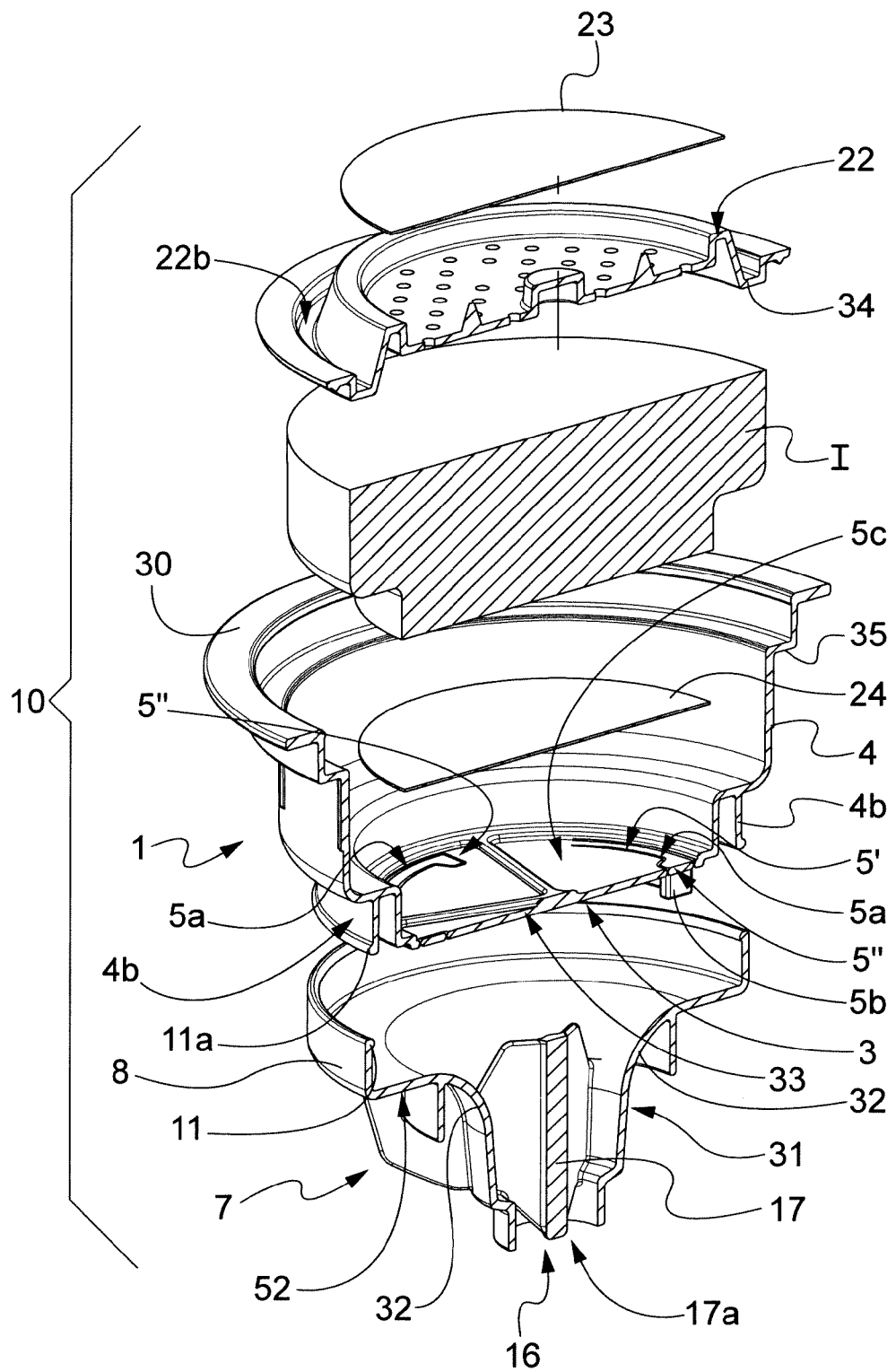
FIG. 12 is a sectional and exploded view of another embodiment of a capsule assembly according to the present invention comprising a rigid lid at the inlet wall and wherein the capsule beverage outlet comprises at least one breakable portion having a projecting element intended to be opened by an abutting portion of the conveyor cap.
Figure 13:
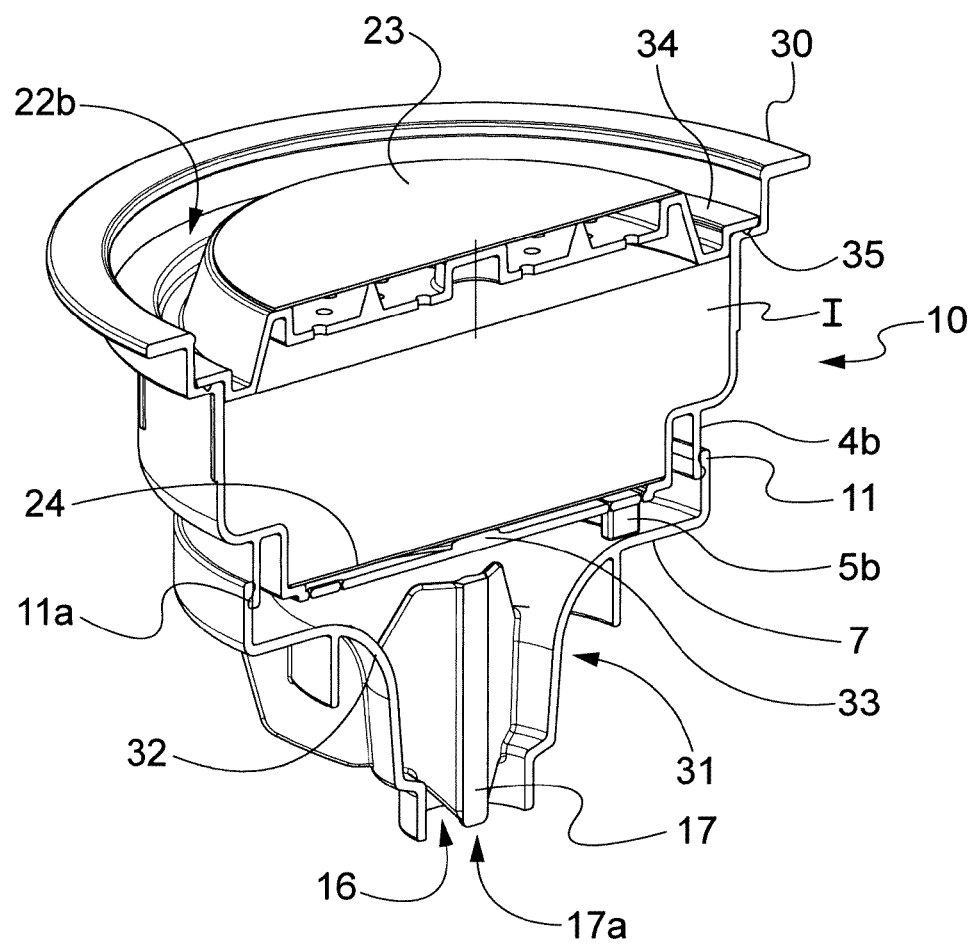
FIG. 13 is a perspective sectional view of the capsule assembly of FIG. 12.

In the shown exemplary embodiment of FIGS. 5-6 and 11, each hole 20 is located on the top side of a corresponding plurality of elliptical element 21 extending from the base wall 9 of cap 7 towards the outlet wall 3 of the capsule. When dispensing the beverage from capsule 1 into enclosure space 19, holes 20 act as air passages to allow a flow of air directed into said enclosure space, or out from said enclosure space to the outside, so as to reduce or cancel the difference between the pressure in the said enclosure space and the ambient pressure.

Figure 4A:
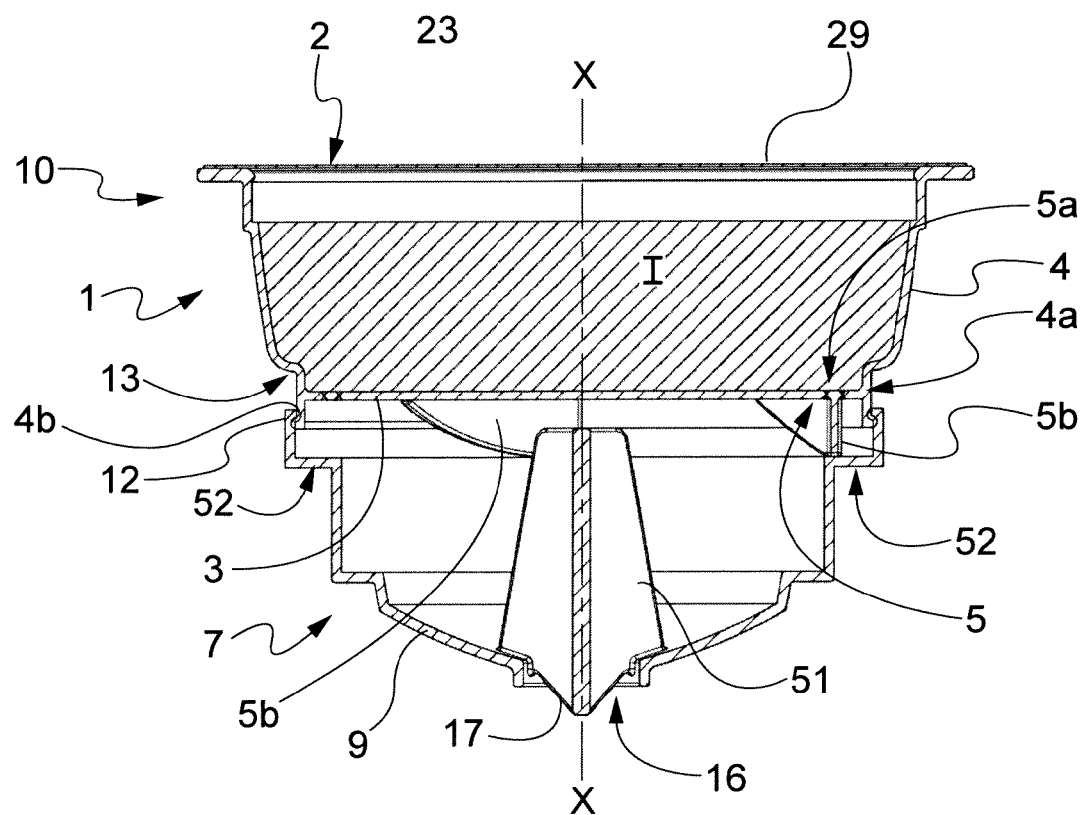
FIG. 4a is a front section view of the assembly according to FIG. 4.

Alternatively a convenient air-flow passage may be created by properly adjusting the space, i.e. the air gap, created between, as for example shown in FIG. 4a, conveyor element 17 and outer wall of the cap 7, in order to obtain a smooth flow of finished beverage.

The capsule assembly 10 is to be used with a capsule holder 26 of a system for the beverage preparation that is configured to provide a relative movement between the capsule 1 and the conveyor cap 7 to open the capsule beverage outlets 5, see for example capsule assembly 10 above disclosed with reference to FIGS. 5-11.

As disclosed above, with reference to the assembly 10, the relative movement between the capsule 1 and the conveyor cap 7 is provided mechanically.

According to a possible embodiment, the holder 26 is insertable in a holder seat of the system and the relative movement between the capsule 1 and the conveyor cap 7 to open the capsule beverage outlets 5 is provided when the assembly 10 is housed in the holder and the holder is inserted in said holder seat.

In fact, when the holder 26 is inserted in the holder seat of the system for the beverage preparation (e.g. an holder seat of a beverage dispensing machine) and the brewing system is closed either manually or automatically, e.g. using a motor, a liquid tight sealing is carried out on the capsule before water is fed to the same. In this step, a mechanical force is applied to the assembly 10 to press it against the holder 26 so that a relative movement between the capsule 1 and the conveyor cap 7 is provided, thus providing a compression of the capsule assembly 10 allowing the opening of the capsule beverage outlets 5. This step is automatically carried out by known brewing systems on the capsule of the invention upon closing the system to start the process of preparing a beverage.

According to a possible embodiment, the system for the beverage preparation may further comprise a movable element, for example a movable element of the dispensing machine, intended to contact the capsule assembly 10, preferably in correspondence of the inlet wall 2 namely on the flange 30. The movable element of the system for the beverage preparation, e.g. a movable element of a dispensing machine, may be associated to the injection means for feeding the brewing liquid intended to be supplied inside the capsule. The movable element is moved to contact the capsule in a position that is substantially opposite to the position at which the holder 26 supports the capsule assembly 10 and to press it against holder 26 to provide, in the contact area between movable element and capsule (e.g. flange 30) a water tight sealing area. In other words, according to a possible embodiment, the holder 26 supports the capsule assembly 10 in correspondence of the conveyor cap 7 and the movable element contacts the capsule assembly 10 in correspondence of the inlet wall 2 of the capsule.

According to a further possible configuration, the holder is moved by a movable element of the system for the beverage preparation.

In general, when the movable element and the holder are relatively moved to retain the capsule assembly 10 and provide a water-tight sealing for the beverage preparation, a compression force is applied to the capsule assembly, moving the capsule towards the holder. By doing so, a relative movement of the conveyor cap 7 and the capsule 1 is determined thus causing the opening of the capsule beverage outlets 5.

It has to be noted that according to a possible embodiment, the holder is moved with respect to a fix element of the dispensing machine, to provide a relative movement of the conveyor cap 7 and the capsule 1, thus causing the opening of the capsule beverage outlets 5.

According to a possible embodiment, as for example shown in FIGS. 5-11, the holder 26 has a base including a large hole and a part 27 that is shaped accordingly to a corresponding part of conveyor cap 7. Part 27 holds a corresponding portion of the base wall of the conveyor cap 7 of the capsule assembly 10 that is spaced from the beverage delivery opening 16 of the conveyor cap 7, so as to avoid or reduce contacts between the beverage the capsule holder 26 when the beverage is dispensed. Preferably, part 27 has reduced area in the form of an annular structure that defines the hole provided in the base, or lower portion, of holder 26; part 27 of the base of the holder is arranged peripherally to the capsule assembly and supports the part of the capsule assembly where projecting elements 5b are positioned, so as to provide a rigid surface (abutting portion 52) onto which the assembly can be compressed to carry out perforation of the outlet wall 3 of capsule 1.

Holder 26 can be provided with a handle for manual placement of the capsule under a source of hot water to prepare the required beverage. Holder 26 may in that case also comprise means, known per se in the art, such as e.g. a bayonet fixing means, click-on means and similar, for securing the holder to the said source of hot water. A holder with a handle for capsules is disclosed in above mentioned EP1792849; the difference between the two embodiments is that in the holder of the present invention there are no collecting means below the beverage delivery opening 16 of conveyor cap 7.

According to a possible use mode, the capsule assembly 10 is positioned in holder 26 and holder is positioned under a hot water source. The capsule assembly 10 is compressed into the holder 26, for example by the insertion of the holder in a holder seat of the system for the beverage preparation and/or due to a movement of a movable portion of the system for the beverage preparation towards the capsule assembly.

The force exerted on the capsule assembly, e.g. a compression force, provides the opening of the capsule beverage outlets 5 due to the relative movement between the conveyor cap 7 and the capsule 1 (the relative movement providing a compression of the capsule assembly 10). More in detail, according to different possible embodiments, the projecting element 5b of the beverage outlets 5 contacts the abutting portion 52 of the conveyor cap 7, or the projecting element 51 of the conveyor cap 7 contacts the beverage outlet(s) 5 of the capsule.

In both cases, the grooves 5a defining capsule beverage outlets 5 break under pressure exerted by the relative movement between the conveyor cap 7 and the capsule 1, so as to provide outlets for beverage flow into the enclosure space 19.

As disclosed below, with exemplary reference to FIGS. 19a-19f, in the embodiment wherein the beverage outlets 5 comprises one or more through-opening 205 sealed by a sealing membrane 206, the force exerted on the capsule assembly, e.g. a compression force, provides the opening of the capsule beverage outlets 5 due to the relative movement between the conveyor cap 7 and the capsule 1. In fact, the projecting element 51 of the conveyor cap 7 contacts the beverage outlet(s) 5 and in particular the sealing membrane 206 so as causing a piercing of the sealing membrane. The capsule is thus opened and the through-opening 205 put in fluid communication the internal volume of the capsule wherein ingredient is stored with the external ambient via the enclosure space 19 of the conveyor cap 7.

When an assembly having a rigid lid with perforation elements is used (as for example shown in FIGS. 1, 1a, 1b, 3, 3a, 3b, 7, 8, 9, 12-16), the pressurized water fed to the capsule will press the membrane 23 against perforating elements 28, open the film and flow through lid 22 into the capsule. If the capsule 1 is not provided with a rigid lid 22, and it is provided with a membrane 29 (see for example FIGS. 2, 3c, 3d and 4), when the capsule is inserted in the dispensing machine, injections means, such as for example a spike or an injection needle, pierces the membrane 23 thus allowing the injection of liquid inside the capsule.

The beverage outflowing from bottom of capsule 1 will impinge onto base 9 of cap 7 and will be directed to the beverage delivery opening 16 in base 9, that is preferably offset with respect to the outlets 5 of wall 3 of capsule 1.

With the help of the conveyor element 17, the beverage can be directed to the final container without sprays or spillages. The preferred presence of air passages 20, or properly sized air-gaps, enables to further control of the flow of beverage in exit and further increases the amount of air in the beverage and, consequently the crema top layer.

FIGS. 12-17 disclose an embodiment designed to reduce the time the beverage spends to pass through the conveyor element 7 and in general to reduce the drop in temperature that the beverage suffers upon being delivered from outlets openings 5 of outlet wall 3 of the capsule. In FIGS. 12-17, similar parts are defined with the same reference numbers that are used for the previous embodiments of FIGS. 1-11. The main difference with respect to the previously discussed embodiments resides in the shape of the base wall 31 of conveyor cap 7. Assembly 10 has a cap 7 with lateral wall 8 that is slidably mounted over a flange 4b protruding from the outlet wall 3 of the capsule. An interlocking connection comprising a protruding ridge 11 at the inner face of the conveyor cap 7 intended to cooperate with another protruding ridge 11a on the external surface of the capsule (see enlarged detail in FIG. 17) is provided to lock together capsule and conveyor cap.

The lateral wall 8 of the cap 7 is positioned externally with respect to flange 4b protruding from the outlet wall 3 of the capsule. The protruding ridges 11, 11a, or similar elements, are both in contact with the opposite surface of the capsule's wall (e.g. flange 4b) and of the inner side of the lateral wall 8 of the conveyor cap, respectively.

Figure 4B:
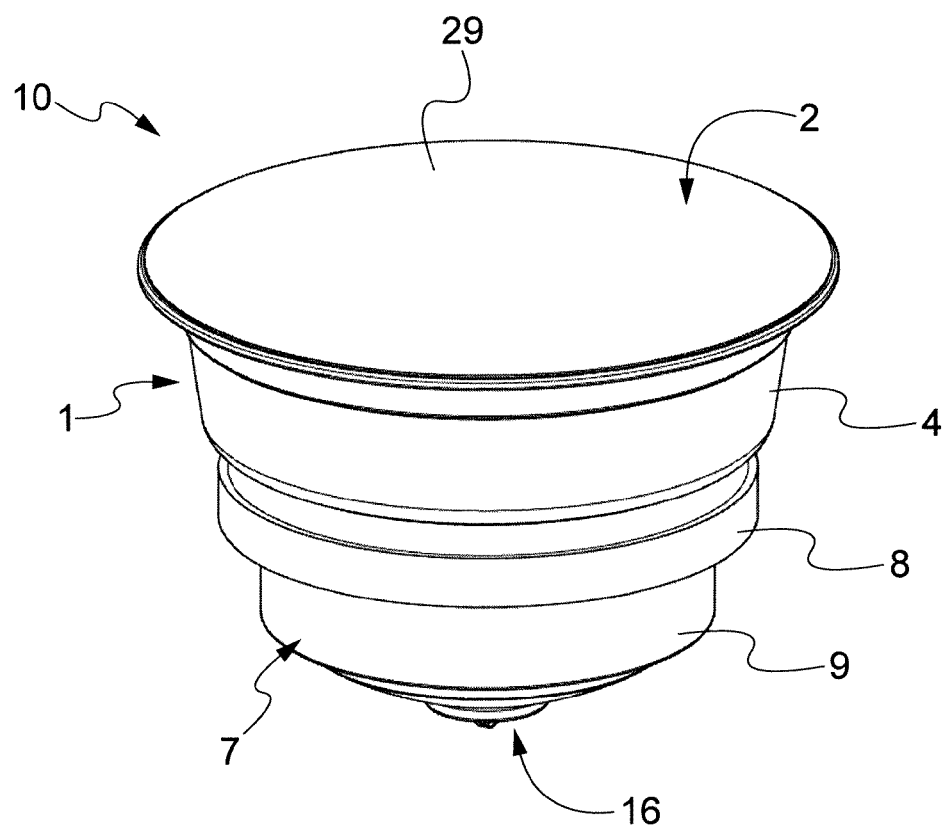
FIG. 4b is a perspective view of the assembly according to FIG. 4.

The shape of base wall 31 is in this embodiment providing an inner convexity 32, contrary to the flat shape of FIGS. 5-11 and contrary to the inner concavity of the base wall of conveyor cap 7 of the embodiments shown in FIGS. 3 to 4b.

The shape of base wall 31, provided with an inner convexity 32 (as for example shown in FIGS. 12-17 and 20, 21, 22) has been designed to minimise the surfaces of the conveyor cap in contact with the liquid exiting the capsule.

Figure 14:
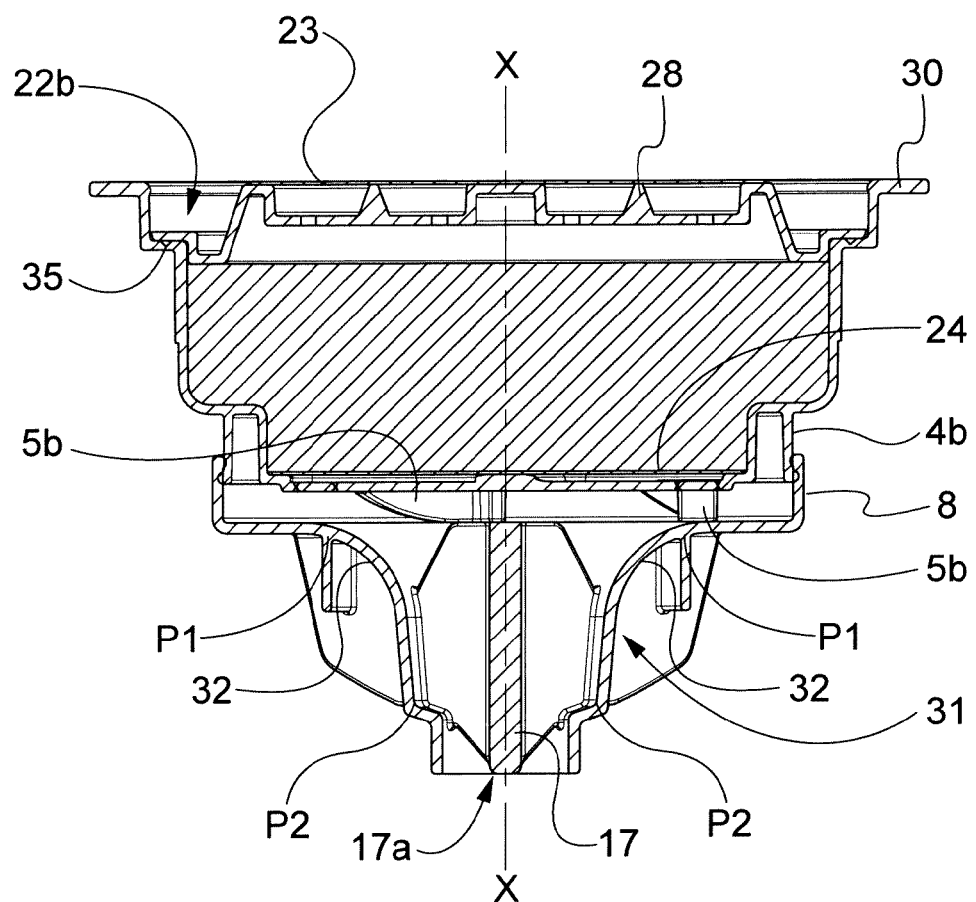
FIG. 14 is a lateral sectional view of the assembly of FIG. 12.
Figure 15:
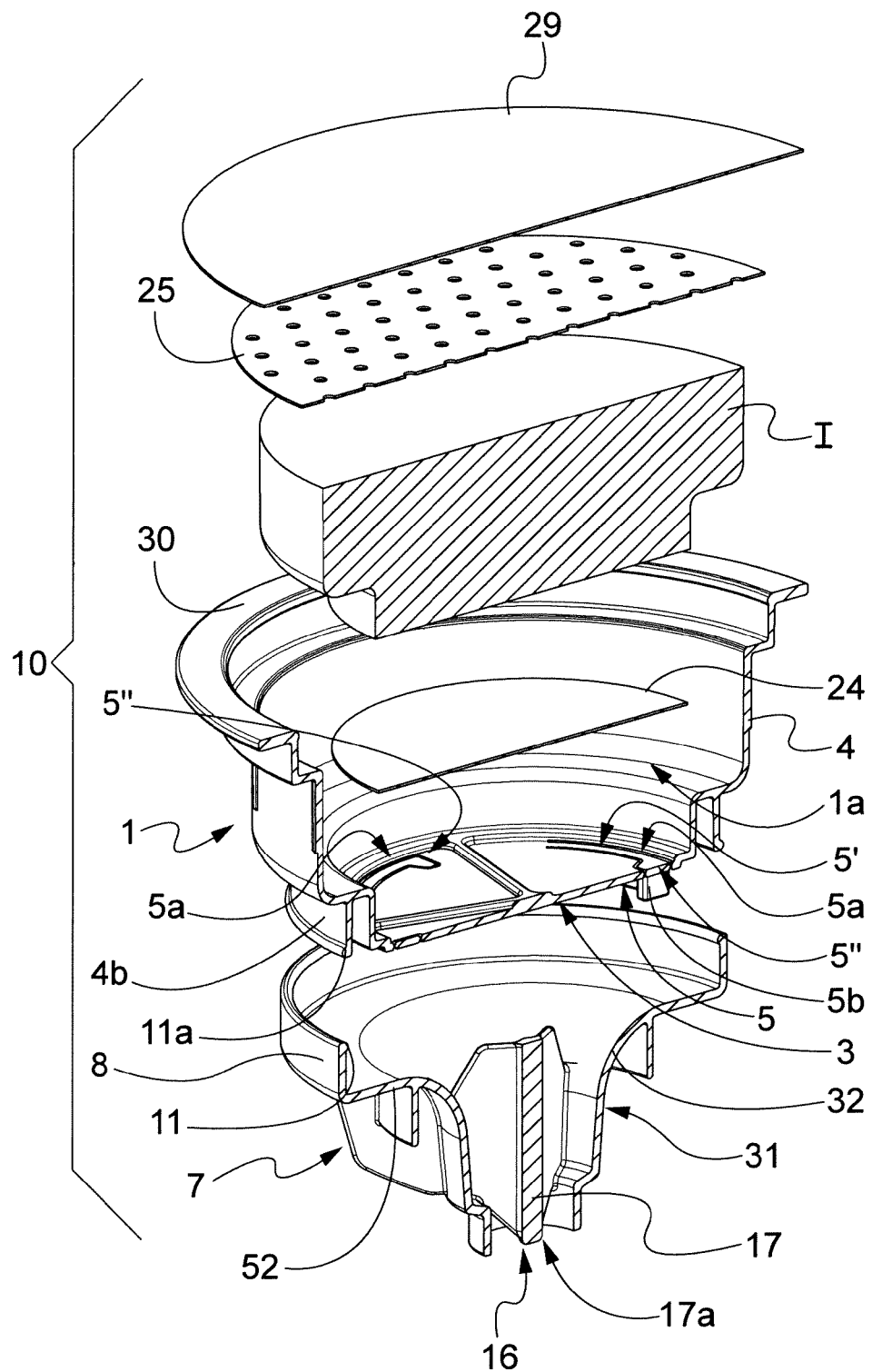
FIG. 15 shows a sectional and exploded view of a capsule assembly according to FIG. 12, wherein a membrane is arranged at the inlet wall instead of a rigid lid.
Figure 16:
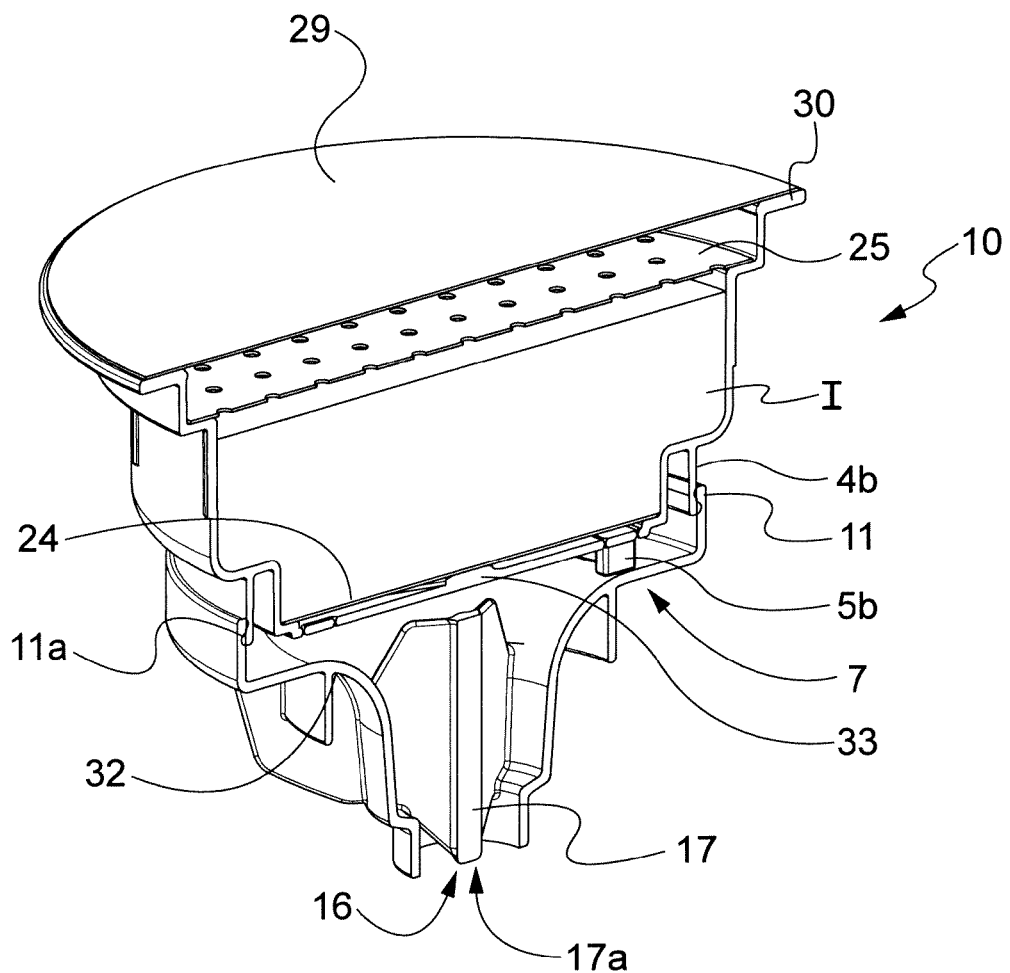
FIG. 16 is a perspective sectional view of the capsule assembly of FIG. 15.

According to a possible embodiment, as for example shown in FIG. 14, in a plane passing through the central axis X-X of the capsule, the surface of the base wall 31 providing the inner convexity 32 has been designed to minimize the area of the connecting surface between two points P1, P2.

For example, a connecting conical curve (also known as conical section) extending between the two points P1, P2 has been designed by imposing a tangent condition of its ends at the points P1 and P2. With the above mentioned tangent conditions at the ends, the connecting surface having an inner convexity 32 is the surface that connects points P1 and P2 with the minimum area, thus providing a reduced contact surface of the conveyor cap 7 with the liquid exiting the capsule.

The connecting conical curve extending between the two points P1 and P2 is rotated about the axis X-X of the capsule to provide the base wall 31 of the conveyor cap 7 having an inner convexity 32, as a surface of revolution.

Possible alternative embodiments of the conveyor cap 7 which can be used in the capsule assembly 10 according to the invention are for example shown in FIGS. 20-22.

In particular, as per the embodiment of FIGS. 20a-20d, the bottom wall 31 of the conveyor cap 7, at its lateral edge, may be configured to form a lateral inner chamber 70. Preferably, the bottom wall 31 protrudes downwards so as to form a chamber (or pocket) 70 at the lateral edge of the conveyor cap 7. The chamber 70 is typically provided with a substantially U-shaped section, and runs along the lateral edge of the conveyor cap 7, thus forming an annular chamber 70.

Such a shape allows for the stiffening of the conveyor cap 7, as well as allowing the correct positioning of the conveyor cap 7 within a dispensing machine. Such a continuous shape of the bottom wall 31 of the conveyor cap 7, further than the above mentioned function, provides an added aesthetic value to the conveyor cap 7 while, altogether, providing for limited contact surface between the cap's internal surfaces and the dispensed beverage.

Figure 20A:
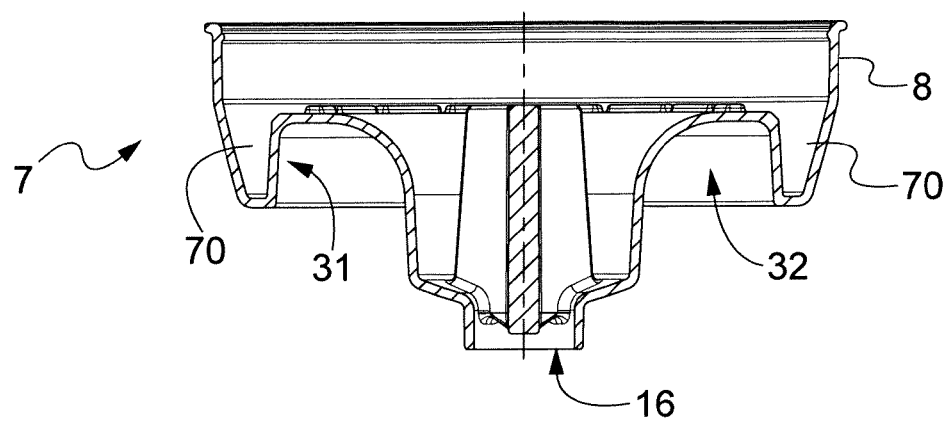
FIGS. 20a-20d show a possible embodiment of a conveyor cap for a capsule assembly according to the invention.
Figure 20B:
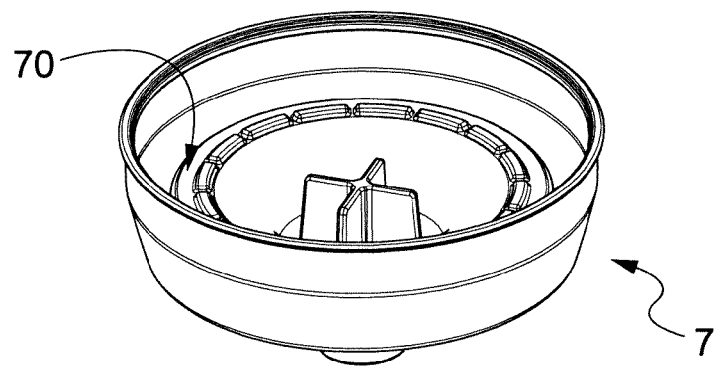
Figure 20C:
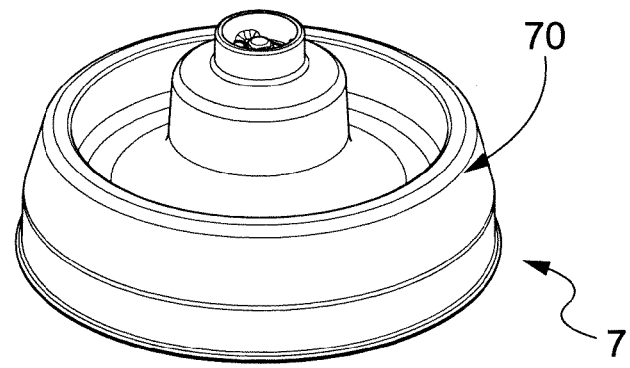
Figure 20D:
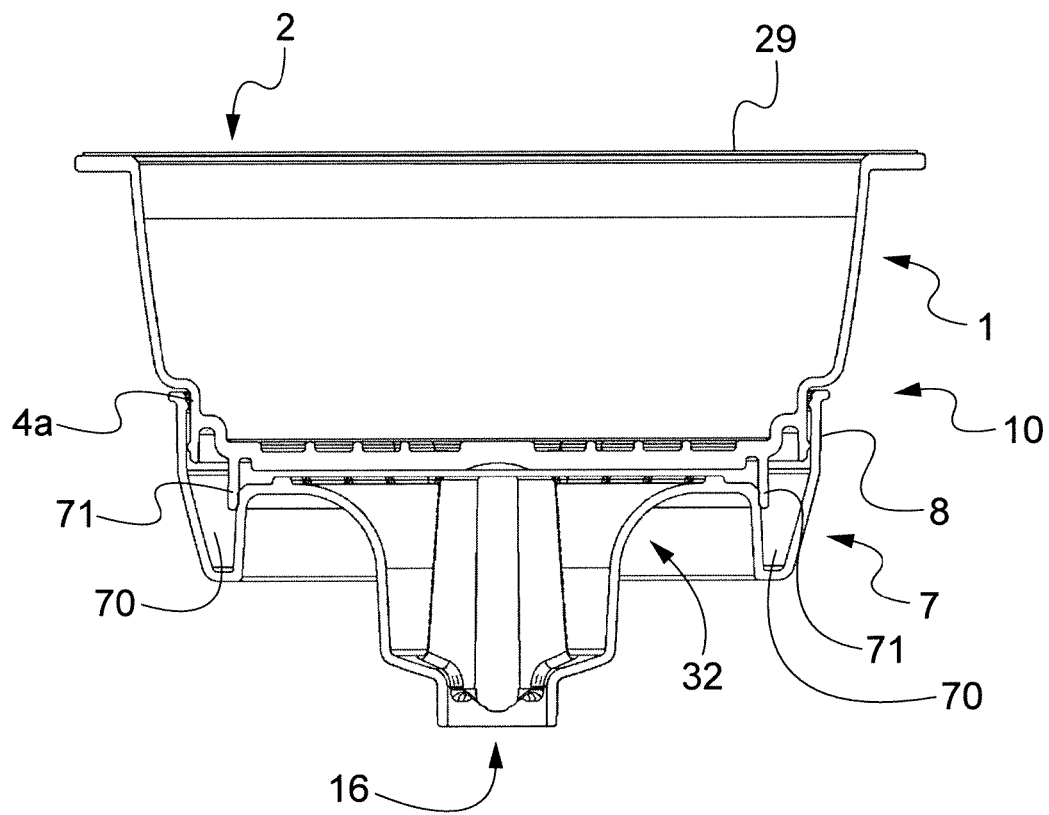

The capsule 1 is preferably configured so as to prevent the beverage from entering the lateral chamber 70 and thus remaining trapped therein; as an example, a flange 71 protruding from the outlet wall 3 of the capsule, or the guiding means 4b, may be configured so that, when the capsule 1 and the conveyor cap 7 are coupled, the lateral chamber 70 is not fluidically connected with the path of the beverage exiting the capsule, as for example shown in FIG. 20d.

Figure 21A:
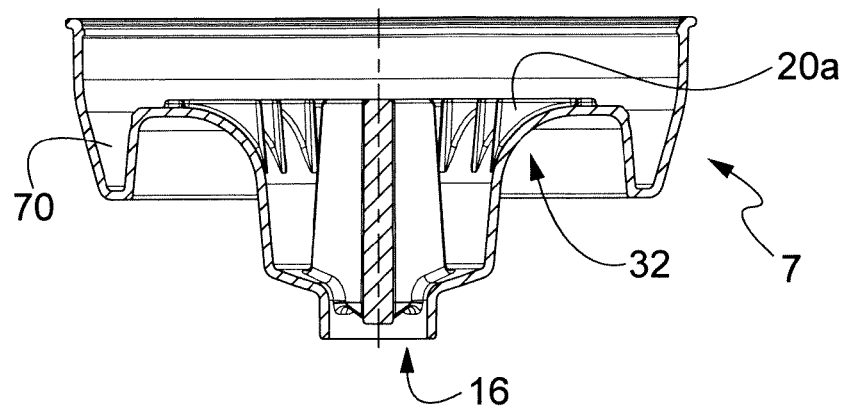
FIGS. 21a-21c show an alternative embodiment of a conveyor cap for a capsule assembly according to the invention.
Figure 21B:
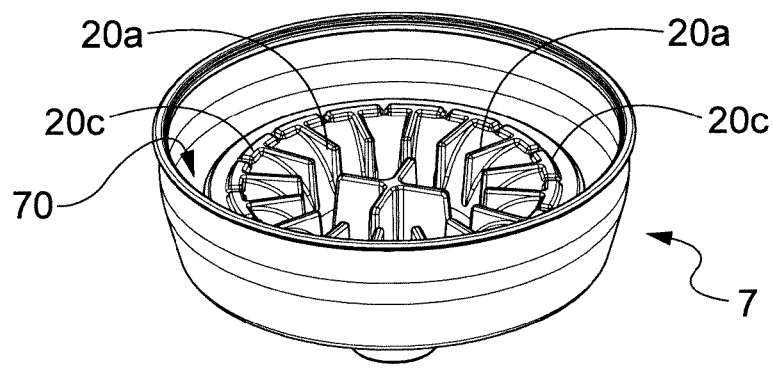
Figure 21C:
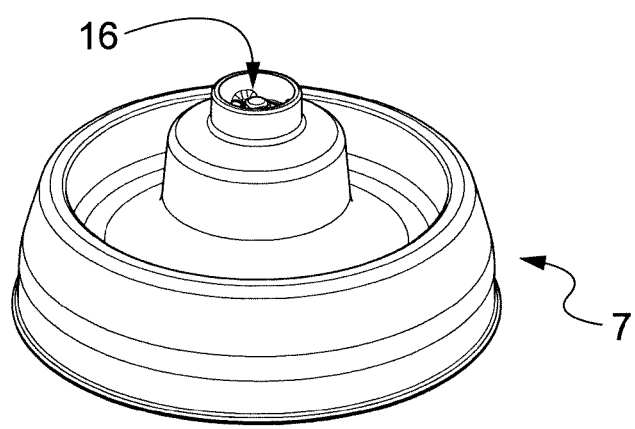
Figure 22A:
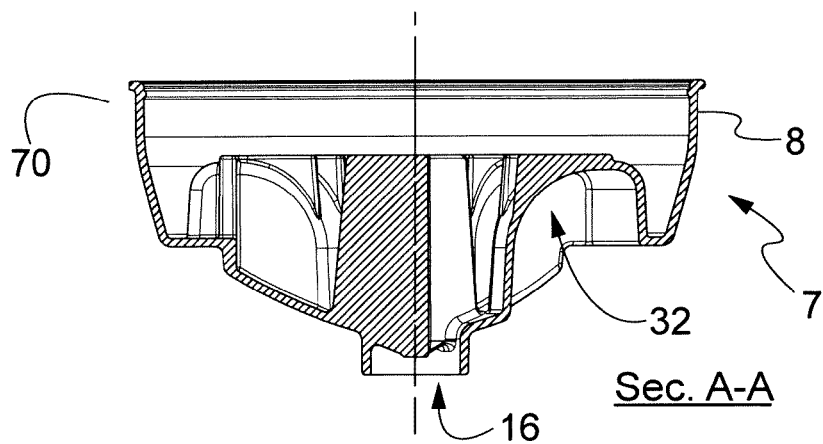
FIGS. 22a-22c show an alternative embodiment of a conveyor cap for a capsule assembly according to the invention.
Figure 22B:
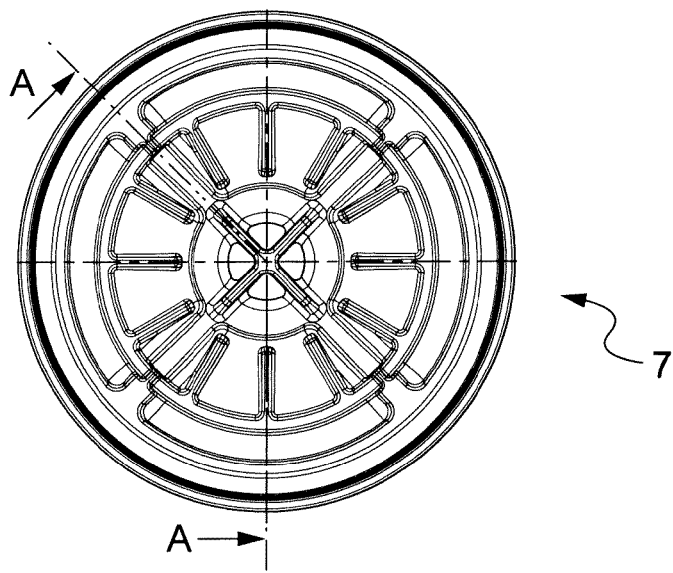
Figure 22C:
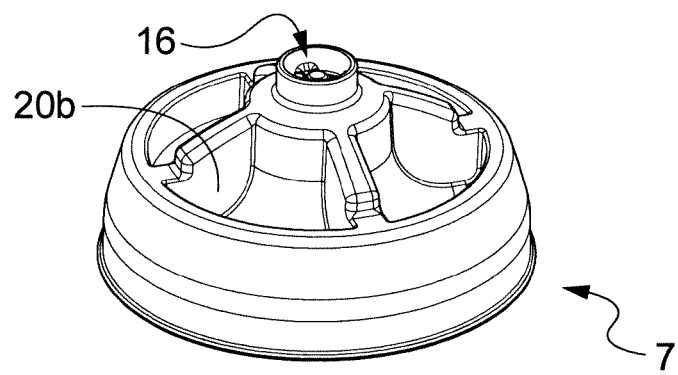

According to a further embodiment, e.g. shown in FIGS. 21a-21c, the conveyor cap 7 may be provided with flanges 20a that protrude internally with respect to the conveyor cap 7. According to an embodiment, the flanges 20a, which are 16, radial and evenly disposed in the example of FIG. 21b but may be of different number (as for example shown in the embodiment of FIGS. 23a-23c), unevenly disposed and with a slanted angle, provide for a further stiffening of the conveyor cap 7, and also provide a support for the capsule outlet wall as well as a guide for the beverage in its path towards the dispensing opening 16.

In general, the flanges 20a are typically arranged radially with respect to the conveyor cap 7 (i.e. radially with respect to the axis X-X, considered when the capsule is coupled to the conveyor cap 7).

The flanges 20a are preferably distanced from the dispensing opening 16, considering a direction parallel to the axis X-X. In other words, they are placed upstream at a distance from the dispensing opening 16.

In the shown embodiment, the flanges 20a are provided as substantially planar elements, e.g. the flanges are flat and lie substantially on a plane. In different configuration they may be bent, e.g. the flange is not lying on a plane but it is extending according to a curved surface, e.g. comprising at least one undulated or curved portion.

The flange(s) 20a can be arranged in correspondence of a stiffening ridge 20c arranged on the inner surface of the conveyor cap 7. The stiffening ridge 20c is preferably provided along circular line that is concentrically arranged with respect to the central axis of the conveyor cap.

Figure 23A:
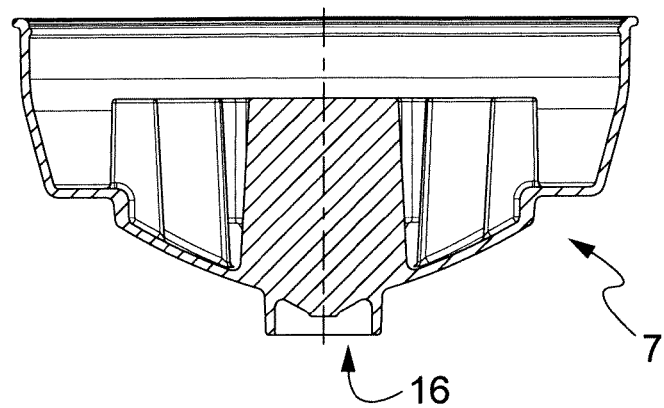
FIGS. 23a-23c show an alternative embodiment of a conveyor cap for a capsule assembly according to the invention.
Figure 23B:
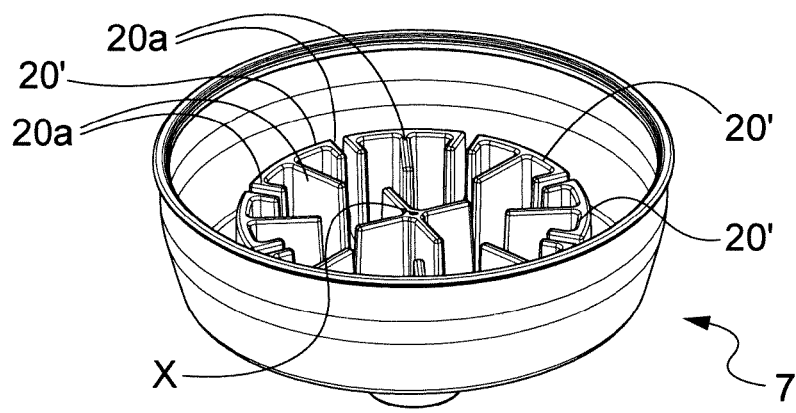
Figure 23C:
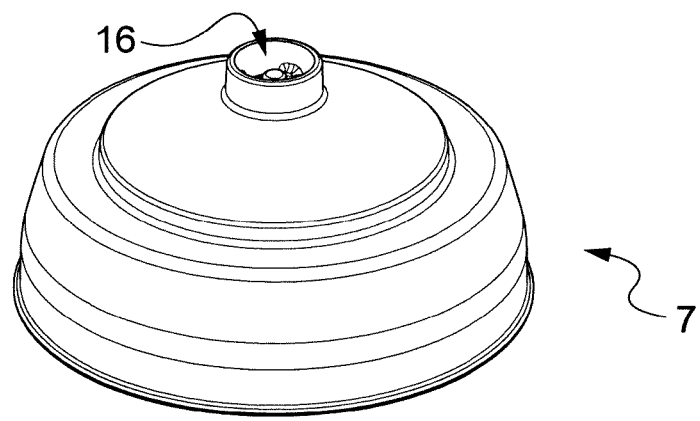

The flanges 20a may be provided even in embodiment of the conveyor cap not provided with the conical convexity 32, as e.g. shown in FIGS. 23a-23c.

As for example shown in FIGS. 23a-23c, the flanges 20a can be provided with different lengths, i.e. the end of the flanges 20a can be arranged at different distances from the central axis of the conveyor cap (corresponding to the axis of the capsule). As also visible with reference to FIGS. 23a-23c, two or more flanges 20a can be connected one to another by transversal elements 20'. The transversal element 20' can be curved thus providing a curved portion, arranged concentrically with respect to the axis of the conveyor cap.

In a further alternative embodiment, e.g. shown in FIGS. 22a-22d, the conveyor cap may be provided with stiffening means, shaped as ridges 20b protruding externally from the bottom wall 31 of the conveyor cap 7. The ridges 20b runs preferably in a radial manner with respect to the conveyor cap 7. They are typically provided at the inner convexity 32 of the bottom wall 31, between the portion of the bottom wall defining a channel that leads the beverage towards the delivery openings 16 and the portion of the bottom wall 31 that defines the lateral chamber 70.

The ridges 20b may be empty, so that, within the conveyor cap 7, the beverage may flow internally along the ridges 20b.

The remaining parts of the conveyor cap are substantially identical to those of previous embodiments, e.g. there is provided a central delivery opening 16 that is housing a conical conveyor element 17; element 17 has a cross-shaped transversal section and is longitudinally shaped to have a beverage conveying point 17a.

To support filter 24 at a distance from the bottom wall 3, (i.e. the outlet wall 3) of the capsule, capsule's wall 3 is provided with a plurality of ridges 33 extending from the wall 3 into the body of the capsule. Lid 22 is provided with a path 22b for housing the perforation/injection means of the brewing device that has a step 34 to be contacted and possibly welded to a shoulder 35 provided on the lateral wall of the capsule 1, as for example shown in FIGS. 12-13.

According to still another embodiment of the capsule assembly 10 according to the present invention, as already discussed above and as for example shown in FIGS. 19a-19f, the one or more capsule beverage outlets 5 comprise at least one through-opening 205 closed by a sealing membrane 206. In other words, the outlet wall of the capsule is provided with one or more through-opening(s) 206 (e.g. one or more hole(s) or aperture(s) or slot(s)) which are closed by sealing membrane 206.

It has to be noted that sealing membrane 206 or foil, can be for example made of aluminium, or it can comprise at least one layer of aluminium. The sealing membrane or foil can be made of a single or a plurality of layers, of the same or different materials.

For example, a typical sealing foil or membrane comprises aluminium layer(s) coupled with plastic layers to provide flexibility and gas barrier properties, but other materials may be used, such plastic layer(s), usually trilaminates including an oxygen-barrier, foil or layer(s) of an appropriate bio-material, also including coatings, preferably with oxygen-barrier properties.

Preferably, membrane 206 is impermeable to oxygen, so as to save the organoleptic characteristics of the ingredient stored in the capsule. Membrane 206 can be attached to the capsule in a known way, e.g. by ultrasonic or thermal welding or gluing. In such case, preferably also lid 2 is also made of an oxygen impermeable material, as well as body 1, which can be for instance manufactured via thermoforming from a flat sheet of adequate extruded or laminated plastics bearing oxygen-impermeable qualities. It has to be also noted that shape and/or dimension and/or number of the through-opening 205 can be varied according to different possible embodiments. For example a single through-opening 205 can be provided on the outlet wall 3 and in general at the bottom of the capsule body (as for example shown in the embodiment of FIG. 19f) sealed by a sealing membrane 206 attached to the capsule body, preferably at said outlet wall 3 around the periphery of the single through-opening. As for example shown in FIG. 19f, the sealing membrane is constrained to an annular surface surrounding the single through-opening 205.

However, a plurality of through-openings 205 can be provided, as for example shown in the embodiment of FIGS. 19a-19d. Also in this case a sealing membrane 206, preferably a disc shaped membrane 206, closes the openings 205.

Also in this case the sealing membrane can be constrained to a peripheral annular surface of the outlet wall 3. It has to be noted that more than one sealing membrane 206 can be provided, for example sealing different areas of the outlet wall 3. According to this embodiment at least one opening means o the conveyor cap (e.g. a projecting element 51) is provided for each sealing membrane 206.

It has to be also noted that according to possible embodiments, the sealing membrane may provide different areas bearing different elongation yields as provided by areas in the membrane having non continuous different layers of material.

For example, according to an embodiment, the sealing membrane, can be provided as a "sandwich" of several materials coupled together, and include areas where one or more materials are non continually present, thus generating "islands" or "slots" of the sealing membrane where one or more materials are missing, thus generating areas, (e.g. "slots" or "islands") where the mechanical characteristics of the sealing membrane differ and/or the passage of the liquid is differently affected.

The above mentioned areas where one of the layer is not present, thus forming said "islands" or "slots" can be for example provided by removal, or incision, or abrasion of part of one layer. The removal, incision, or abrasion could be provided only for part or for the whole thickness of one layer of the multi-layer membrane.

For example, the sealing membrane may comprise a layer of an elastic material (e.g. a PP or PE plastic layer) coupled to a non elastic material (e.g. aluminium layer) preferably a material that has a barrier behavior, e.g. an oxygen impermeable material such as aluminium. The sandwich of sealing membrane may also comprises a filtering layer, for example a layer made of non-woven material. It has to be noted that the layers of the membrane are not necessarily constrained (e.g. glued) one to another, but one or more layer(s) can be arranged on (but not constrained) to another layer(s). For example the layer made of non-woven material can be arranged on another layer without gluing them.

Figure 19A:
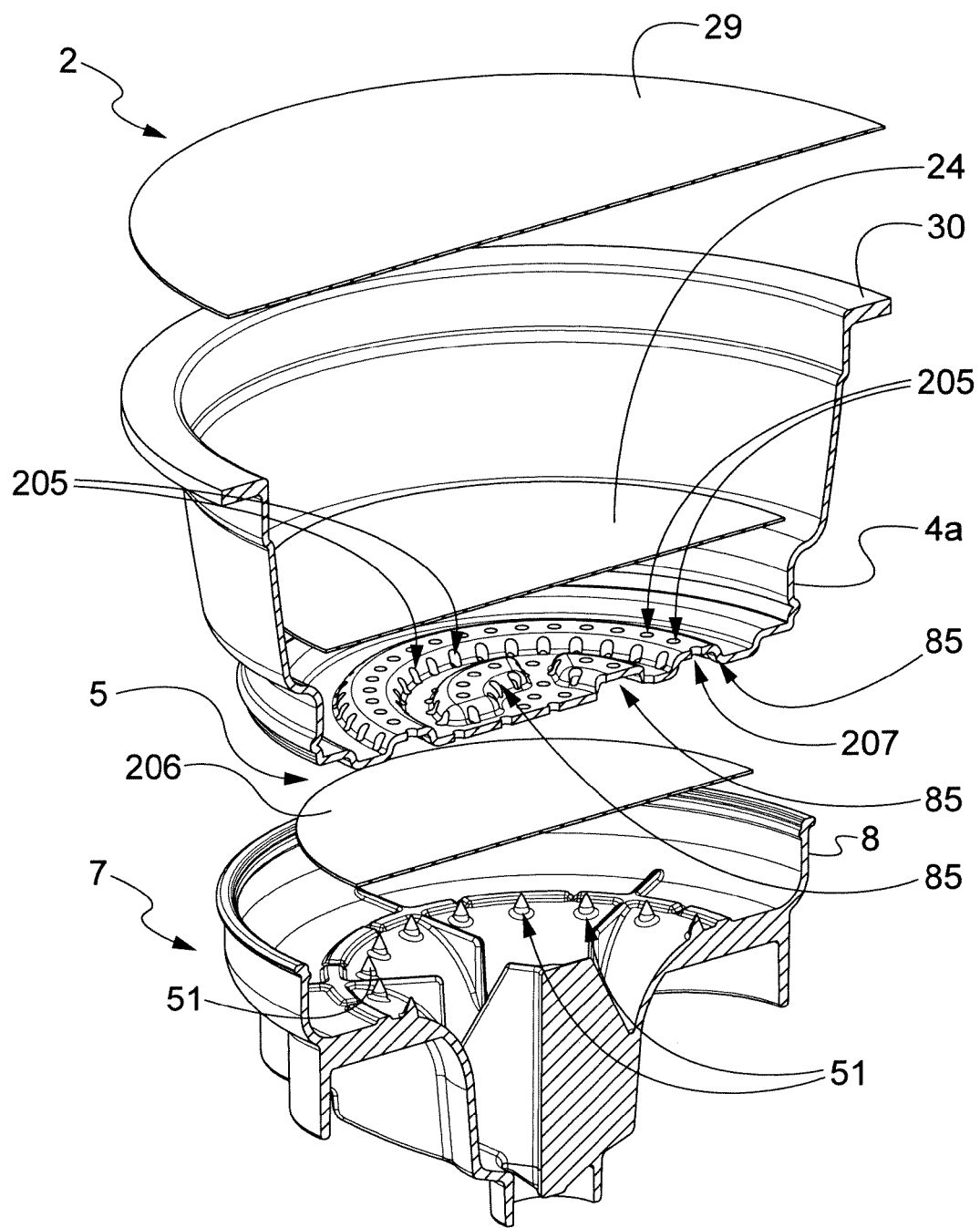
FIG. 19a is a sectional and exploded view of another possible embodiment of a capsule assembly according to the present invention wherein the beverage outlets comprise at least one through-opening closed by a sealing membrane, the sealing membrane being arranged below the at least one through-opening.
Figure 19B:
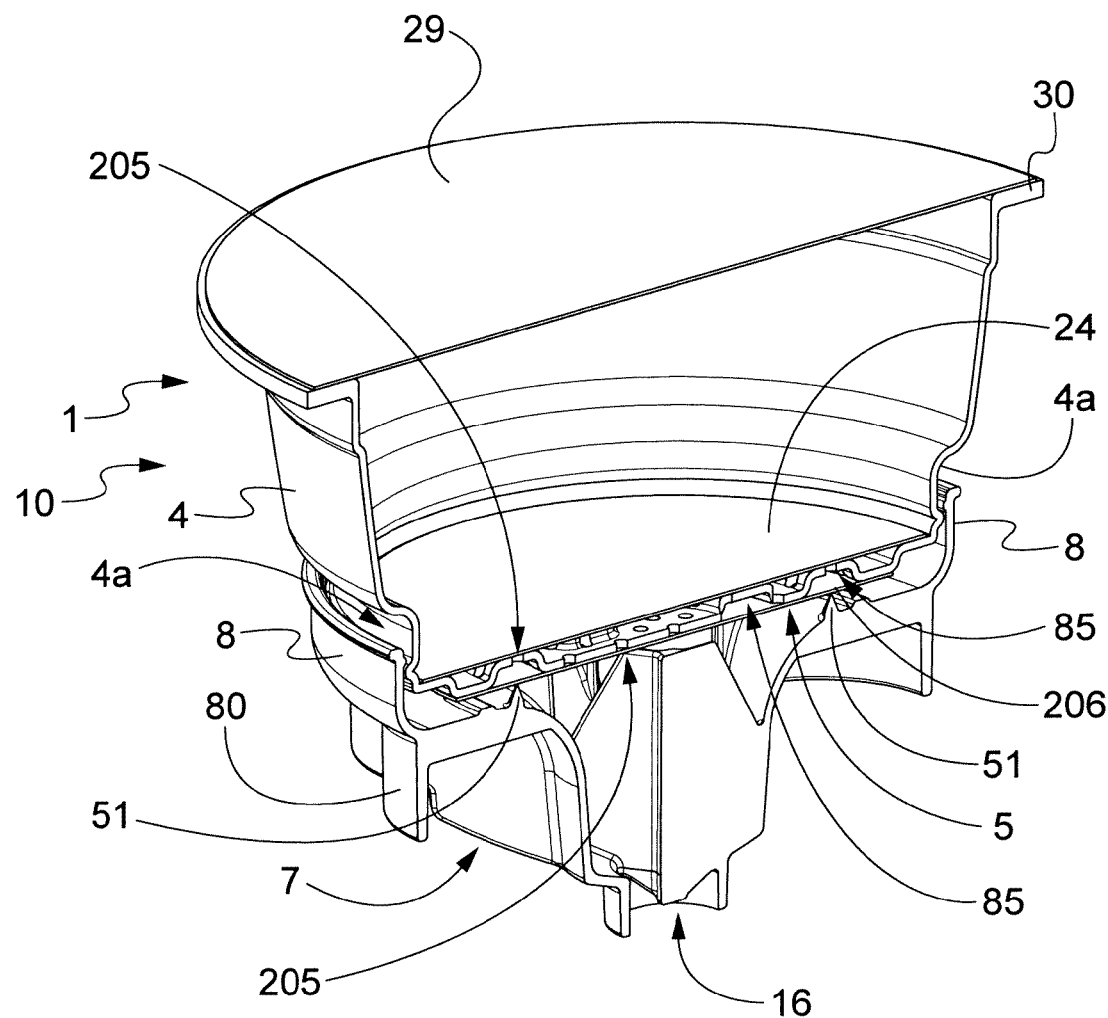
FIG. 19b is a perspective sectional view of the capsule assembly of FIG. 19a in the closed position, in other words before reaching the opening position.
Figure 19C:
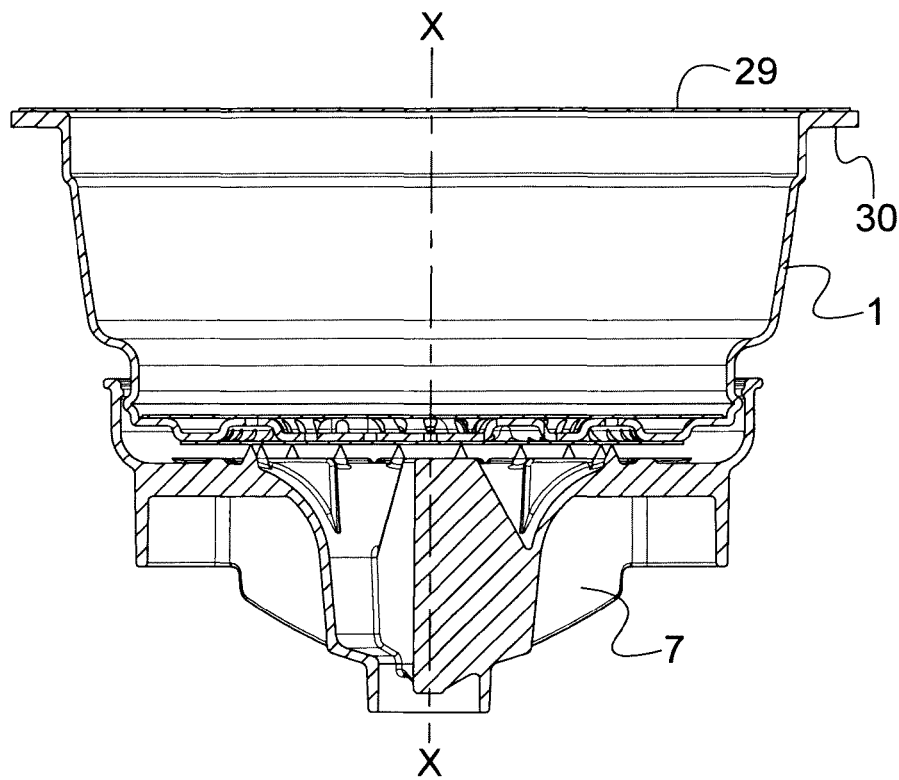
FIG. 19c is a sectional view of the assembly of FIGS. 19a and 19b in the closed position, in other words before reaching the opening position.
Figure 19D:
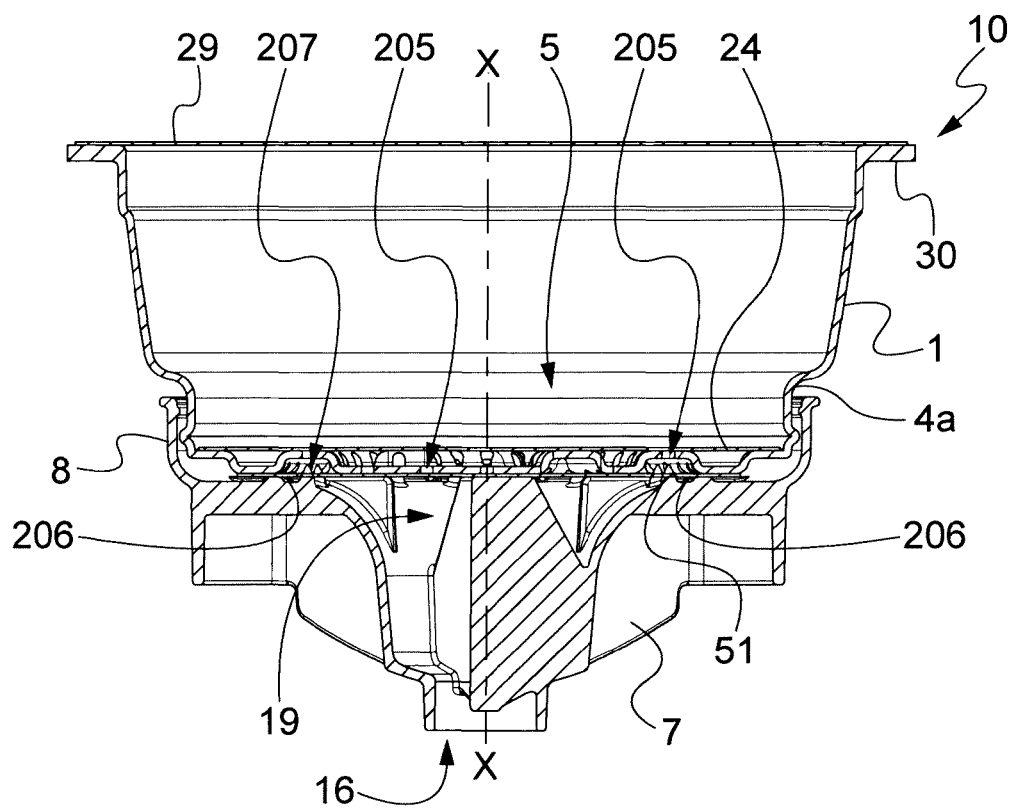
FIG. 19d is a sectional view of the assembly of FIG. 19a in an opened position, in other words ready for the beverage delivery.
Figure 19E:
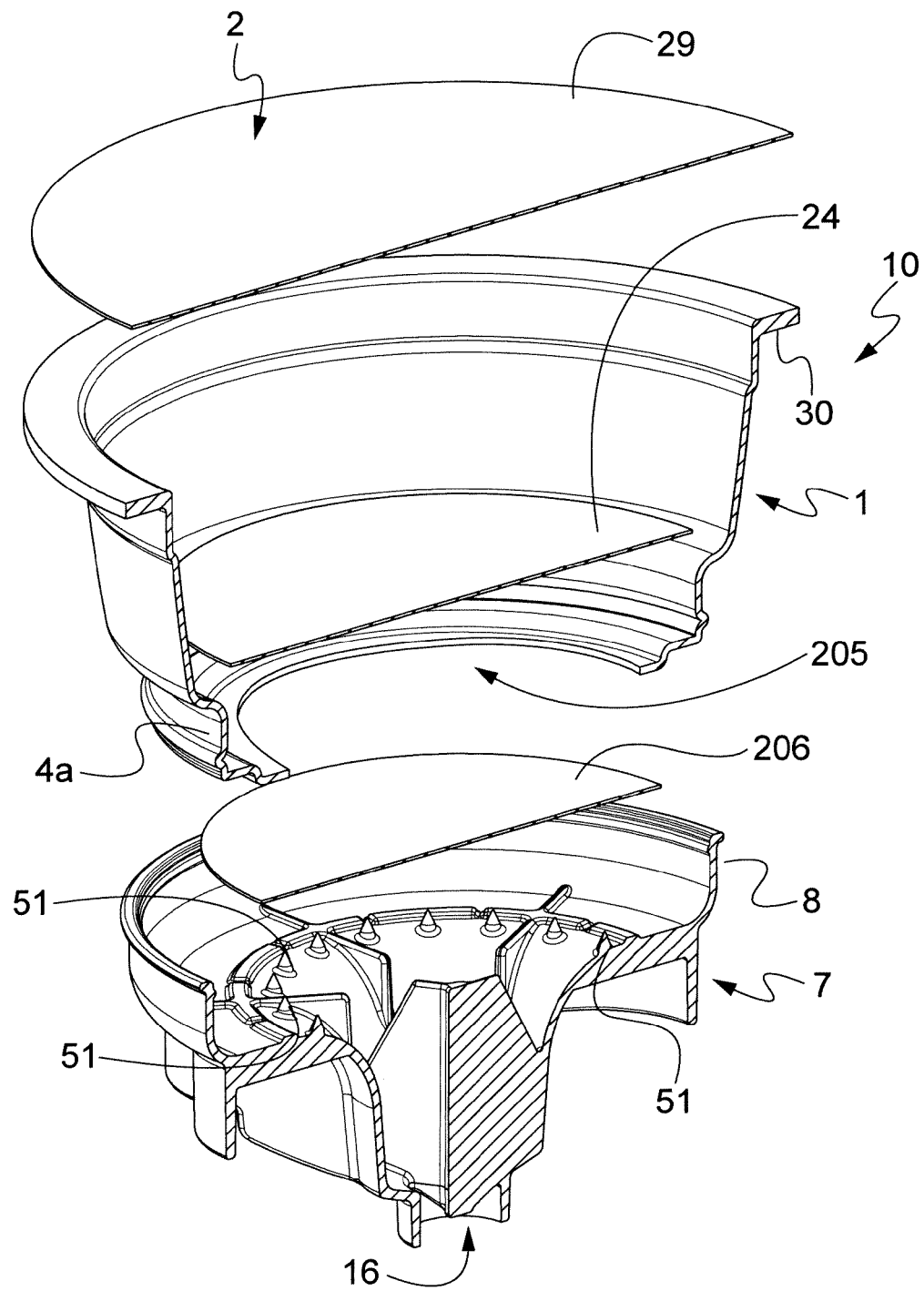
FIG. 19e is a sectional and exploded view of another possible embodiment of a capsule assembly according to the present invention wherein the beverage outlets comprise one through-opening closed by a sealing membrane.

It has to be noted that, the outlet wall 3 can extend on different planes (i.e. at different levels with respect to the central axis of the capsule), so that one or more seat 207 protruding inwardly inside the inner volume of the capsule body can be formed, so that the opening means 51 of the conveyor cap 7 can be at least partially housed at said seat 207 after the relative movement of the capsule in the open position of the capsule (as for example shown in FIG. 19d wherein the opening means 51 are at least partially housed within the seat 207).

Therefore, also in this embodiment, the capsule 1 has at least one capsule beverage outlet 5 located in outlet wall 3; i.e. at least one through-opening sealed by the membrane 206, and the outlet is preferably closed and it remains closed until the start of the beverage preparation (the position of capsule and conveyor cap whereby the capsule is closed is for example shown in FIGS. 19b and 19c).

In fact, the opening of the capsule beverage outlets 5 is preferably done mechanically, e.g. by perforation, due to the relative movement between the capsule 1 and a conveyor cap 7 of the capsule (the open position is for example shown in FIG. 19d).

The one or more openings 205 closed by the sealing membrane 206 are opened (e.g. are put in fluid communication with the beverage outlet 16) by the conveyor cap 7 due to a relative movement between the capsule and the conveyor cap. More in detail, the sealing membrane 206 is opened by opening means 51 of the conveyor cap 7.

The conveyor cap 7 is movable from a distal closed position (for example shown in FIGS. 19b and 19c) wherein the capsule beverage outlets are closed, and a proximal position, wherein the conveyor cap is closer to the outlet wall 3 of the capsule and means 51 provides the opening of the capsule beverage outlets (as for example shown in FIG. 19d).

The movement of the conveyor cap with respect to the capsule is preferably an axial movement.

As already mentioned above, the conveyor cap 7 is mounted movable (preferably axially movable) with respect to the body of the capsule, so as to reduce the distance between base 9 of the conveyor cap 7 and the outlet wall 3 when opening of the capsule is required.

More in detail, the opening means 51 of the conveyor cap are configured to tear (e.g. lacerate) and/or shear, and/or perforate (e.g. puncture), and/or deform, accordingly to the shape of the relevant part of the conveyor cap, the sealing membrane 206 so that the through-openings 205 are no longer closed (via the sealing membrane) but are in fluid communication with the enclosure space 19 of the conveyor cup 7 and thus with external ambient to deliver the beverage.

The opening means of the conveyor cap 7 comprise at least one projecting element 51, which can be provided with a tapered shape so as to facilitate perforation of the membrane.

It has to be noted that the opening means of the conveyor cap, and in particular the projecting element 51 extending from the inner surface of the conveyor cap toward the outlet wall 3 of the capsule, open the capsule either by tearing and/or perforating and/or shearing the sealing membrane 206. It has to be noted that the perforating and/or tearing and/or shearing of the membrane 206 can be provided in correspondence of the contact point of the projecting element 51 with the membrane, or at different position with respect to the contact point between the projecting element 51 and the sealing membrane 206.

In other words, even if the projecting element 51 of the conveyor cap 7 contacts the sealing membrane 206, the sealing membrane could be opened and thus torn and/or lacerated and/or perforated (e.g. pierced or punctured) at a different position with respect to the contact point, for example due to a deformation of the membrane caused by the contact of the projection element 51.

It has to be also noted that the opening of capsule, thus establishing a fluid communication of the internal volume of the capsule with the external ambient via the through-opening 205, can be also obtained without any tearing or perforation of the sealing membrane but with a deformation or movement thereof. For example the sealing membrane 206 can be detached or moved from its constraining portion with the capsule body, for example from the annular area where the sealing membrane 206 is constrained (for example glued) to the capsule body, preferably at the outlet wall 3 thereof.

The deformation or movement, and thus detachment of the sealing membrane 206 from its constraining portion of the outlet wall, preferably without its perforation, is obtained via the pressure exerted by the contact of the projecting element 51 of the conveyor cap with the sealing membrane 206 due to the relative movement between the capsule 1 and the conveyor cap 7.

Obviously, in the closed condition of the capsule (see for example FIG. 19b and 19c) the opening means 51 (projecting element) of the conveyor cap can be spaced from the sealing membrane 206 (as for example shown in the FIGS. 19b and 19c) or can be already in contact with the sealing membrane 206 but the capsule is still closed.

The number, shape and dimension of the projecting element(s) 51 of the conveyor cap 7 can be varied according to different possible embodiments. More in detail, the opening means 51 can have different in their shape and number with respect to the elements 51 shown in FIGS. 19a-19f.

The relative movement between the capsule and the conveyor cap 7 provides for the opening of the capsule as discussed above.

It has to be noted that if the sealing membrane 206 comprises a plurality of layers, i.e. it is provided as a "sandwich" of several materials coupled together, areas where one or more materials are non continually present, thus generating "islands" or "slots" of the sealing membrane where one or more materials are missing, provides different mechanical characteristics of the sealing membrane which can be used to allow an effective opening due to the pressure exerted thereon by the opening means 51 of the conveyor cap.

It has to be also noted that according to another embodiment, the conveyor cap is intended to support the capsule while the opening of the outlet wall 3 is operated via the pressure of the brewing liquid injected inside the capsule. More in detail, according to a possible embodiment, the sealing membrane 206 can be opened via the pressure of the liquid injected inside the capsule. To this regard, removal of material of the membrane thus reducing its thickness, for example by incision or abrasion, can be provided to facilitate the opening of the capsule. According to an embodiment, the sealing membrane comprises a plurality of layers, i.e. it is provided as a "sandwich" of several materials coupled together, and areas where one or more materials are non continually present, thus generating "islands" or "slots" of the sealing membrane where one or more materials are missing, allows to facilitate the opening of the membrane via the pressure exerted thereon by the liquid injected inside the capsule to prepare the beverage at said areas where one or more material(s) of the membrane are not present.

Other features of the capsule assembly 10 previously disclosed with reference to other embodiments can be applied to the embodiment just discussed with exemplary reference to FIGS. 19a-19f, and viceversa. As for example shown in FIGS. 19a-19f, the conveyor cap 7 can be constrained in a movable manner with the lateral wall 4, for example with a lower (bottom) cylindrical part 4a of the lateral wall 4 of the capsule. The surface of the bottom part 4a is preferably extending vertically (i.e. parallel to a central axis X-X of the capsule (e.g. an axis of rotational symmetry) as well as is lateral wall 8 of the conveyor means is also vertically extending with respect to axis X-X.

More in detail, as for example shown in FIGS. 19b, 19c, 19d, the conveyor cap 7 is configured to laterally embrace a portion of the lateral wall 4 of the capsule, and in particular the bottom part 4a of lateral wall 4.

However, as already mentioned above, according to other possible embodiments, as for example shown in the FIGS. 1-3 and 12-17, the conveyor cap 7 can be constrained in a movable manner with a flange 4b or part of a flange, protruding from the capsule.

Any type of inlet wall 2 may be used amongst the ones available to the skilled in the art: for example (as shown in FIGS. 19a-19f) the inlet wall may comprise a membrane 29, for example secured to a peripheral flange 30, and covering the entrance of the capsule.

Obviously, different embodiment of the inlet wall 2 can be used. For example, the wall 2 may comprises a rigid lid 22, for example coupled to a flange 30 or to the lateral wall of the capsule, as already disclosed above with exemplary reference to FIGS. 1, 3, 7-14.

As already disclosed above with reference to FIGS. 1, 3, 7-14, the inlet wall 2 comprises a rigid lid 22 provided with one or more openings (e.g. holes) for feeding water into the body of the capsule 1. A sealing film or membrane 23, preferably impermeable to oxygen, is normally placed above the lid 22 to close it, until film 23 is pressed against lid 22 and is perforated by perforating elements 28; the film can be spaced from element 28 or can be in contact with said element in its standard position, before being perforated. Further details on this embodiment can be found in EP 1807318 of the present applicant, to which reference is made.

A filter 24 can be also provided. Filter 24 of a type known in the art and preferably secured in a way known in the art (e.g. by ultrasonic or thermal welding or gluing) to the capsule body, e.g. to a step in lateral wall 4. Filter 24 may be slightly spaced from the bottom wall 3 of the capsule to allow the movement of the opening means of the bottom wall. As mentioned above, the filter 24 can be coupled (e.g. glued) to at least one layer of the sealing membrane.

Figure 19F:
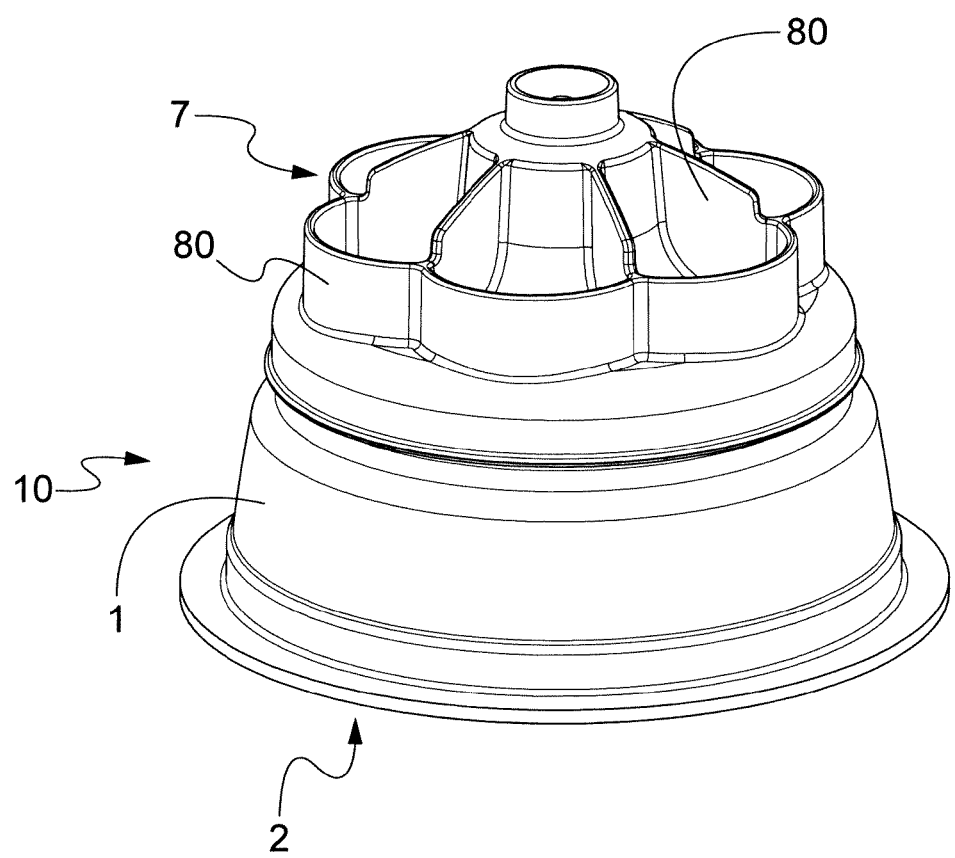
FIG. 19f is perspective view of the capsule assembly according to FIG. 19a or 19e.

Lateral fins or ridges 80, or similar elements protruding from the external surface of the lateral wall of the capsule, and/or from the external surface of the conveyor cap (as for example shown in FIG. 19a-19f), can be provided to adapt a capsule to a holder bearing different, i.e. greater, dimensions while maintaining the internal volume of the capsule of the desired dimension to house the required quantity of ingredient(s). Fins 80 may be also, or alternatively, utilised to provide aesthetic embellishment to the outer body and thus may be provided in different shapes and patterns as shown in FIG. 19f.

It has to be noted that stiffening means 85 of outlet wall 3 can be provided to reinforce the capsule body and in particular its outlet wall 3, especially if the capsule body is made by a thermo-forming process.

The stiffening means 85 may comprises one or more ridge, or fin, extending from the outlet wall, preferably at its inner surface. The ridge 85 may comprises a cavity, i.e. it can be provided by arranging the outlet wall 3 surface on different planes (i.e. at different levels with respect to the central axis of the capsule).

For example, the ridge 85 may coincide with the one or more seat 207 protruding inwardly inside the inner volume of the capsule body, intended to receive at least part of the opening means 51 of the conveyor cap 7 after the relative movement of the capsule in the open position. Number, shape and position of the stiffening means 85 can be varied according to different possible embodiments. The stiffening means 85 can be provided with through-openings 205 allowing passage of the beverage.

According to still another embodiment of the capsule assembly 10 according to the present invention, as already discussed above and as for example shown in FIGS. 28*a*-28*c*, the one or more capsule beverage outlets 5 comprise at least one through-opening 205 closed by a sealing membrane 206, wherein the sealing membrane is arranged above (upstream) the through-opening 205.

The sealing membrane 206 is constrained (e.g. glued or welded) on a portion of the capsule, for example at the outlet wall 3.

The outlet wall of the capsule is provided with one or more through-opening 205 (e.g. one or more hole(s) or aperture(s) or slot(s)) which are normally closed by sealing membrane, e.g. a sealing foil for example made of aluminium, to provide a sealed closed capsule.

The expression "closed" or "normally closed" is used here to indicate that the internal volume of the capsule body where at least one ingredient is housed, is sealed from the external environment, i.e. the capsule is closed and the beverage cannot exit therefrom via the through-opening(s).

Figure 28A:
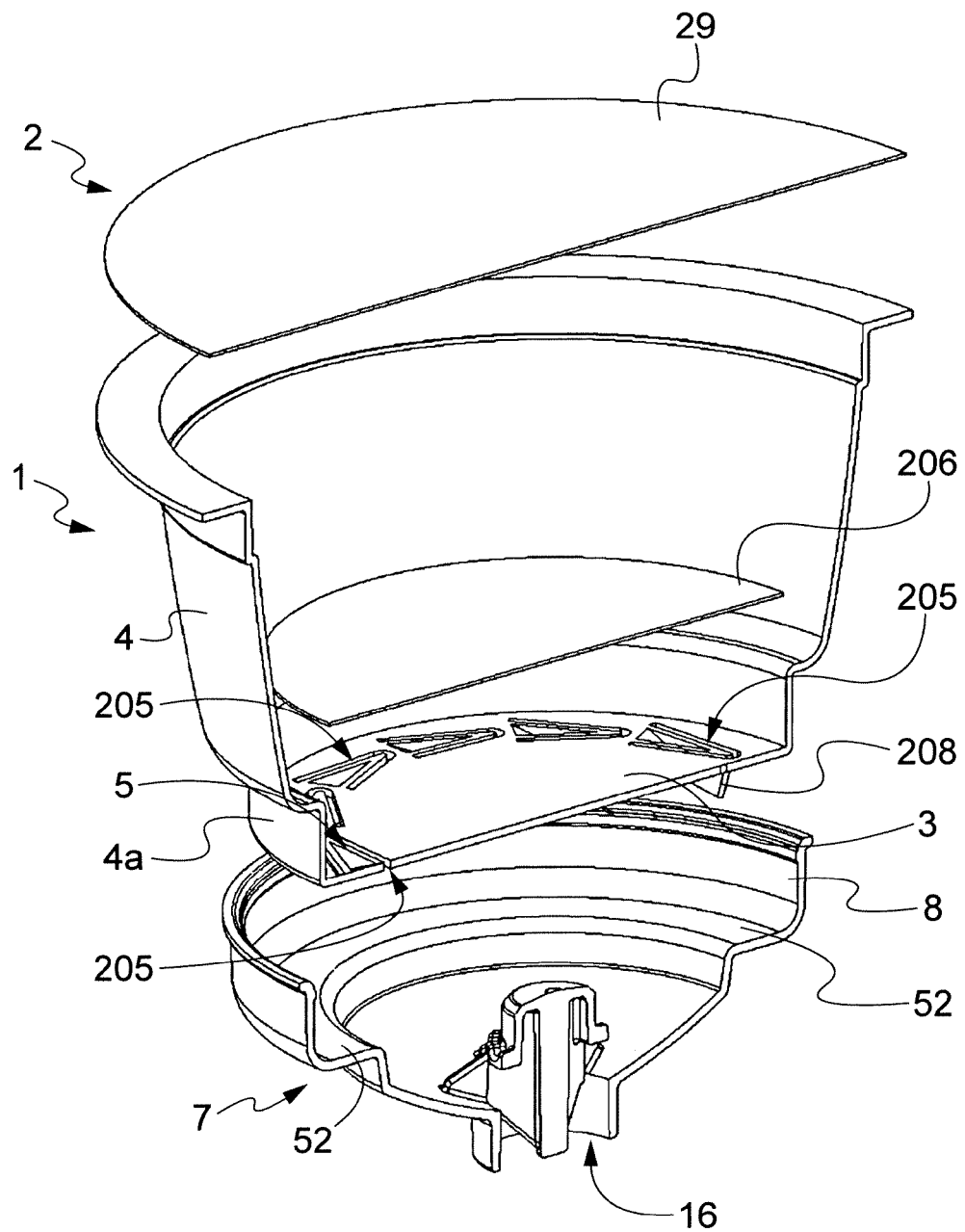
FIG. 28a is a sectional and exploded view of another possible embodiment of a capsule assembly according to the present invention wherein the beverage outlets comprise at least one through-opening closed by a sealing membrane, the sealing membrane being arranged above the at least one through-opening.
Figure 28B:
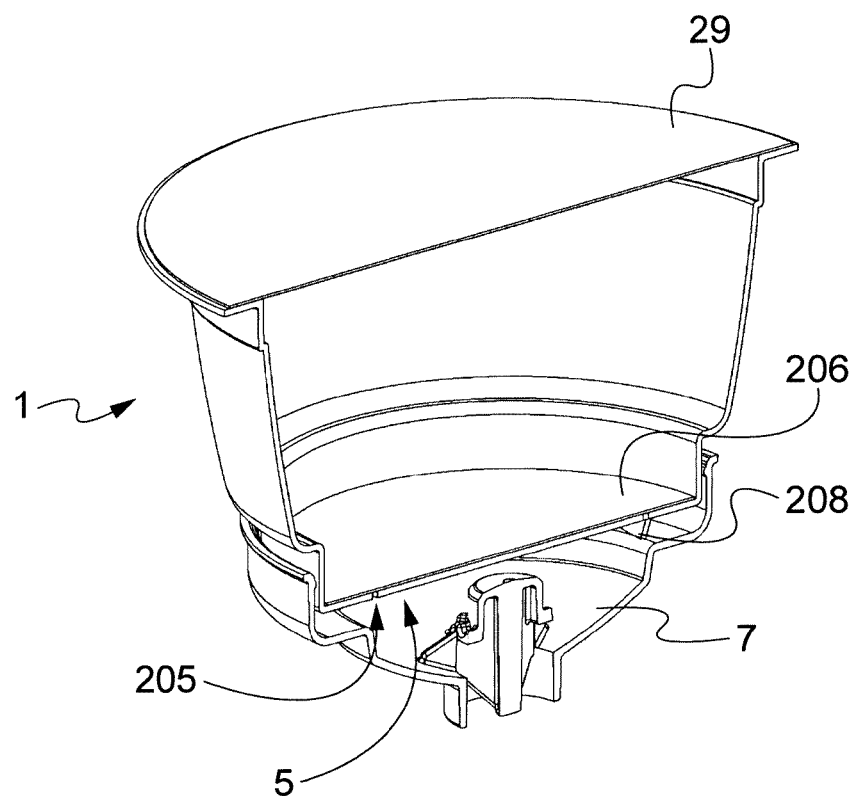
FIG. 28b is a perspective sectional view of the capsule assembly of FIG. 28a in the closed position.
Figure 28C:
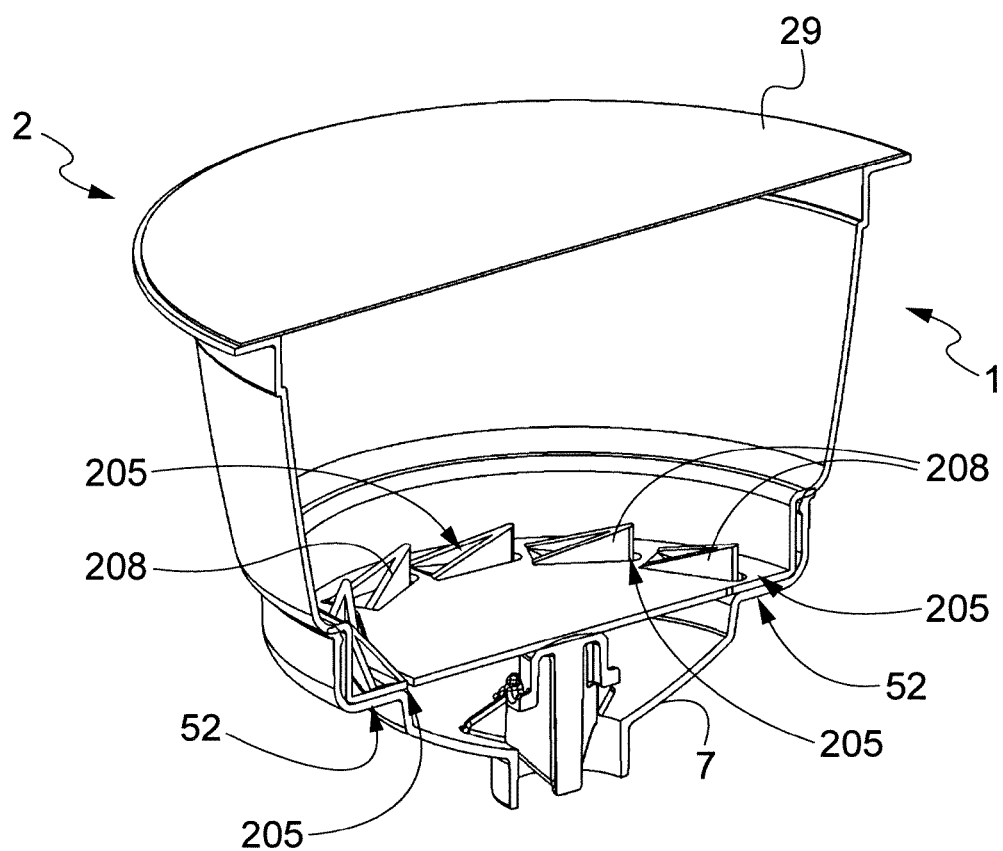
FIG. 28c is a sectional view (wherein the sealing membrane has been omitted) of the assembly of FIGS. 28a and 28b in an opened position, in other words ready for the beverage delivery.

It has to be noted that the through-opening 205 can be shaped in the form of slots 205, for example having a V-shape, as for example shown in the FIGS. 28*a*-28*c*. The one or more openings 205 are opened by the conveyor cap 7 due to a relative movement between the capsule and the conveyor cap 7. More in detail, at least one projecting element 208 of the capsule is arranged at the outlet wall 3 and project towards the outside of the capsule and is intended to be contacted by an abutting portion 52 of the conveyor cap 7.

The projecting element 208 is preferably arranged in correspondence of a movable portion of the outlet wall 3 defined by the at least one through-opening 205. More in detail, according to a possible embodiment the V-shape of the through-opening 205 (or slots) are intended to form a movable portion of the outlet wall where the projecting element 208 is arranged.

More in detail, as for example shown in FIG. 28*c* after a relative movement between the capsule and the conveyor cap 7, opening means of the conveyor cap comprising an abutting portion 52 contacts the projecting element 208 of the capsule and apply a pressure thereon. The projecting elements 208 are thus pushed towards the internal volume of the capsule body and cause the rupture of the sealing membrane 206 (it has to be noted that for clarity the sealing membrane 206 is not shown in FIG. 28*c*). The capsule is thus opened and the internal volume is in fluid communication with the external environment via the through-opening(s) 205. In other words the passage of the beverage in the through-openings(s) 205 is no longer prevented by the sealing membrane 206.

It has to be noted that sealing membrane 206 can be of the type disclosed with reference to the embodiment disclosed with reference to FIG. 19. It has to be also noted that the capsules shown in the embodiments of FIGS. 19 and 28 are preferably made by a thermo-forming process.

The invention claimed is:

1. A capsule assembly comprising:
   a capsule for preparation of beverages; and
   a conveyor cap mounted on the capsule for conveying the beverage exiting the capsule;
   the capsule comprising an inlet wall, an outlet wall, and a lateral wall defining an internal volume inside which at least one beverage ingredient is housed, the outlet wall comprising one or more capsule beverage outlets;
   the conveyor cap being mounted on the capsule to define an enclosure space between the outlet wall and an inner surface of the conveyor cap, and the conveyor cap including one or more beverage delivery openings;
   wherein the conveyor cap is movably mounted on the capsule, and the capsule beverage outlets and the conveyor cap are configured to interact so that the capsule beverage outlets are opened by the conveyor cap due to a relative movement between the capsule and the conveyor cap, wherein the capsule beverage outlets comprise a breakable portion of the outlet wall of the capsule, the breakable portion defined by at least one-line of reduced thickness.

2. The assembly according to claim 1, wherein the capsule includes guiding means for the conveyor cap, the conveyor cap is movable, with respect to the capsule and houses the guiding means of the capsule, whereby the guiding means guides movement of the conveyor cap.

3. The assembly according to claim 1, wherein the capsule includes guiding means for the conveyor cap, the guiding means is selected from at least part of the lateral wall of the capsule and a flange protruding from the lateral wall or from the outlet wall of the capsule, or a combination thereof.

4. The assembly according to claim 1, wherein the conveyor cap is movable from a distal position, wherein the one or more capsule beverage outlets are closed, and a proximal position, wherein the conveyor cap is closer to the outlet wall of the capsule and provides the opening of the capsule beverage outlets.

5. The assembly according to claim 1, wherein the relative movement between the capsule and the conveyor cap to open the capsule beverage outlets is provided mechanically.

6. The assembly according to claim 1, wherein the relative movement between the capsule and the conveyor cap allows to apply a pressure on the capsule beverage outlets to open the capsule beverage outlets.

7. The assembly according to claim 1, wherein the conveyor cap comprises opening means for opening the beverage outlets of the capsule, the opening means arranged within the enclosure space.

8. The assembly according to claim 7, wherein the opening means comprises a projecting element and/or an abutting portion of the conveyor cap for at least one projecting element of the capsule.

9. The assembly according to claim 7, wherein the opening means of the conveyor cap applies a pressure on the capsule beverage outlets to open the capsule beverage outlets.

10. The assembly according to claim 1, wherein the opening means of the conveyor cap comprises a projecting element arranged at an inner surface of the conveyor cap and directed towards the outlet wall to apply a pressure on the breakable portion of the outlet wall.

11. The assembly according to claim 1, wherein the capsule beverage outlets further comprise a projecting element arranged at the breakable portion and extending within the enclosure space.

12. The assembly according to claim 11, wherein the opening means of the conveyor cap comprises an abutting portion to engage the projecting element of the capsule beverage outlets.

13. The assembly according to claim 1, wherein the inlet wall comprises a membrane or a rigid lid including at least one inlet opening, a sealing membrane pierceable by one or more perforating elements of the lid.

14. The assembly according to claim 13, wherein the rigid lid comprises a portion covered by a sealing membrane and a circular path externally arranged with respect to the portion covered by the sealing membrane.

15. The assembly according to claim 1, wherein the conveyor cap includes air passages to let air flow from outside the cap to the enclosure space or from inside the enclosure space to outside the cap, and wherein the air passages are located at a plane that is different from the plane where the beverage delivery openings of the cap conveyor is located.

16. The assembly according to claim 1, wherein the conveyor cap includes at least one centrally located beverage delivery opening and the at least one capsule beverage outlet of the capsule is located offset with respect to the at least one beverage delivery opening of the conveyor cap.

17. The assembly according to claim 1, wherein the capsule includes a plurality of capsule beverage outlets located peripherally and the conveyor cap includes one central beverage delivery opening.

18. The assembly according to claim 1, wherein the capsule includes one or more capsule beverage outlets extending radially with respect to the central axis of the capsule.

19. The assembly according to claim 1, wherein the beverage delivery opening of the conveyor cap includes an element to guide the beverage flow leaving the enclosure space.

20. The assembly according to claim 19, wherein the guide element is a conical element.

21. The assembly according to claim 1, wherein the conveyor cap includes guiding means cooperating with guiding means of the capsule, the guiding means of the conveyor cap being selected from a lateral wall or portions of a lateral wall of the conveyor cap and a flange protruding from the conveyor cap, or a combination thereof.

22. The assembly according to claim 21, wherein the flange of the conveyor cap protrudes from the base of the conveyor cap, and the flange of the conveyor cap is arranged internally with respect to the lateral wall of the conveyor cap.

23. The assembly according to claim 1, wherein the guiding means of the capsule and/or the guiding means of the conveyor cap include at least one groove or at least one through passage.

24. The assembly according to claim 1, wherein the conveyor cap and the capsule include complementary means that couple and retain the conveyor cap on the capsule while allowing the relative movement between the capsule and the conveyor cap, the complementary means provide an interlocking connection between the capsule and the conveyor cap.

25. A system for preparing a beverage, comprising:
a capsule assembly according to claim 1; and
a holder for housing the assembly, the system configured to provide a relative movement between the capsule and the conveyor cap to open the capsule beverage outlets.

26. The system according to claim 25, wherein the holder is insertable in a holder seat of the system, a relative movement between the capsule and the conveyor cap to open the capsule beverage outlets being provided when the assembly is housed in the holder and the holder is inserted in the holder seat.

27. The system according to claim 25, wherein the holder is dimensioned to be in contact with a part of the conveyor cap of the assembly that is spaced from the beverage delivery opening of the conveyor cap, to avoid or reduce contacts between the beverage and the capsule holder when the beverage is dispensed.

28. The system according to claim 25, wherein the relative movement between the capsule and the conveyor cap is provided mechanically.

29. The system according to claim 25, wherein the relative movement between capsule and conveyor cap is carried out when the brewing system is closed and a liquid tight sealing is provided on the capsule before water is fed to the capsule.

30. A method of preparing a beverage from a capsule assembly according to claim 1, comprising:
dispensing the beverage from the capsule into an enclosure space defined by the capsule and a conveyor cap mounted on the capsule; and
providing a relative movement between the capsule and the conveyor cap to open the capsule beverage outlets.

31. A capsule assembly, comprising:
a capsule for preparation of beverages; and
a conveyor cap mounted on the capsule for conveying the beverage exiting the capsule;
the capsule comprising an inlet wall, an outlet wall, and a lateral wall defining an internal volume inside which at least one beverage ingredient is housed, the outlet wall comprising one or more capsule beverage outlets;
the conveyor cap being mounted on the capsule to define an enclosure space between the outlet wall and an inner surface of the conveyor cap, and the conveyor cap including one or more beverage delivery openings;
wherein the conveyor cap is movably mounted on the capsule, and the capsule beverage outlets and the conveyor cap are configured to interact so that the capsule beverage outlets are opened by the conveyor cap due to a relative movement between the capsule and the conveyor cap,
wherein the one or more capsule beverage outlets comprise at least one through-opening closed by a sealing membrane.

32. The assembly according to claim 31, wherein the sealing membrane is opened by opening means of the conveyor cap, comprising a projecting element configured to tear and/or shear and/or perforate and/or deform the sealing membrane, and/or the opening means of the conveyor cap comprising an abutting portion of the conveyor cap for at least one projecting element of the capsule.

33. A capsule assembly according to claim 31, wherein the conveyor cap includes air passages to let air flow from outside the cap to the enclosure space or from inside the enclosure space to outside the cap, and wherein the air passages are located at a plane that is different from the plane where the beverage delivery openings of the cap conveyor is located.

34. A capsule assembly according to claim 31, wherein the conveyor cap and the capsule include complementary means that couple and retain the conveyor cap on the capsule while allowing the relative movement between the capsule and the conveyor cap, the complementary means provide an interlocking connection between the capsule and the conveyor cap.

35. A capsule assembly according to anyone of claim 31, 13 or 14, wherein the sealing membrane is made of aluminium.

* * * * *